United States Patent
Psota et al.

(10) Patent No.: US 11,514,096 B2
(45) Date of Patent: Nov. 29, 2022

(54) NATURAL LANGUAGE PROCESSING FOR ENTITY RESOLUTION

(71) Applicant: Panjiva, Inc., New York, NY (US)

(72) Inventors: James Ryan Psota, Cambridge, MA (US); Timothy George Garnett, San Mateo, CA (US); Peter Goodings Swartz, Cambridge, MA (US); Jason Prentice, Arlington, MA (US)

(73) Assignee: Panjiva, Inc., New York, NY (US)

( * ) Notice: Subject to any disclaimer, the term of this patent is extended or adjusted under 35 U.S.C. 154(b) by 489 days.

(21) Appl. No.: 15/254,714

(22) Filed: Sep. 1, 2016

(65) Prior Publication Data

US 2017/0091320 A1 Mar. 30, 2017

Related U.S. Application Data

(60) Provisional application No. 62/212,966, filed on Sep. 1, 2015.

(51) Int. Cl.
*G06F 16/30* (2019.01)
*G06F 16/35* (2019.01)
(Continued)

(52) U.S. Cl.
CPC ........... *G06F 16/35* (2019.01); *G06F 16/313* (2019.01); *G06F 16/334* (2019.01); *G06F 16/3337* (2019.01)

(58) Field of Classification Search
CPC ............. G06F 17/2809; G06F 16/3331; G06F 16/951; G06F 16/334; G06F 16/35;
(Continued)

(56) References Cited

U.S. PATENT DOCUMENTS

| 5,570,291 A | 10/1996 | Dudle et al. |
| 5,826,244 A | 10/1998 | Huberman |

(Continued)

FOREIGN PATENT DOCUMENTS

| CN | 1499403 A | 5/2004 |
| CN | 1822000 A | 8/2006 |

(Continued)

OTHER PUBLICATIONS

Learning Deep Structured Semantic Models (Year: 2009).*

(Continued)

*Primary Examiner* — Sana A Al-Hashemi
(74) *Attorney, Agent, or Firm* — Yee & Associates, P.C.

(57) ABSTRACT

An apparatus includes a data access circuit that interprets data records, each having a number of data fields, a record parsing circuit that determines a number of n-grams from terms of each of the data records and maps the number of n-grams to a corresponding number of mathematical vectors, and a record association circuit that determines whether a similarity value between a first mathematical vector for the first data record and a second mathematical vector for the second data record is greater than a threshold similarity value, and associates the first and second data records in response to the similarity value exceeding the threshold similarity value. An example apparatus includes a reporting circuit that provides a catalog entity identifier, associates each of the first term and the second term to the catalog entity identifier, and provides a summary of activity for an entity.

23 Claims, 22 Drawing Sheets

(51) Int. Cl.
*G06F 16/31* (2019.01)
*G06F 16/33* (2019.01)

(58) Field of Classification Search
CPC .. G06F 16/3337; G06F 16/313; G06F 16/345;
G06F 16/45558; G06F 16/278; G06F
16/36
USPC ........ 707/609, 687, 705, 769, 790, 813, 821
See application file for complete search history.

(56) References Cited

U.S. PATENT DOCUMENTS

| | | | |
|---|---|---|---|
| 5,970,475 A | 10/1999 | Barnes et al. | |
| 5,987,429 A | 11/1999 | Maritzen et al. | |
| 6,035,017 A | 3/2000 | Fenton et al. | |
| 6,629,081 B1 | 9/2003 | Cornelius et al. | |
| 7,330,833 B1 | 2/2008 | Robb et al. | |
| 7,610,233 B1 | 10/2009 | Leong et al. | |
| 7,617,136 B1 | 11/2009 | Lessing et al. | |
| 7,912,865 B2 | 3/2011 | Akerman et al. | |
| 8,473,354 B2 | 6/2013 | Psota et al. | |
| 9,519,859 B2* | 12/2016 | Huang | G06F 16/36 |
| 9,639,874 B2 | 5/2017 | Psota et al. | |
| 2001/0056379 A1 | 12/2001 | Fujinaga et al. | |
| 2002/0194050 A1 | 12/2002 | Nabe et al. | |
| 2003/0034879 A1 | 2/2003 | Rangarajan et al. | |
| 2003/0046220 A1 | 3/2003 | Kamiya | |
| 2003/0088562 A1 | 5/2003 | Dillon et al. | |
| 2003/0126146 A1 | 7/2003 | Van Der Riet | |
| 2003/0187716 A1 | 10/2003 | Lee | |
| 2003/0212609 A1 | 11/2003 | Blair et al. | |
| 2004/0039598 A1 | 2/2004 | Kim | |
| 2004/0109543 A1 | 6/2004 | Engelsma et al. | |
| 2004/0122942 A1 | 6/2004 | Green et al. | |
| 2004/0143600 A1 | 7/2004 | Musgrove et al. | |
| 2004/0162742 A1 | 8/2004 | Stoker et al. | |
| 2004/0236666 A1 | 11/2004 | Clark et al. | |
| 2004/0243503 A1 | 12/2004 | Eng et al. | |
| 2005/0021527 A1 | 1/2005 | Zhang et al. | |
| 2005/0144052 A1 | 6/2005 | Harding et al. | |
| 2006/0265209 A1* | 11/2006 | Bradford | G06F 40/42 |
| | | | 704/9 |
| 2007/0112671 A1 | 5/2007 | Rowan | |
| 2007/0239577 A1 | 10/2007 | Grody et al. | |
| 2007/0239707 A1* | 10/2007 | Collins | G06F 16/35 |
| | | | 707/999.005 |
| 2007/0260521 A1 | 11/2007 | Van Der Riet | |
| 2008/0040329 A1 | 2/2008 | Cussen et al. | |
| 2008/0082528 A1 | 4/2008 | Bonzi et al. | |
| 2008/0120129 A1 | 5/2008 | Seubert et al. | |
| 2008/0162297 A1 | 7/2008 | Hershkovitz et al. | |
| 2008/0162347 A1 | 7/2008 | Wagner | |
| 2009/0144070 A1 | 6/2009 | Psota et al. | |
| 2009/0234814 A1 | 9/2009 | Boerries et al. | |
| 2009/0326995 A1 | 12/2009 | Sorisi et al. | |
| 2010/0094840 A1* | 4/2010 | Donnelly | G06Q 30/02 |
| | | | 707/E17.061 |
| 2011/0137705 A1 | 6/2011 | Srinivasan | |
| 2011/0173093 A1 | 7/2011 | Psota et al. | |
| 2012/0191619 A1 | 7/2012 | Gross | |
| 2012/0203708 A1 | 8/2012 | Psota et al. | |
| 2012/0278399 A1 | 11/2012 | Turner et al. | |
| 2013/0073464 A1 | 3/2013 | Magpayo et al. | |
| 2013/0268403 A1 | 10/2013 | Psota et al. | |
| 2013/0317954 A1 | 11/2013 | Psota et al. | |
| 2014/0053070 A1* | 2/2014 | Powers | G06F 3/0484 |
| | | | 715/708 |
| 2014/0095353 A1 | 4/2014 | Psota et al. | |
| 2014/0156513 A1 | 6/2014 | Psota et al. | |
| 2014/0258032 A1* | 9/2014 | Psota | G06Q 30/0609 |
| | | | 705/26.35 |
| 2015/0073929 A1 | 3/2015 | Psota et al. | |
| 2015/0134656 A1* | 5/2015 | Gandhe | G06F 16/3337 |
| | | | 707/736 |
| 2016/0179850 A1* | 6/2016 | Martin | G06F 16/278 |
| | | | 707/634 |
| 2016/0314010 A1* | 10/2016 | Haque | G06F 9/45558 |
| 2017/0091320 A1* | 3/2017 | Psota | G06F 16/313 |

FOREIGN PATENT DOCUMENTS

| | | |
|---|---|---|
| EP | 2212839 A4 | 6/2012 |
| EP | 2524299 A1 | 11/2012 |
| WO | WO2009065029 A1 | 5/2009 |
| WO | WO2011085360 A1 | 7/2011 |

OTHER PUBLICATIONS

Bilenko, et al., "Adaptive duplicate detection using learnable string similarity measures", Internet Citation, Aug. 2003 (Aug. 2003), XP002475117, Retrieved from the Internet: URL:http://citeseer.ist.psu.edu/bilenko03adaptive.html [retrieved on Apr. 4, 2008], Aug. 2003, 10 pages.

China Patent Office, "Application Serial No. CN200880124775.2, English and Chinese Translations, First Office Action dated Jul. 13, 2011", 19 pages.

China Patent Office, "Chinese Application No. 200880124775.2, Second Office Action dated Aug. 3, 2012", English translation and Chinese Translations, 13 pages.

China Patent Office, "Application Serial No. CN200880124775.2, English and Chinese Translations, Third Office Action dated Apr. 2, 2013", 7 pages.

China Patent Office, "Chinese Application Serial No. 200880124775.2, Fourth Office Action dated Feb. 8, 2014", English Translation, 7 pages.

China Patent Office, "Chinese Application No. 200880124775.2, Fifth Office Action dated Sep. 25, 2014", English translation, 4 pages.

China Patent Office, "Chinese Application No. 201180013496.0, First Office Action dated Dec. 3, 2014", English and Chinese Translations, 19 Pages.

CIPO, "Application Serial No. 2,742,395, 1st Office Action dated Feb. 18, 2015", 4 pages.

CIPO, "CA Application No. 2,742,395 Office Action dated Nov. 10, 2015", 3 pages.

Elmagarmid, AK. et al., "Duplicate Record Detection: A Survey", IEEE Transactions on Knowledge and Data Engineering, IEEE Service Center, Los Alamitos, CA, US, XP011151234, ISSN: 1041-4347 vol. 18, No. 1, Jan. 1, 2007, pp. 1-16.

EPO, "EP Application Serial No. 08850236.4, European Office Action dated Nov. 4, 2014", 6 Pages.

EPO, "EP Application Serial No. 08850236.4, European Search Report dated May 21, 2012", 7 pages.

EPO, "EP Application Serial No. 11732308.9, European Search Report dated Oct. 11, 2013", 3 pages.

Garcias, SM. et al., "Imnunization 1-15 Registries DeDuplication and Record Matching", INTERNET CITATION—Retrieved from the Internet: URL:www.imnunizationregistries.comjwhite papersj—WHP006A deduplication recordmatching.pdf [retrieved on Oct. 27, 2003], 1999, 12 pages.

Mooney M, R J. et al., "Adaptive duplicate detection using learnable string similarity measure", INTERNET CITATION, Aug. 2003 (Aug. 2003), XP002475117. Retrieved from the Internet: URL:http://citeseer.ist.psu.edu/bilenko03a daptive.html [retrieved on Apr. 4, 2008], Aug. 2003, 10 Pages.

"The Four Challenges of Customer-Centric Data Warehousing", INTERNET CITATION—XP002259648, Retrieved from the Internet: URL:http://www.ctiforum.com/technology/CRM jwhitepaperjdwo.pdf [retrieved on Oct. 27, 2003], Nov. 1998, 16 pages.

USPTO, "U.S. Appl. No. 12/271,593, Non-Final Office Action dated Oct. 14, 2010", 7 Pages.

USPTO, "U.S. Appl. No. 12/271,593, Final Office Action dated May 16, 2011", 11 pages.

USPTO, "U.S. Appl. No. 12/271,593, Notice of Allowance dated May 11, 2012", 8 pages.

(56) References Cited

OTHER PUBLICATIONS

USPTO, "U.S. Appl. No. 12/271,593, Notice of Allowance dated May 1, 2013", 20 pages.
USPTO, "U.S. Appl. No. 13/004,368, Non-Final Office Action dated Apr. 27, 2012", 12 pages.
USPTO, "U.S. Appl. No. 13/004,368, Notice of Allowance dated Jan. 8, 2013", 15 pages.
USPTO, "U.S. Appl. No. 13/343,354. Notice of Publication", Aug. 9, 2012, 1 page.
USPTO, "U.S. Appl. No. 13/343,354, Non-Final Office Action dated Mar. 15, 2013", 14 pages.
USPTO, "U.S. Appl. No. 13/343,354, Notice of Allowance dated Sep. 6, 2013", 19 pages.
USPTO, "U.S. Appl. No. 13/790,049, Non-Final Office Action dated Sep. 12, 2014", 18 pages.
USPTO, "U.S. Appl. No. 13/790,049, Non-Final Office Action dated Jan. 23, 2015", 13 pages.
USPTO, "U.S. Appl. No. 13/790,049, Final Office Action dated Jul. 10, 2015", 15 pages.
USPTO, "U.S. Appl. No. 13/906,007, Non-Final Office Action dated Oct. 20, 2014", 7 Pages.
USPTO, "U.S. Appl. No. 14/096,662, Non-Final Office Action dated Feb. 13, 2015", 20 pages.
USPTO, "U.S. Appl. No. 14/096,662, Final Office Action dated Oct. 1, 2015", 22 pages.
USPTO, "U.S. Appl. No. 14/097,474, Non-Final Office Action dated Feb. 2, 2015", 23 pages.
USPTO, "U.S. Appl. No. 14/097,474, Final Office Action dated Sep. 15, 2015", 12 pages.
USPTO, "U.S. Appl. No. 14/205,058, Non-Final Office Action dated Jan. 28, 2015", 17 pages.
USPTO , "U.S. Appl. No. 14/488,401, Non-Final Office Action dated Jan. 15, 2015", 17 pages.
USPTO, "U.S. Appl. No. 14/488,401, Final Office Action dated Jun. 18, 2015", 17 pages.
WIPO, "International Application Serial No. PCT/US2008/083623, Search Report and Written Opinion dated Apr. 16, 2009", 12 Pages.
WIPO, "International Application Serial No. PCT/US2011/20807, Search Report and Written Opinion dated Apr. 20, 2011", 10 Pages.

* cited by examiner

| Prediction | Reference | | | | | |
|---|---|---|---|---|---|---|
| | | 1214 | 2309 | 2507 | 3402 | 3824 |
| | 1214 | 100 | 50 | 0 | 0 | 0 |
| | 2309 | 0 | 30 | 10 | 0 | 0 |
| | 2507 | 0 | 1 | 40 | 1 | 0 |
| | 3402 | 0 | 0 | 0 | 60 | 1 |
| | 3824 | 3 | 0 | 0 | 0 | 50 |

X Wholesale

ALL LOCATIONS ▼ UNITED STATES ▼  BUYER ✓        ★ SAVE PROFILE  ⬇ GROUP  SHARE

| Summary | Analytics | Shipments | Suppliers | Corporate | News | Contact |

| 2015-08-20 | Company1<br>Asaka, Japan<br>+81 8148486230 1 | 15,920 KG<br>(15.9 MT) | USED CARS- USED VEHICLES CARCOMPANY1<br>WISH ZNE10-03<br>CAR COMPANY1 WIND<br>OM MCV30-6040813 CAR COMPANY1 VITZ SCP90-5035642 | Classified 8703 Vehicles other than railway or tramway rolling stock, and parts and accessories thereof. Motor cars and other motor vehicles principally designed of persons (other than those of heading 8702), including station wagons and racing cars. |

FIG. 3B

X Wholesale

ALL LOCATIONS • UNITED STATES ▼ | BUYER ✓ | ★ SAVE PROFILE | ⤓ GROUP | SHARE

| Summary | Analytics | Shipments | Suppliers | Corporate | News | Contact |

Commodity Description SHIPMENT SEARCH > CONSOLIDATED VIEW > UNITED STATES IMPORTS

8703

Edit advanced search...or clear Shipments 40k | Trends | Consignee | Shipper | More reports

| Data Range | SHIPMENT RECORDS | KILOGRAMS | TEU |
|---|---|---|---|
| 2007-07-01  2015-08-20 | 40,249 | 2,401,988,908 | 44,826 |

▦ 5 of 38 Fields Shown        ★ Save Search ⤓ Export Results

Bill Type
☐ House (4,567)
☐ Master (5,166)
☐ Simple (30,516)

| Arrival Date | Shipper | Weight | Container info | HTS Codes ⓘ |
|---|---|---|---|---|
| | | | Commodity Description | |
| 2015-08-20 | Company 2 | 39,117 KG (39.1 MT) | ADAPTER SLEEVES AUTO TENSIONER UNIT, BALL BEARING - DETAILS AS PER ATTACHED SHEET - INVOICE NO 8703-7040 8705-7019 (121 PL(2,111 C T & 5 C S) & 10 C S) | Classified 8482 |
| 2015-08-20 | Company 3 | 17,616 KG (17.6 MT) | Show 3 more containers GOLF CARTS, SNOWMOBILES 48 STEEL SKIDS (48 UNITS) HS CODE 8703.10 COMPANY 3 SNOWMOBILES | Parsed 8703.10 |

Sort by [Arrival Date (newest first) ▼]

Country of Origin
☐ Japan (24,323)
☐ Germany (5,732)
☐ Canada (1,088)
☐ Mexico (1,004)
☐ South Korea (938)
Show more...

Port of Lading
☐ Kanda (8,302)
☐ Bremerhaven (5,131)
☐ Yokohama (4,071)

FIG. 7B

COMPANY X

ALL LOCATIONS • UNITED STATES ▼    SUPPLIER ✓    ★ SAVE PROFILE  ⬇ GROUP  SHARE

| Summary | Analytics | Shipments | Suppliers | Corporate | News | Contact |

| 2015-01-05 | American Honda Motor Co.<br>Torrence, California, United States<br>✉ mailto:tosh_muraviov@a...<br>✉ halterman@ahm.honda.com<br>📞 +1 310-783-2000 | Jf Hillebrand Mexico Sa De Cv On<br>Jalisco, Mexico<br>📞 +52 33 3284 0000 | Maritime | Mexico | United States | 855657 | 3000CM3 | Automobile Honda Fit 5 D Ex Model Year 2015 5 Doors; Ka Model: Gk5 H8 Fj 1997 C. C. Hs Code: 8703. 22. 0000 | (8703)  (US Imports -38 fields available) |
| 2015-01-05 | A&B Automotorizs De Rl De Cv<br>Tijuana, Baja California, Mexico | | | Truck | United States | Mexico | 1814.0 | | VEHICULO USADO PARA EL TRANSPORTE OF PERSONAS | (8703.24.02)  (Mexico Imports -74 fields available) |

FIG. 7D

NATURAL LANGUAGE PROCESSING FOR ENTITY RESOLUTION

CROSS-REFERENCE TO RELATED APPLICATIONS

This application claims the benefit of U.S. Provisional Application 62/212,966 titled "NATURAL LANGUAGE PROCESSING OF CUSTOMS TRANSACTION RECORDS FOR CLASSIFICATION," filed on Sep. 1, 2015 (PANJ-0007-P01), which is incorporated by reference in its entirety herein.

BACKGROUND

The present disclosure relates to, without limitation, natural language processing (NLP) and operations to make certain data operations more efficient and reliable, and, more particularly, relates to methods and systems of NLP in a self-learning environment to facilitate analysis and categorization of customs records.

Large data sets with content that can be categorized into hundreds, thousands, or greater numbers of categories, present challenges to even the most capable data analysis systems. When such large data sets are frequently updated, maintaining coherent, consistent, and useful categorization of content becomes significantly complex. Further complicating this situation is the presence of a variety of different languages in the large data sets. Also, inconsistent use of structured fields, inconsistency in terminology use, differences in meaning for a given term across languages, dialects, industries, domains of expertise, and the like, make effective use of data sets, such as data sets of international customs transaction records, quite challenging.

Users of customs systems often attempt to obfuscate or at least minimize disclosures for customs purposes to avoid over exposure of content value, and the like, making the challenge of properly identifying content of international shipments for classification and analysis yet still more challenging.

SUMMARY

Insights derived from customs records may provide great benefit to a wide range of businesses, individuals, governments, and the like. Yet even widely known standards, such as the Harmonized Tariff Schedule (HTS) are often misused, underutilized, or simply ignored in international shipping records, such as customs transaction records. Even proper use of HTS categories may lead to inaccurate conclusions about content, value, volume, weight, container type, and the like of an international shipment, at least because of the degree of flexibility inherent in the HTS. References to HTS categories (which are used in the US), should be appreciated, except where context indicates otherwise, to encompass other types of categories, such as used by other countries, such as HS (Harmonized System) categories, as well as other types of categories used in product ontologies of various types (e.g., UPC categories and the like). Among other benefits, HS category analysis, by allowing language independent analysis, allows unification, through a single interface, of searches across many different data sets, including data sets in different languages, such as customs records of foreign countries.

HTS categories may be highly valuable to understanding and impacting a wide range of aspects of commerce including: business profiling (e.g., what a business does can be predicted by what it sells or buys based on HTS categories contained in its shipping records); validation of customs records labeling (by comparing user reported HTS categories with prediction of an HTS category for a given shipment, governments can collect proper import/export fees); HTS code/label generation (e.g., through analysis of customs transaction records, including historical data for companies, third-parties, and geolocation, a specific HTS category may be recommended and/or generated for a shipment); customs record data searching (by removing dependency on keyword matching, users can better search customs records for buyers, suppliers, shippers, banks, and the like as well as perform a wide range of macro-level analysis on shipments); as an alternative to shipping analysis (customs data can be presented in a guided, hierarchical format that facilitates exploration of international trade that is independent of language); customs value estimating (value may be estimated during preparation of a shipment as well as during customs processing that may facilitate customs organizations to target enforcement resources and efforts efficiently); shipment weight estimating (with historical data and an assigned value, an estimate of a shipment's weight can be generated); shipment container type/size estimating (companies can utilize such analysis to operate aspects of a shipping operation); mapping goods flows in real or near-real time around the world; reducing international shipping costs (by facilitating selection of a proper but power tariff HTS code, suppliers can reduce costs); determining cross-language synonyms (by identifying equivalent meaning words or phrases in different languages, it is possible to develop domain-specific languages that are agnostic of a language used in such commerce); and the like.

The methods and systems described herein apply natural language processing (NLP) in a self-learning environment to facilitate analysis and categorization of customs records from the typically terse, phrase-like content found in customs transaction records, including at least free-form text portions of these records. Natural language processing algorithms may include statistical language understanding techniques, similarity-matching algorithms, domain-specific (e.g., category-to-HTS code) algorithms, and the like.

Language agnostic processing of free text fields of shipment records (e.g., customs transaction records) with a natural language processing algorithm, such as those described herein, which may be adapted to apply word-stemming, singularize words, syllable and character-sequence analysis such as part numbers, abbreviations, internal identifications, etc., and/or count similarity-matched words, may facilitate categorizing international shipments into distinct HTS categories, such as through prediction of one or more HTS categories that represent content of the shipments. Such prediction, categorization, and the like may be independent of the presence of HTS code(s) in the customs records. Further, using the methods and systems described herein, it is possible to determine an HTS category that more precisely reflects the content of a shipment across a range of parameters (e.g., value, weight, volume, market vertical, composition/materials used in the goods being shipped, buyers, supplier, and the like) than an HTS category found in a customs record. HTS category assignment and/or prediction may be influenced by factors such as country of origin, such as using automated/machine learning of associations of HTS categories with geolocations and/or using frequency-based relationships, such as based on correlation metrics. Such approaches can form the basis for sophisticated technical solutions that provide the benefits and capabilities described above and elsewhere herein without requiring preconfigured analysis rules and the like.

The methods and systems of rating entities described in Exhibit 1 filed herewith may be enriched through application of the natural language processing methods and systems described herein. In an example, determining an entity for a customs shipment may be simplified by determining shipment categories and narrowing the candidate entities to those with historical association to the determined shipment content category, predicting an HTS category and limiting entity determination to entities that have been previously determined to be associated with the predicted HTS code, and the like. Similarly, shipment data may be aggregated by predicted HTS code, determined category and the like to form a product vertical view of customs transaction for a plurality of shipments across a plurality of suppliers and across a plurality of languages. These and other uses of natural language processing of customs records are described herein but are not limited thereto.

Natural language processing has generally been applied to human language content, such as full sentences of prose or speech, rather than to non-natural language content, such as the terse, jargon-laden, multiple-language content that characterizes customs transaction records. The methods and systems described herein process very large quantities (e.g., millions or more) of customs transaction records with self-learning algorithms to establish prediction models that facilitate resolving HTS classification of international shipments based on natural language processing of at least the free text found in customs records for the shipments. Unlike conventional natural language processing, which typically focus on processing prose in a known field of a data set, in the methods and systems disclosed herein, the free text of customs records may be found and processed across a plurality of individual record fields within a single customs record or across a set of customs records. In some cases, these fields may lack full sentences and may even lack complete words that are used in typical natural language communication; for example, they may include fewer than ten words, fewer than five words, fewer than three words, or even contain as few as one or two abbreviations or acronyms that are not even defined in non-technical dictionaries. Likewise, customs records for shipments of similar goods may be prepared in a variety of languages. Shipments of sweaters from Vietnam may be prepared in Vietnamese, whereas sweater shipments from Hungary may be prepared in Hungarian. Therefore the natural language processing algorithms that can be beneficially applied in a customs transaction record environment may require language agnostic capabilities.

The methods and systems described herein may also facilitate validating user-specified declaration of the customs value of international shipments through natural language processing of free text fields of customs records with a natural language processing algorithm that is adapted to apply word-stemming, word-singularizing, syllable and character sequence analysis, and/or similarity-matched word counting and the like to categorize international shipments into distinct HTS categories that represent the content of the shipments.

The methods and systems described herein may facilitate determining or estimating a value of a shipment by applying the weight of the shipment into a customs declaration determination algorithm that leverages the HTS category analysis and self-learning algorithms and resulting prediction models described herein. Likewise, a volume or weight of a shipment may be predicted by determining an HTS category (e.g., using the methods and systems described herein); processing this HTS category with a value of a shipment; then predicting a volume for the shipment. This may be effectuated through a variety of approaches, including a self-updating matrix that maps HTS category and value to weight, volume, and the like.

The methods and systems described herein may facilitate providing ongoing visualization of the flow of goods, commercial activity, movement of an economy (such as of a country or region), activities of or within cyclical marketplaces, impacts of natural and other disasters, and a wide range of macro-level and micro-level (e.g., company-specific or country specific) views based on natural language processing described herein of current and historical customs records. Such visualization can be produced without requiring any language-to language translation of source data (e.g., customs transaction records). In an example, a method including providing a user interface presenting real-time visualization of the flow of goods currently being shipped between countries based on automated analysis of the natural language content of a plurality of customs transaction records that contain content in a plurality of languages may utilize the similarity-matching natural language processing methods and systems described herein. In the example, the visualization may be independent of languages used in the customs transaction records.

The methods and systems described herein may facilitate searching, rating, and further analysis of marketplaces, countries, entities, and the like that may use international shipments so that such searching and the like is independent of the native language of the searcher and the records being searched. Further independence from language-based correspondence of a search keyword input by a user with the customs records being searched may be achieved through the HTS generation, synonym-identifying and customs records classification techniques described herein. This may free up a user to focus on desired results, rather than attempting to master international jargon, unusual acronyms, and country-specific or domain-specific use of terminology for customs records.

The methods and systems described herein may facilitate determining an HTS category for a planned, current, or prior international shipment through use of the similarity-matching natural language processing and learning techniques described herein, along with country-specific knowledge related to, for example, predominant exporting industries. As an example, certain HTS categories for gears may be associated with exports from Germany but not from Honduras; HTS categories for palm oils may be associated with exports from Vietnam, but not from Iceland. Many other such examples can be described. These HTS code-to-country relationships may be learned from historical and ongoing customs transaction records, as well as domain specific research, and may be reflected in a set of definitive rules (excluding certain categories for certain countries) or may be used as a basis for probabilistic determination of the likelihood that a given HTS category is applicable for a shipment from a given country (but not expressly ruling out an unusual association). These relationships can further facilitate optimizing determination of an HTS category for any given shipment from a country with an affinity for certain HTS categories.

The methods and systems of natural language processing of customs transaction records may include similarity-matching natural language processing algorithms that perform calculations based on the frequency of terms (understood to include character sequences, syllables, words, and other linguistic formulations) used in large numbers of documents. In an example, processing the plurality of transactions records comprises processing more than 100,000 records in less than 3 minutes on 10 cores.

Techniques described herein may follow a multi-step process that may be iterated one or more times based on desired outcomes and intermediate results. In an exemplary multi-step process for resolving an international shipment contents to a specific HTS code, a first step may include preparing a first state of a model of the source data, including generating and utilizing a term frequency matrix that may be augmented with information such as country of origin of a shipment, a container serial number and/or type, and/or usage history, and/or weight. A goal of such a first step is as input for prediction of a likelihood that a given shipment belongs to each category.

A second step may include generating and evaluating the second state of the model of the data, wherein the second state is an output of the first step activity. This step builds models based upon the confidence scores of the output of the first step. These models use the full signature of all the first stage models as inputs, learning which first stage models are more accurate than others, as well as which combined confidence-score signatures of first stage models indicate a given category. In a hypothetical example, a high confidence score from the first stage for categories for "autos," "trucks," and "auto parts" may indicate that the correct category is "truck parts," even in the case of a poorly functioning "truck parts" model.

A third step is an analysis of common errors from the second step. Such analysis may reveal that an excessive number of unresolved potential classes/groups still exist. Some examples include "oil" customs shipment records that may be mangled together (motor oil, crude oil, suntan oil, cooking oil, and the like); thereby leaving too many unresolved classes/groups of oil. In such an example, applying models to different manifestations of natural language processed terms for oil could reveal the nature of the unresolved classes. Refining the model of the data further through additional natural language processing for HTS categorization may be performed. This step of evaluating and refining may continue as needed until the number of unresolved classes/groups falls below a threshold. This threshold may be dependent on learning from processing of prior customs records data sets and/or information known about HTS groups. As an example, if there is only one HTS category for "beans," then further refinement of customs records that have a large number of unresolved "beans" terms may not be performed, at least for generating a more precise HTS code.

This natural language processing for both learning and refining HTS category models may be enhanced through error detection and correction, such as detection and correction of common errors. As an example, detection of essential oils and petroleum oils as comparable for HTS category purposes may be detected as a common type of error that can be corrected in the model to improve use of the model.

A method for automatically transforming a plurality of electronic public transactional records to predict a category, the method according to one disclosed non-limiting embodiment of the present disclosure can include collecting, via a computer implemented facility having one or more processors, a plurality of electronic public transactional records, each of the electronic customs transactional records including a plurality of distinct fields of data and at least one free text field associated with at least one of a party to an international transaction and a content of the international transaction; transforming, via at least one of the one or more processors, the plurality of electronic public transactional records into a unified transaction record format by processing the at least one free text field with a category natural language processing algorithm; and determining, via at least one of the one or more processors, a plurality of candidate categories associated with the international shipment based on the content of the free text field.

A further embodiment of the present disclosure may include, determining a best fit of the plurality of candidate categories to a transaction by comparing the candidate categories for one of the plurality of electronic customs transactional records with transaction metadata.

A further embodiment of any of the embodiments of the present disclosure may include, predicting a category or categories for the one record of the plurality of electronic customs transactional records based on the determined best fit and independent of a category already being present in the one record.

A further embodiment of any of the embodiments of the present disclosure may include, wherein determining a best fit includes weighting based on terms present in the metadata using a similarity-matching natural language processing algorithm.

A further embodiment of any of the embodiments of the present disclosure may include, wherein determining the best fit includes weighting based on a determined country of origin of the shipments.

A further embodiment of any of the embodiments of the present disclosure may include, wherein weighting includes weighting the transaction metadata.

A further embodiment of any of the embodiments of the present disclosure may include, determining at least one of a buyer and a supplier for an international shipment transaction that is documented with a customs transaction record for which the buyer, supplier, and/or other entity information identification has been redacted by assigning natural language processing generated categories for the international shipment using a data set of international shipment categories of entities that facilitates mapping at least one of buyers, suppliers, and other entities to international shipment content, wherein the dataset includes data derived from a plurality of customs transaction records using the natural language processing algorithm.

A further embodiment of any of the embodiments of the present disclosure may include, wherein predicting a category includes applying learned country-to-category frequency-based relationship data to prioritize certain categories for the one of the plurality of electronic customs transactional records.

A method for predicting a value of a shipment, according to another disclosed non-limiting embodiment of the present disclosure can include predicting, via one or more processors, a category or categories for a shipment through best-fit matching of categories derived by natural language processing of free text fields including a declared customs transaction value associated with the shipment; gathering, via at least one of the one or more processors, a characteristic of the shipment; predicting, via at least one of the one or more processors, an expected value of the shipment by processing the characteristic of the shipment with an algorithm to assign a value; and displaying on a computer screen, via the at least one of the one or more processors, the predicted value from the algorithm.

A further embodiment of any of the embodiments of the present disclosure may include, recommending a type of container for the shipment by processing with the processor a container type recommendation algorithm that uses as input the gathered weight and at least one of the declared customs value and the expected customs value.

A further embodiment of any of the embodiments of the present disclosure may include, recommending a target container volume by selecting a container volume from a data set that facilitates relating at least one of the declared customs value and the expected customs value to container volume for each of a plurality of categories.

A further embodiment of any of the embodiments of the present disclosure may include, selecting a category based on the similarity of a search keyword to the category metadata and searching for customs transaction records that correlate to the search keyword by comparing the selected category metadata to NLP generated categories for a plurality of customs transaction records A further embodiment of any of the embodiments of the present disclosure may include, wherein the algorithm accesses a data store of normalized category customs values.

A further embodiment of any of the embodiments of the present disclosure may include, wherein the algorithm leverages predictive regression.

A further embodiment of any of the embodiments of the present disclosure may include, wherein the characteristics of the shipment include at least one of a predicted category, the weight, free text fields, and other meta-data associated.

A computer-implemented method for presenting a real-time visualization of the flow of goods, the method according to another disclosed non-limiting embodiment of the present disclosure can include analyzing, via one or more processors, a natural language content of a plurality of customs transaction records; and displaying on a computer screen, via the at least one of the one or more processors, a user interface presenting a real-time visualization of a flow of goods currently being shipped between countries based on the automated analysis of the natural language content.

A further embodiment of any of the embodiments of the present disclosure may include, wherein the visualization is independent of a plurality of languages in the customs transaction records.

A further embodiment of any of the embodiments of the present disclosure may include, wherein the analyzing is driven by categories derived from the customs transaction records via a category natural language processing algorithm that facilitates identifying suppliers of the product by correlating a search term to a candidate category and searching suppliers who have been categorized as supplying products under the candidate code.

A further embodiment of any of the embodiments of the present disclosure may include, displaying a search term entry window on the display for receiving a keyword in accordance with a name of a buyer or a supplier of the plurality of customs transaction records.

A further embodiment of any of the embodiments of the present disclosure may include, displaying a search term entry window on the display for receiving a keyword in accordance with a category of the plurality of customs transaction records.

A further embodiment of any of the embodiments of the present disclosure may include, wherein the natural language processing to categorize international shipment contents reduces computation demand during category matching by reducing the number of potential matches.

A further embodiment of any of the embodiments of the present disclosure may include, wherein applying country of origin of an international shipment to a category prediction algorithm improves computer performance by reducing the computation demand through limiting candidate categories.

A further embodiment of any of the embodiments of the present disclosure may include, wherein the natural language processing algorithm is a similarity-matching natural language processing algorithm that performs calculations based on the frequency of terms used in large numbers of documents.

A further embodiment of any of the embodiments of the present disclosure may include, wherein processing the plurality of transactions records comprises processing more than 100,000 records in less than 3 minutes on 10 cores.

A further embodiment of any of the embodiments of the present disclosure may include, wherein improving the field of language translation includes building a word translation memory of acronyms, abbreviations, and industry-specific jargon, for a plurality of distinct languages through association of the words in the plurality of languages for a given code.

A method of machine learning algorithm generation for an algorithm operable to analyze a plurality of electronic transactional records to predict a category from a record, the method according to another disclosed non-limiting embodiment of the present disclosure can include assembling, via a computer implemented facility having one or more processors, a plurality of records that have categories; dividing, via at least one of the one or more processors, the records categories into a multiple of training sets; generating, via at least one of the one or more processors, a first set of one vs. all models using term frequency upon a first training set of the multiple of training sets; generating, via at least one of the one or more processors, a second set of one vs. all models using confidence scores from the first set of one vs. all models upon a second training set of the multiple of training sets; identifying, via at least one of the one or more processors, common errors when classifying a third training set of the multiple of training sets using the first set of one vs. all models then the second set of one vs. all models; and generating, via at least one of the one or more processors, specialized augmented term frequency matrices and all-vs.-all models specific to and for correcting the identified common errors.

A further embodiment of any of the embodiments of the present disclosure may include, assessing, via at least one of the one or more processors, performance of a procedure on a fourth training set of the multiple training sets.

A further embodiment of any of the embodiments of the present disclosure may include, utilizing the natural language processing output with the confidence scores.

A further embodiment of any of the embodiments of the present disclosure may include, utilizing metadata with the confidence scores.

A further embodiment of any of the embodiments of the present disclosure may include, further comprising, utilizing the term frequency and shipment data.

A further embodiment of any of the embodiments of the present disclosure may include, wherein the shipment data includes at least one of weight, country of origin, and month of year.

A further embodiment of any of the embodiments of the present disclosure may include, wherein the categories are at least one of mined, extracted, or provided in a structured field.

An example embodiment is a method including operations to interpret at least two data records, each having a number of data fields, to determine a number of n-grams from terms of each of the data records, to map the n-grams to a corresponding number of mathematical vectors, to determine whether a similarity value between a first mathematical vector including a first term of a first one of the data records and a second mathematical vector including a second term of a second one of the data records is greater than a threshold similarity value, and to associate the first one of the data records with the second one of the data records in response to the similarity value exceeding the threshold similarity value. Example embodiments of the described method further include one or more operations including determining that the first term is related to the second term in response to the similarity value exceeding the threshold similarity value; determining that the first term is synonymous with the second term in response to the similarity value exceeding the threshold similarity value; and/or where the first term and the second term correspond to entity identifiers for the data records. Example embodiments of the described method further include providing a catalog identifier and associating each of the first term and the second term to the catalog identifier, where in certain embodiments the catalog identifier matches the first term and/or the second term. In certain further embodiments, the n-grams include an n value of at least two, and/or the method includes determining that a number of the data records correspond to a first entity, where determining the similarity value is further in response to determining the records correspond to the first entity. In certain further embodiments, the method includes determining that a first set of a number of the data records correspond to a first entity, determining that a second set of the number of the data records correspond to a second entity, and the determining the similarity value further in response to shared terms from the first set and second set of the data records; providing a summary of activity for an entity in response to the associating; and/or determining that the first term is related to the second term in response to the similarity value exceeding the threshold similarity value, where the first term and the second term each correspond to an entity identifier for the data records, providing a catalog entity identifier, and associating each of the first term and the second term to the catalog entity identifier.

An example embodiment is an apparatus including a data access circuit that interprets at least two data records, each having a number of data fields, a record parsing circuit that determines a number of n-grams from terms of each of the data records and maps the number of n-grams to a corresponding number of mathematical vectors; a record association circuit that determines whether a similarity value between a first mathematical vector including a first term of a first one of the data records and a second mathematical vector including a second term of a second one of the data records is greater than a threshold similarity value, and associates the first one of the data records with the second one of the data records in response to the similarity value exceeding the threshold similarity value. In certain further embodiments, the described apparatus includes the at least two data records having transactional records; the transactional records may include customs transaction records. In certain further embodiments, the n-grams include words from at least two distinct languages; at least one of the first term and the second term include a numeric value, an abbreviation, a term including jargon, an acronym, and/or an initialization; and/or the data records include a number of fields, where at least one of the fields includes a shortened phrase, and where the shortened phrase includes a non-grammatical phrase, a phrase incorporating at least two distinct languages, an abbreviation, a term including jargon, an acronym, and an initialization. In certain further embodiments, the apparatus includes a reporting circuit that provides a summary of activity for an entity, determines that the first term is related to the second term in response to the similarity value exceeding the threshold similarity value, where the first term and the second term each correspond to an entity identifier for the data records, that provides a catalog entity identifier, and associates each of the first term and the second term to the catalog entity identifier.

An example embodiment is a system includes a data access circuit that interprets at least two data records, each having a number of data fields, a means for mapping a number of n-grams for each of the data records to a corresponding number of mathematical vectors, a means for associating a first one of the data records to a second one of the data records in response to the mapping, and a reporting circuit that provides a summary of activity for an entity in response to the associating. In certain further embodiments of the described system, the system includes a means for enhancing the associating in response to a number of data records associated with a first entity, a means for enhancing the associating in response to a number of data records each associated with one of a number of entities, and/or a means for associating a catalog identifier to each of the first term and the second term. Certain further embodiments of the described system include at least one of the first term and the second term having a numeric value, an abbreviation, a term including jargon, an acronym, and/or an initialization; and/or the data records including a number of fields, where at least one of the fields includes a shortened phrase, where the shortened phrase includes a non-grammatical phrase, a phrase incorporating at least two distinct languages, an abbreviation, a term including jargon, an acronym, and an initialization.

An example embodiment is a method including an operation to interpret a query value, to interpret a first data record having at least one first property value and a second data record having at least one second property value, to store the first and second property values in a first memory location, to operate a scoring model on the query value and the first property value to determine a first score value corresponding to the first property value, in response to the first property value having the same value as the second property value, to determine that a second score value corresponding to the second property value has the same value as the first score value, without operating the scoring model on the second property value, and to store the first score value and the second score value. Certain further embodiments of the described method include an operation to interpret a third data record having at least one third property value, to store the third property value in the first memory location, and in response to the third property value having the same value as the second property value, to determine that a third score value corresponding to the third property value has the same value as the second score value, without operating the scoring model on the third property value. An example embodiment of the method includes an operation to, in response to the first property value having the same value as the second property value, further store a comparison indicator between the first data record and the second data record in the second memory location, to interpret a third data record having at least one third property value, storing the third property value in the first memory location, and in response to the third property value having the same value as the second property value and further in response to the comparison indicator, to determine that a third score value corresponding to the third property value has the same value as one of the first score value and the second score value, without operating the scoring model on the third property value. An example embodiment of the method further includes interpreting a fourth data record having at least one fourth property value, and comparing the fourth property value to at least one of the first and second property values from the first memory location, and/or operating the scoring model on the query value and the fourth property value to determine a fourth score value, and comparing the fourth score value to at least one of the first and second score values from the first memory location. An example further embodiment of the method includes operating the scoring model on the query value and the second property value to determine a second score value, determining a difference between the first property value and the second property value, determining a similarity index between the first property value and the second property value in response to the difference between the first property value and the second property value, and adjusting the second score value toward the first score value in response to the similarity index. In certain further embodiments, the adjusting the second score value includes determining the first property value and the second property value are likely to have a same intended value, and adjusting by making the second score value equal to the first score value. In certain further embodiments, the method includes interpreting a third data record having at least one third property value and a fourth data record having at least one fourth property value, operating the scoring model on the query value and the third property value to determine a third score value, operating the scoring model on the query value and the fourth property value to determine a fourth score value, determining a difference between the third property value and the fourth property value, determining a second similarity index between the third property value and the fourth property value in response to the difference between the third property value and the fourth property value, and adjusting the third score value in response to the second similarity index. In certain further embodiments, the method includes determining the second similarity index is similar to the similarity index, and where the adjusting the fourth score value is further in response to the adjusting the second score value.

An example embodiment is a system including a query operation circuit that interprets a query value, a data access circuit that interprets a first data record having at least one first property value and a second data record having at least one second property value, and stores the first and second property values in a first memory location, and a data clustering circuit that operates a scoring model on the query value and the first property value to determine a first score value corresponding to the first property value, and in response to the first property value having the same value as the second property value, determines that a second score value corresponding to the second property value has the same value as the first score value, without operating the scoring model on the second property value, and stores the first score value, and the second score value. In certain further embodiments, the system includes a means for clustering a first set of data on a first processing thread, and clustering a second set of data on a second processing thread, where the first set of data includes the first data record and the second data record. In certain embodiments, the data clustering circuit further operates the model on the query value and the second property value to determine a second score value corresponding to the second property value, and the system further includes a means for adjusting the second score value in response to a similarity index between the first property value and the second property value; and/or the data access circuit further interprets a third data record having at least one third property value and a fourth data record having at least one fourth property value, and stores the third and fourth property values in the first memory location, where the data clustering circuit further operates the scoring model on the query value and the third property value to determine a third score value corresponding to the third property value, and operates the scoring model on the query value and the fourth property value to determine a fourth score value corresponding to the fourth property value, and the example system further includes a means for adjusting the fourth score value in response to a second similarity index between the third property value and the fourth property value, and further in response to the similarity index.

An example embodiment is a method including operations to interpret a number of data records, each data record having at least one identifying field and a number of characteristic fields, to determine a similarity signature in response to a first data record and a second data record, the first data record and the second data record having a matching identifying field, where the similarity signature is determined in response to the at least one corresponding characteristic field between the first data record and the second data record. Certain further embodiments of the described method include where the identifying fields of the first data record and the second data record are identical; adjusting the similarity signature in response to a third data record having a matching identifying field to the first data record and the second data record; determining a second similarity signature in response to a fourth data record and a fifth data record, comparing the second similarity signature to the similarity signature, and determining the fourth data record and the fifth data record have matching identifying fields in response to the comparing; where the operation determining the fourth data record and the fifth data record have matching identifying fields in response to the comparing includes identifying whether a number of matches between the similarity signature and the second similarity signature exceeds an identity matching value; and/or further adjusting the identity matching value in response to a third data record having a matching identifying field to the first data record and the second data record. In certain further embodiments the described method includes determining the fourth data record and the fifth data record have matching identifying fields in response to the comparing by identifying whether a number of similar fields between the similarity signature and the second similarity signature exceeds an identity matching value, the number of similar fields determined according to a number of corresponding fields that are within a similarity threshold value, and/or wherein the comparing utilizes a distinct value of the similarity threshold value for each of the fields between the similarity signature and the second similarity signature. In certain embodiments, the method further includes adjusting at least one similarity threshold value in response to a third data record having a matching identifying field to the first data record and the second data record; determining the fourth data record and the fifth data record have matching identifying fields in response to the comparing by determining an aggregate difference between the similarity signature and the second similarity signature, and determining the fourth data record and the fifth data record have matching identifying field in response to the aggregate difference being lower than an identity difference value; determining the aggregate difference between the similarity signature and the second similarity signature by performing at least one operation such as weighting each field difference between the similarity signature and the second similarity signature, applying a classification function to the differences between the similarity signature and the second similarity signature, and/or applying a neural network operation on the field differences between the similarity signature and the second similarity signature; and/or iteratively updating the aggregate difference determination in response to additional data records having a matching identifying field to the first data record and the second data record.

An example embodiment is a system including a data access circuit that interprets a number of data records, each data record including at least one identifying field and a number of characteristic fields, an entity identification circuit that determines a similarity signature in response to a first data record and a second data record, the first data record and the second data record having a matching identifying field, and that determines the similarity signature in response to at least one corresponding characteristic field between the first data record and the second data record. Certain further embodiments of the example system include the entity identification circuit further adjusting the similarity signature in response to a third data record having a matching identifying field to the first data record and the second data record, an entity prediction circuit that determines a second similarity signature in response to a fourth data record and a fifth data record, compares the second similarity signature to the similarity signature, and determines the fourth data record and the fifth data record have matching identifying fields in response to the comparing; the entity prediction circuit further determining the fourth data record and the fifth data record have matching identifying fields in response to the comparing by identifying whether a number of matches between the similarity signature and the second similarity signature exceeds an identity matching value; the entity prediction circuit further adjusting the identity matching value in response to a third data record having a matching identifying field to the first data record and the second data record; and/or the entity prediction circuit further determining the fourth data record and the fifth data record have matching identifying fields in response to the comparing by identifying whether a number of similar fields between the similarity signature and the second similarity signature exceeds an identity matching value, and determining the number of similar fields according to a number of corresponding fields that are within a similarity threshold value. In certain further embodiments, the described system includes the entity prediction circuit further comparing the similarity signature and the second similarity signature utilizing a distinct value of the similarity threshold value for each of the fields between the similarity signature and the second similarity signature; and/or the entity prediction circuit further adjusting at least one similarity threshold value in response to a third data record having a matching identifying field to the first data record and the second data record. In certain further embodiments, the described system includes the entity prediction circuit further determining the fourth data record and the fifth data record have matching identifying fields in response to the comparing by determining an aggregate difference between the similarity signature and the second similarity signature, and determining the fourth data record and the fifth data record have matching identifying field in response to the aggregate difference being lower than an identity difference value; the entity prediction circuit further determining the aggregate difference between the similarity signature and the second similarity signature by performing at least one operation such as weighting each field difference between the similarity signature and the second similarity signature, applying a classification function to the differences between the similarity signature and the second similarity signature, and/or and applying a neural network operation on the field differences between the similarity signature and the second similarity signature; and/or the entity prediction circuit iteratively updating the aggregate difference determination in response to additional data records having a matching identifying field to the first data record and the second data record.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 3B depicts a shipment categorization result.

FIG. 7B depicts a shipment search in the user interface.

FIG. 7D depicts a unified analysis of multiple data sets in different languages using HTS categories in the user interface.

DETAILED DESCRIPTION OF ILLUSTRATIVE EMBODIMENTS

Figure 1:
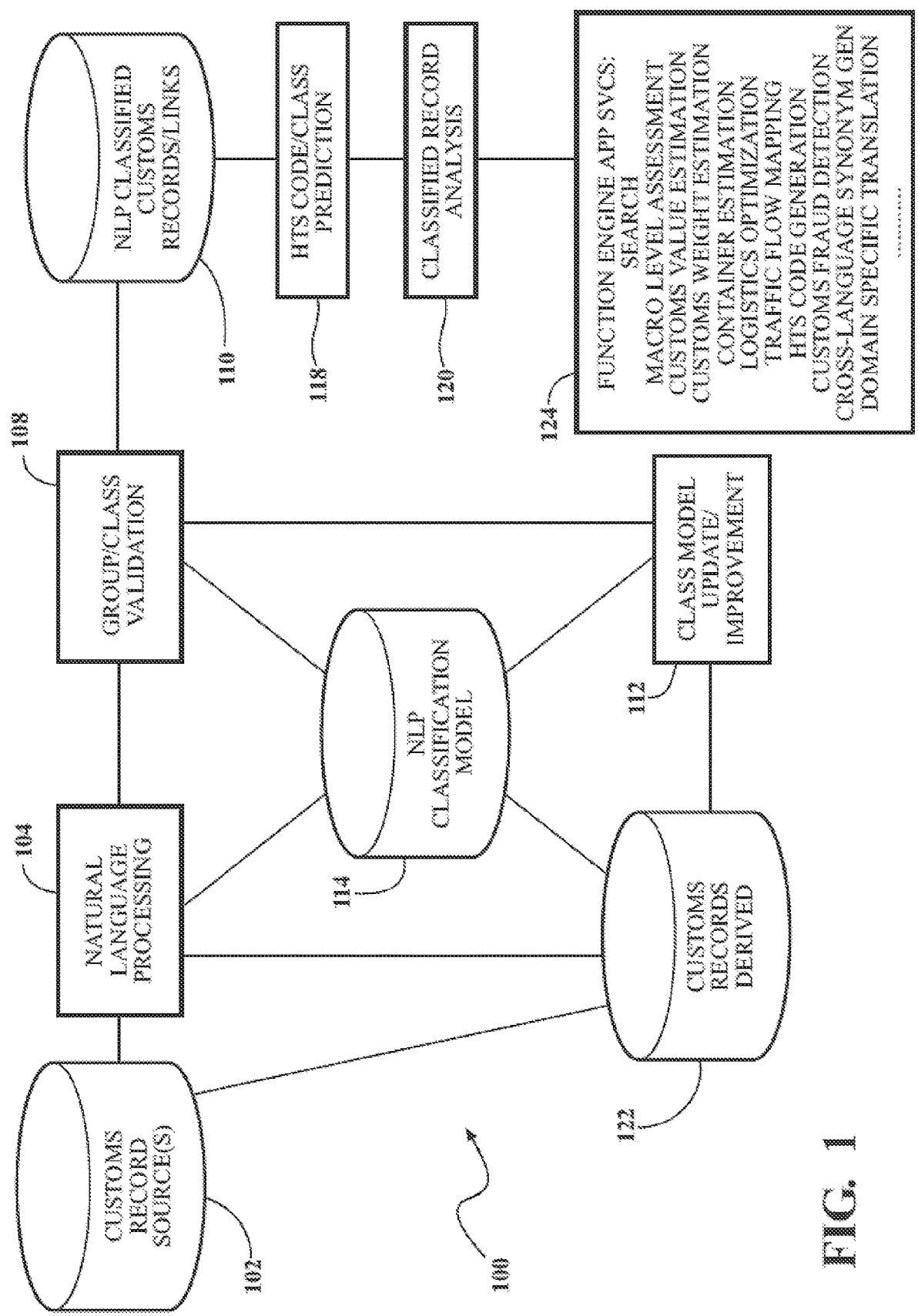
FIG. 1 depicts a system for natural language processing for classification.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety for all purposes. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the described embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Certain operations following are described as "interpreting" various data elements. An operation to interpret should be understood broadly, and includes making the data available through any method, including at least receiving, querying, requesting, sensing, detecting, and/or retrieving (e.g., from a memory location, network message, database, etc.) the data. Certain operations to interpret may include receiving manual input from a user, receiving data that is a precursor to the interpreted data element (e.g., a value from which the interpreted data element can be calculated or derived), or any other method of receiving or producing the data element understood in the art.

Certain system elements are described as "circuits" herein. A circuit is any configuration of hardware, sensors, actuators, input or output devices, networks, computer elements, logic circuits, and/or executable instructions stored on a computer readable medium (e.g., a non-transient readable memory location) which, when executed by a computer, cause the circuit to perform the functions or a portion of the functions of the circuit; any such configuration of elements that performs the operations of the circuit is contemplated herein. One of skill in the art, having the benefit of the disclosures herein and contemplating a particular system having information ordinarily available to that person of skill in the art about that system, will understand an appropriate structure or structures contemplated to perform the functions of the circuit. Example structures are provided herein in certain aspects to enhance the clarity of description, but example structures are not limiting and specific example structures are not needed in certain instances but the example and the scope of the circuit will nevertheless be clear to one of skill in the art. A given circuit may include a single device or multiple devices, and portions of various circuits may be shared on various devices.

With reference to FIG. 1A, a system 100 according to one disclosed non-limiting embodiment, provides for natural language processing of customs records. The classification results may be used to, for example, improve the classification process as well as to feed a function engine for delivering application-level services. It should be appreciated that although particular systems are defined as separate blocks, each or any may be otherwise combined or segregated via hardware and/or software including executable instructions on a computer readable medium of the system 100. In one embodiment, the system 100 may include an architecture that may use a multi-core processing machine (e.g., a large scale, 24 core Linux® machine, with high memory capacity installed solid state drives) that can rapidly read large numbers of HS-categorized records, such as received daily on disk from the US Customs department (e.g., tens of thousands or of records per day, and sometimes as many as 200,000 in a day). To facilitate rapid processing, records may be stored as matrices that are transformed into sparse matrix formats, such as to more efficiently allow matrix multiplication calculations. For example, to enable calculations, a term frequency matrix may have a row for each record that is being classified and columns that correspond to all words, combinations of words, or character combinations that might appear in a given document corpus from which an HTS category is being sought. There are many possible term columns (words, character combinations, or combinations of words), but the vast majority of terms do not appear in a particular customs record, so the TF (term frequency) is normally zero for the vast majority of the columns/words. In such a situation, the term frequency matrix can be transformed/stored in a format that uses special notation for the zeros, which allows much more rapid matrix multiplication; that is, treating a zero as a separate class of object greatly speeds up the calculations performed on the term frequency matrix. So, doing a sparse matrix calculation enables much more rapid processing of customs records than conventional processing methods. For example, the system can process 100,000 or more records on ten processing cores in a period of three minutes or less.

The records 102 may be sourced from a wide range of customs agencies, third parties, and the like, across many jurisdictions and languages. These records 102 may be processed by the natural language processing (NLP) engine 104 capabilities described herein. Output of the NLP engine 104 can be further processed by a class/group validation engine 108 that may indicate a need for further clarification of the classification produced through the NLP engine 104.

A group/class validation engine 108 may produce NLP classified data 110 that may include, or be logically and/or physically linked, to corresponding source customs records. Such NLP classified data 110 may include record-by-record metadata, HTS category related metadata, entity-related metadata, etc.

A class model update/improvement engine 112 may communicate with the group/class validation engine 108 to make and/or suggest improvements to the NLP function 104. Likewise an NLP classification model 114 may be referenced, and/or updated, as part of the class model update/improvement engine 112 operations. Likewise, an NLP classification model 114 may be accessed and/or maintained by the natural language processing engine 104, such as based on suggested improvements made by the class model update/improvement engine 112.

The NLP classified data 110 and associated classification metadata may be further processed by an HTS category prediction engine 118 that may attempt to predict at least one suitable HTS category for each customs record based at least in part on customs record derived data 122 that may include substantive historical or related real-time updated data from prior or ongoing customs record processing.

The predicted HTS for each record may be used by a classified record analysis engine 120 to prepare data for use by a wide range of application services. This prepared data may be used by a wide range of application services via, for example, a function engine 124 to derive a real-world impact/benefit from the processing described herein. Examples include producing search results with much less demand for computing resources, performing customs weight/value validation for collecting proper tariffs, optimizing logistics, detecting fraudulent HTS category use, and the like.

Figure 2A:
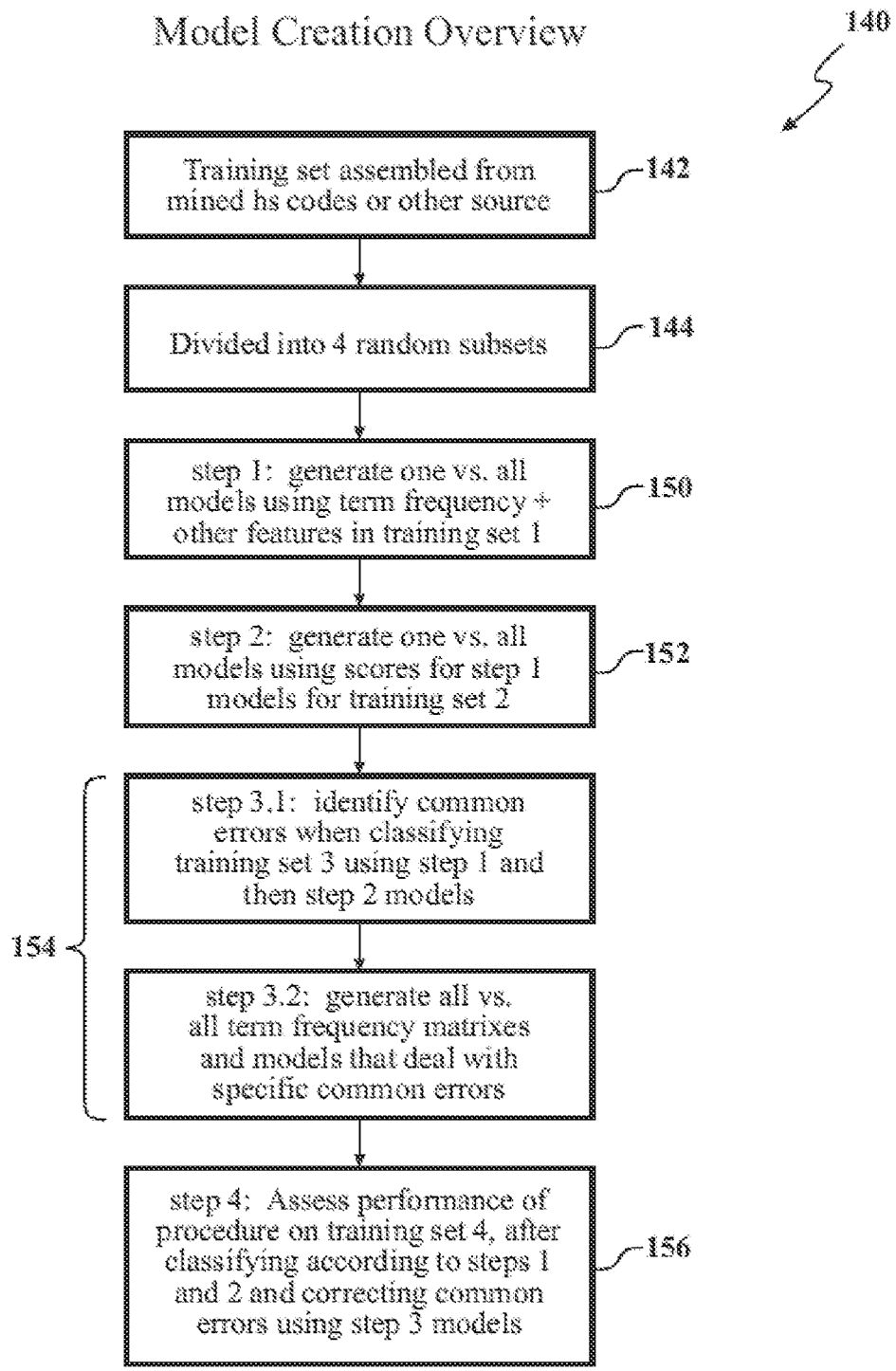
FIG. 2A depicts a method for natural language processing for classification.

With reference to FIG. 2A, the system 100, in one disclosed non-limiting embodiment, is operable to perform a classification method 140 that assigns categories to data that lacks such information. The functions of the classification method 140 are disclosed in terms of functional block diagrams and it should be appreciated that these functions may be enacted in either dedicated hardware circuitry or software including executable instructions on a computer readable storage medium capable of execution the instructions in a microprocessor based electronics control embodiment.

International Border Inspection System (IBIS)

An example embodiment includes machine-learning based assignment of categories to shipments in the field of international trade. This may be utilized to assign categories such as Harmonized System Categories (HS), US Harmonized Tariff System (HTS) categories, etc. to shipments that lack such information. HS categories are a general international product category system, of which the HTS is a subset.

The classification method 140 may, for example, be applied to identify shipments that have been misclassified, either deliberately to avoid tariffs, or by accident.

Categorization may also assist those involved in assigning categories to select the correct category. In addition to providing the correct category, a shortlist may be generated to facilitate labeling of shipments at scale to enable compliance work.

Categorization into common categories also facilitates unification of datasets in different languages, by assigning categories to all shipments missing this information.

Efficient search and analysis across datasets is also facilitated that would not be possible using the free text descriptions due to language differences. This thereby assists, for example, trade lane analysis, port analysis, company/competitor analysis, etc.

The categorization method may also be applied for name redaction reversal of shipments in which one or both of the involved parties' names are missing, either through redaction or for other reasons, can reverse this redaction and provide a company name to assist trade lane analysis, competitor analysis, and logistics analysis.

In addition, company industry categorization can be assigned by the categorization method based upon their information to industry categories, such as SIC or NAICS. In other words, any omitted or completely missing field for which a training set can be found can be completed.

Further, such categorization can be utilized to categorize free text data on diseases into specific categories, etc.

Machine Learning Algorithm Training

The classification method 140 is operable to predict one of the thousands of categories to free-text records such as HS Categories, HTS categories, or other datasets that involve some sort of categorization, such as by categories (e.g., NAIC categories, SIC categories, UPC categories, health care categories, insurance category categories, product categories, and many others) or other categories (for example involved parties), where the data sets may have a very large range of possible words that can appear in one or more fields of a record, such that any given word is not very likely to appear in a particular record. Such datasets may be more valuable or may be utilized for more purposes with such fields and/or category categories completed than when lacking this information. The classification method 140 is language agnostic and may be performed on records across any language.

Figure 2B:
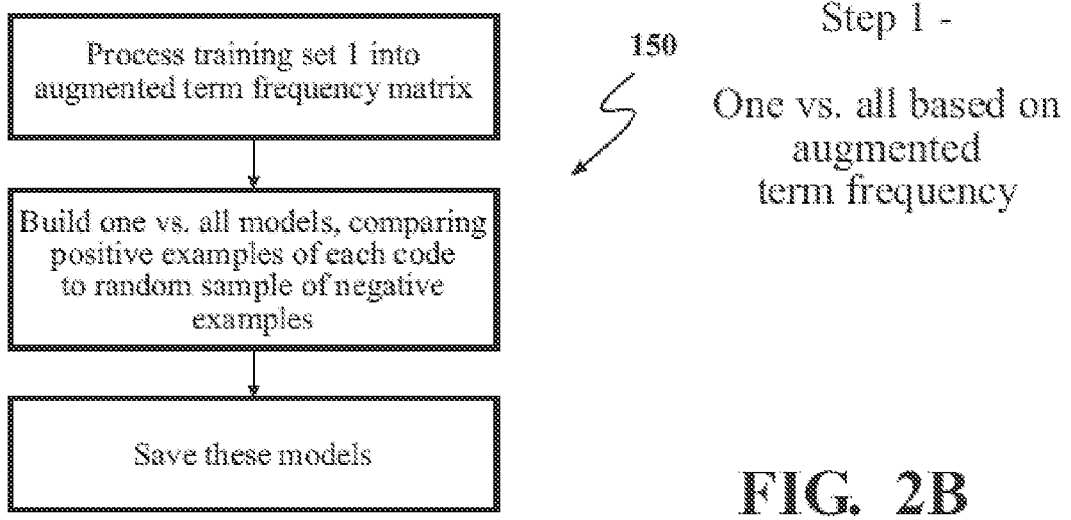
FIG. 2B depicts a more specific breakdown of 1 step in the method of FIG. 2A in which one vs. all models are generated.
Figure 2C:
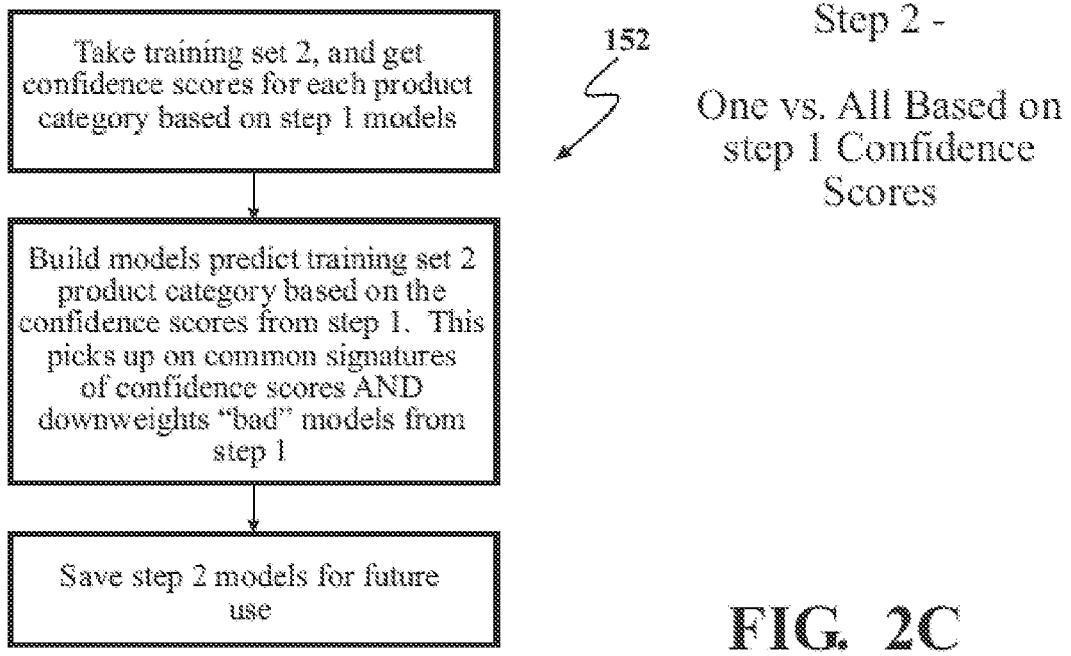
FIG. 2C depicts a more specific breakdown of a step in the method of FIG. 2A in which one vs. all models based on the confidence scores of FIG. 2B are generated.
Figure 2D:
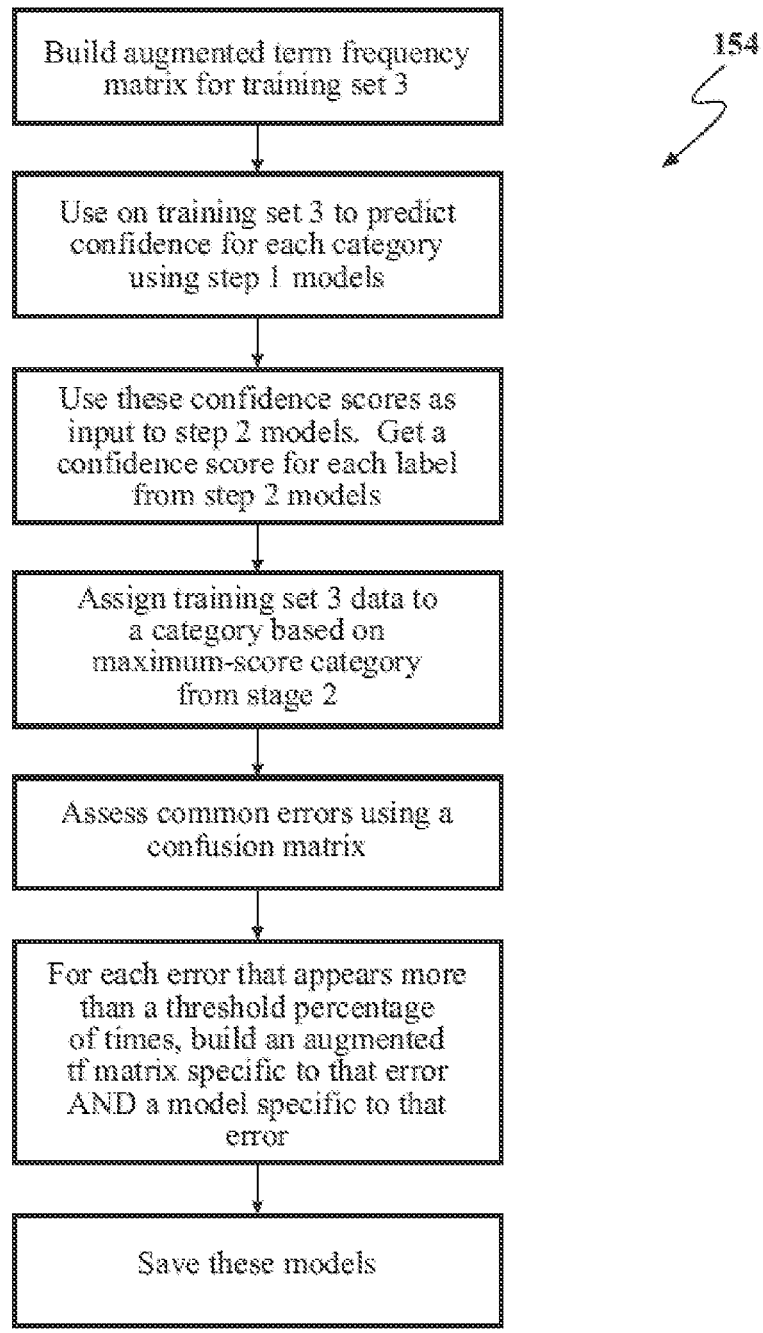
FIG. 2D depicts a more specific breakdown of a step in the method of FIG. 2A in which models for common errors are generated.
Figure 2E:
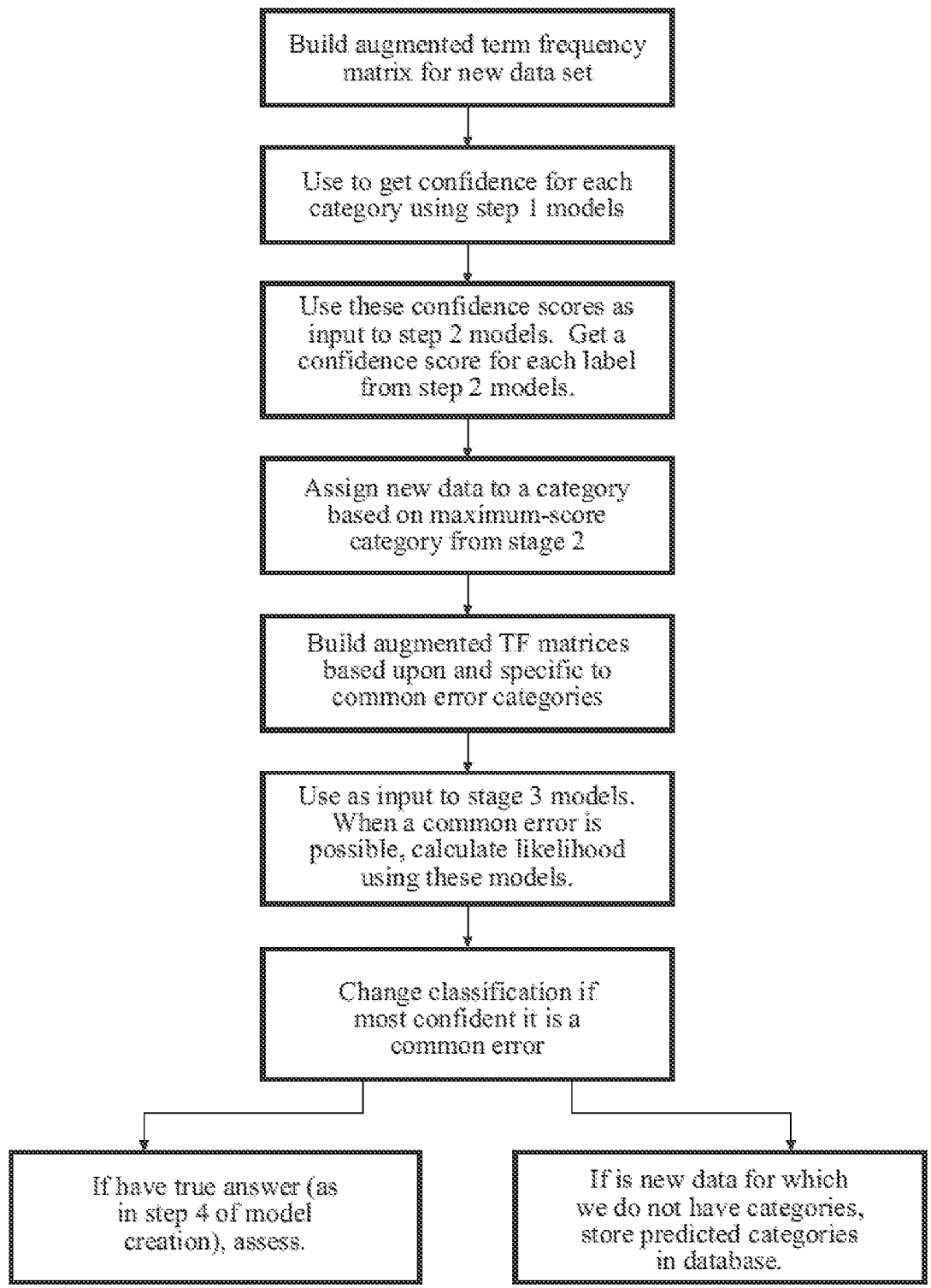
FIG. 2E depicts a more specific breakdown of a step in the method of FIG. 2A in which performance is assessed on training set 4 after classifying according to steps 1 (FIG. 2B) and 2 (FIG. 2C) and correcting common errors in FIG. 2D.

In this embodiment, the classification method 140 includes a 3-stage model generation process (step 150, FIG. 2B; step 152, FIG. 2C; step 154, FIG. 2D) with a $4^{th}$ stage validation (step 156; FIG. 2E). Of course, more stages and training sets can be used in alternative embodiments.

Initially, in this example, a training set is assembled (step 142) from records with parsed, mined, or otherwise extracted or assigned categories, e.g., HS, HTS, NAIC, etc., with examples of the categories that are to be assigned. In one example, there may be more than 5000 examples in each category, although the classification method 140 can function with, for example, as few as 200 examples. The classification method 140 may also utilize large training sets, on the order of millions or billions of records, that, although not all storable in memory, may be selected from a database only when needed to generate the specific models, and then thereafter cleared from memory.

The training set, in this example, includes four (4) training subsets that may be random selected for model generation and validation (step 144). The four (4) training subsets are hereafter referred to as training sets 1, 2, 3, and 4. It should be noted that because there may be multiple stages of model creation, which accomplish different effects in different ways, it might be advantageous to have a distinct training set that is appropriately adapted for each stage.

Processing of Training Set: Feature Generation (Predictive Model Input Generation)

The records from the four (4) random training subsets are processed into numeric inputs based upon term frequency matrices that are based upon the natural language descriptions within the records. As noted above, each matrix has a row corresponding to each record, and columns for the words (from a defined dictionary) that could appear in the record, with the entry in a given cell corresponding to the frequency (or count) of the number of times the word for a given column appeared in the record. This natural language processing step counts the frequency, or the binary occurrence/non-occurrence of individual words, after stemming and clean-up appropriate to the language in question. Further transformations, such as normalization of the term frequency matrices by the frequency of terms in the document corpus as a whole may occur.

The generated matrices are typically very sparse and mostly contain zeros. This is because for each row (representing a customs record) of a term frequency matrix, there is a column for each word that could appear in the record. As there are many possible words, but only a few in each record, most of the column entries are zero, resulting in the very sparse matrix.

The segregation of the zeros as a separate class of objects facilitates an improvement in computational speed by a significant factor (e.g., 15×) through usage of the particular processing procedure of the above-referenced feature matrix as a sparse matrix. In particular, as most of the matrix entries are zeros, that efficiency can be greatly enhanced by storing and processing only the non-zero entries. For example, the system can process as many as 100,000 records on 10 cores in a time of less than three minutes.

Initially (step 150; FIG. 2B), a "one vs. all" model is generated in which a predictive statistical model is built comparing these positive examples of each category to a random sample of negative examples to provide a "training the learner" approach in which training set 1 is processed into an augmented text feature matrix. This is undertaken for each category in the training set with, in this example, more than 200/4=50 examples. Each step, thus, on average, utilizes one-quarter of a given category's examples.

The use of a "one vs. all" model in which a model is made for comparing a set of records with a given category to a random sample of examples of all other categories facilitates linear scaling of computational time with the number of categories. In contrast, an "All vs. All" model would result in n-choose-2 (combinatorial) scaling (e.g., about 20,000 models for two hundred HTS categories or about 500,000 for 1000 categories). In other words, approximately n-squared scaling appears in all-versus-all, while one-versus-all methods scale linearly with the addition of more HTS categories. In the "one versus all" approach, the size of the negative sample can be dialed up or down based upon computational resources with. In one example, it may be about 5000. If there are very many positive examples, a random subset may also be selected, which may be on the order of about 5000. However, in cases of common errors (e.g., disambiguating types of "oil," of which there may be several that commonly are misidentified in records), there are benefits of doing all-versus-all methods targeted at these specific errors, despite computational burdens, and such methods may be selected in those cases.

The size flexibility of the negative sample size and positive sample size permits efficient utilization of computer hardware, as the negative (and positive) sample size can be set at a level that results in high classification performance, but does not have excessively long computational time. In this, and subsequent steps, an "unknown" category may be used to allow classification of data in which unknown classes may appear in the future, or in rare classes in which there are not enough examples to generate a model. This accommodates messy systems that generate new or rare categories.

The particular type of model can be swapped in and out and, in one example, the model may be a lasso or ridge regression model. The model may also include various tuning parameters such that the best value of the tuning parameters is selected through a cross-validated grid search over values of the parameter.

The model may then be assessed based upon Receiver Operating Curve coverage area, an ideal measure of performance for this application to generate a confidence score, between 0 and 1, of how likely it is that a record with a given category in fact belongs to a given category. The Receiver Operating Curve area is thus a measure of performance of a model's outcomes that takes into account ordered outcomes, in particular where the model returns a measure of the quality of its outcome (e.g., a confidence score). The Receiver Operating Curve contemplates that for each model, if one evaluates every possible cut-off threshold between zero and one, the curve indicates how each record given a confidence score would be classified. The curve thus displays the recall and precision of the given model. In other words, the measure of the area under the Receiver Operating Curve indicates how successful the confidence score is in separating out instances of a given category, say a category for "petroleum", from other candidate categories.

False positives (tagging the wrong category to a shipment) and false negative errors (missing the tagging of the correct category to a shipment) can be weighted differently in the model generation. In one embodiment, they are weighted such that any category imbalance (less positive than negative examples) is not transferred to the model, false negatives are up-weighted so that the positive and negative records have equal influence on the model, even if there are less positive example to compensate for unequal distributions somewhat rare categories. Thus, the positive vs. negative may be particularly weighted. That is, different types of errors are adjusted in relative importance so model is not swamped by particular examples. These models are then saved.

Next, one vs. all models based upon the confidence scores from the "Step-1" models (step 152) are generated. Training set 2 is utilized, and a feature matrix is generated based upon the procedure detailed above. The difference is that the words and binary features, such as country of origin etc., in the feature matrix, are copied from the training set 1 matrix, so that the two matrices utilize the same dictionary of words and other features.

The confidence scores from the numerous, e.g., 100s-10,000s models generated in step 1, are then used for the data in training set 2 (step 152; FIG. 2C). These confidence scores are then used to train the models for this step. Using the confidence scores from the "Step-1" models, which characterize the confidence from step-1 that a given record belongs to a given category, the "Step-2" models predict the category of a given record. The models are again generated in a one vs. all methodology. The same sampling of positive and negative examples is used. The difference is that "Step-2" facilitates the models to use information on confidence in a number of different categories to determine the best category. In other words, it uses the signature of categorization from all the models in "Step-1" to predict the category in "Step-2." Again, scaling of time is linear with the number of categories.

Next, the models are utilized to identify and correct for common errors when classifying training set 3 using "Step-1" and "Step-2" models (step 152; FIG. 2D). Common errors are cases where HTS categories need to be classified for items that are commonly confused (e.g., when classifying types of oil, of which there are many that are commonly confused, such as petroleum oil and essential oils). Recognizing that there are often such common errors (e.g., distinguishing between petroleum oils and essential oils), there is an opportunity to address them with further techniques that may include a separate matrix dictionary. For example, once those common errors are known, a term frequency matrix created based on free text descriptions in any language is generated (FIG. 2F) that focuses on the words that are most relevant to resolving the common errors (e.g., using a special, separate matrix with its own dictionary of words that is specific to the problem of resolving the particular common error). For example, the word "essential" might be very important to resolve the difference between petroleum and other oils, while it might not be a very useful term in determining HTS categories for other categories of goods, so that word (and other similar words that help distinguish types of oils) might be placed in the special dictionary for resolving HTS classifications among categories of oils.

Training set 3 is utilized to generate a feature matrix. Based upon the "Step-1" models, scores are assigned. Then, based upon the "Step-2" models, confidence scores are also assigned for training set 3. The records from training set 3 are then preliminarily assigned to the category with the highest confidence score. The augmented term frequency matrix for training set 3 is then used to predict confidence scores for each category using "Step-1" models. These confidence scores are then used as input to the "Step-2" models to obtain a confidence score for each label from "Step-2" models.

Figures 2F, 2G:
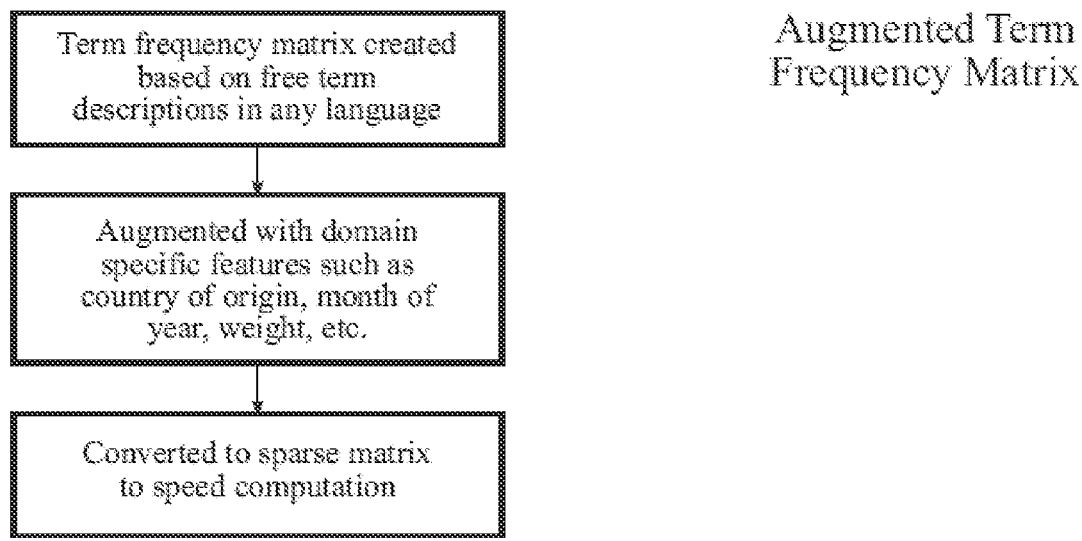
FIG. 2F depicts a process for an augmented term frequency matrix.
FIG. 2G depicts an example of a confusion matrix.

A confusion matrix (FIG. 2G) is then generated that characterizes the common errors made. For example, category A might often be confused with category B, and for each error that occurs more than a threshold percentage of the time for the given category, a model is generated. The threshold may be set at, for example, 10% such that if records that truly belong to category A, are assigned to category B more than 10% of the time, a model is made comparing category A and B. When a record is assigned to category B in the future, the model-comparing category A and B will be used. If the model is confident that the record is actually a misclassified record of that truly should be category B, it will change the classification to category B. In this way, the algorithm corrects for common errors. In other words, on one side is the prediction, while on the other is the actual result, which facilitates highlighting of the common error. Thus, the confusion matrix has on one axis what the prediction was, and on the other axis what the actual result was, and entries with high counts or frequencies highlight the common errors. In the example of FIG. 2G, the common errors that happen more than threshold (10% in this example) of the time are 33% of the predictions of 1214 are actually 2309 and 25% of the prediction of 2309 are actually 2507. In "step-3," specialized models are then built do deal with these common error cases.

Where there are many inaccurate predicted shipments (e.g., more than 10% of the time, the particular category was wrongly predicted) then the above process may be used, such as by building a special term frequency matrix using a special dictionary (e.g., with words that help resolve the common errors, such as by pointing to a particular HTS category as the most likely one) for resolving classification of the types of categories that are subject to such common errors. For each error that appears more than the threshold percentage of times, an augmented term frequency matrix specific to that error and a one vs. one model specific to that error is then generated. These models are then saved.

Next, assessment of the model generation procedure is performed on training set 4, after classifying according to steps 1 and 2, and correcting common errors using "Step-3" models (step 156; FIG. 2E). "Classifying" as utilized herein represents assigning the most likely category (e.g., HS) based on "Step-1" and then "Step-2" models and "procedure" relates to the entire classification algorithm. The purpose of "Step-4" is to obtain a view of how well the entire algorithm performs on data it has not seen before.

The training set data for this step is used to generate a term frequency matrix by which confidence scores are produced for "Step-1" models. These confidence scores are then used as input the "Step-2" models to obtain a confidence score for each category from the "Step-2" models. Categories may be selected based upon the "Step-2" category with the maximum-score category from "Step-2" to build augmented term frequency matrix based upon common error categories. The augmented term frequency matrix based upon common error categories are then used as input to the "Step-3" models. When a common error is possible, the likelihood is calculated then the classification is changed. Then the estimates of model performance, based upon predicted category vs. actual category, are stored for future reference. Based upon these estimates, the system can selectively provide a given categorization at the record level. In other words, categorization of high confidence may be selectively displayed.

Technical Details: Classification of New Data

The new dataset may be processed as training set 4 above, yielding a unique category for each record. "Unknown" may also be a valid category to enable processing of data that may potentially contain new classes or has rare classes.

Computer Performance Improvements

Use of one vs. all as opposed to all vs. all categorization allows linear scaling with the number of shipments, rather than approximately n-squared scaling facilitates. Sparse matrix manipulation increases categorization speed by about a 15× factor. Language agnostic machine learning approaches, enhanced by this speedup from use of sparse matrix manipulation, readily reduces human labor over any system that relies on humans to individually categorize shipments and human engineering labor vs. rule based category systems. This avoids laborious programming to handle new language/new ontology of categories. Sampling of positive and negative examples also permits efficient trade-offs between computational time and model quality. The procedure may also be parallelized for speed of model generation and classification. Category optimization (e.g., transforming term frequency matrices into sparse matrix format) facilitates, for example, tagging of 100,000 shipments every 3 minutes using but 10 cores.

Figure 3A:
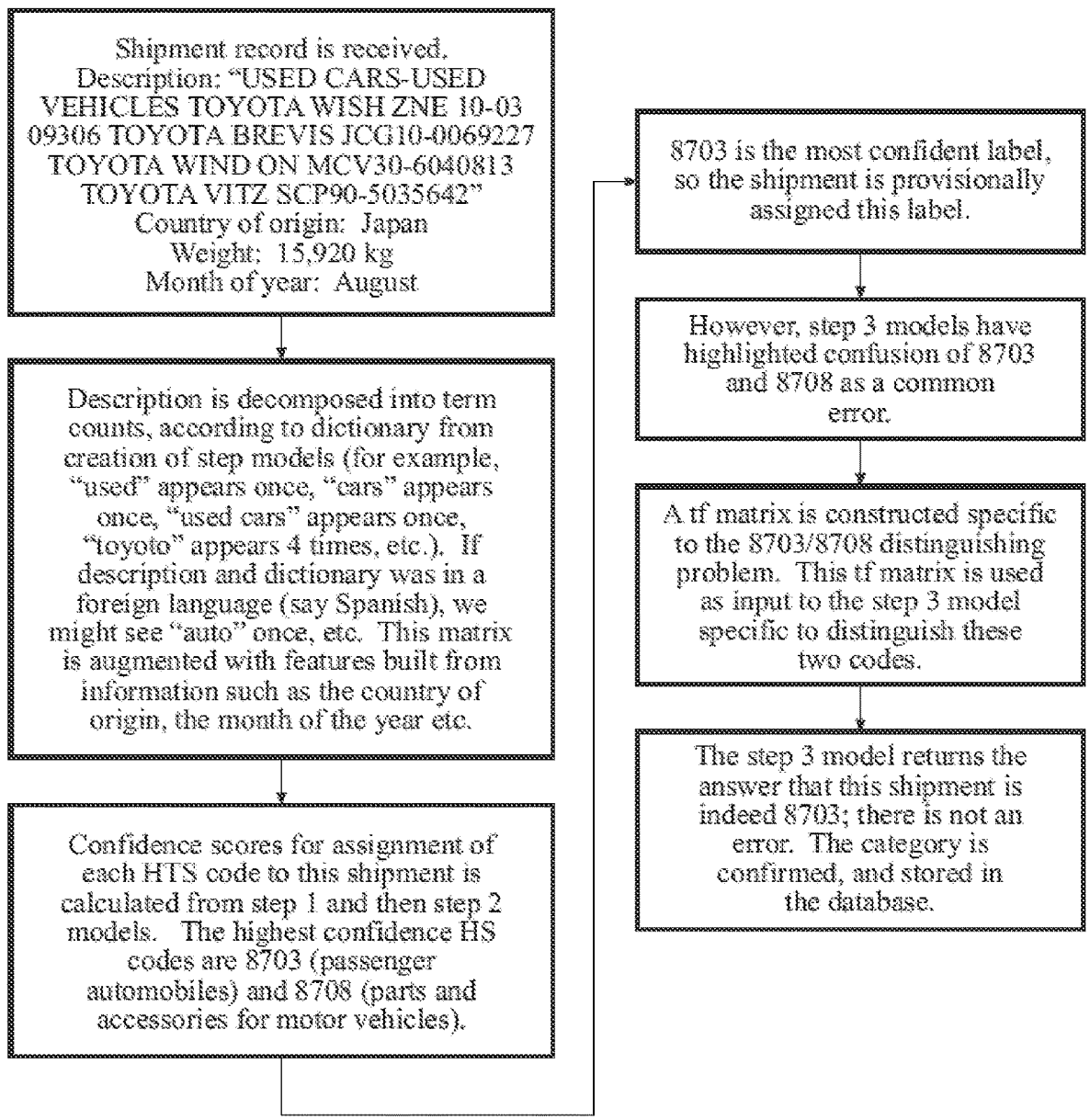
FIG. 3A depicts a method for shipment categorization.

With reference to FIGS. 3A, and 3B, categorization can function on any language. Language processing may be enhanced with a dictionary of stop words (i.e., words that are filtered out before or after processing, such as very common words in the language that would end up being assigned very high frequencies without adding to the effectiveness of the model, such as "the" or "an" in English) and stemming ability (i.e., the ability to map or otherwise relate various derived or inflected words to their roots, so that words with a common root and meaning (e.g., "clothing" and "clothes") can be handled together rather than being processed separately. Processing can also function without a language dictionary, based upon an alternative natural language processing (NLP) technique, based solely upon the characters in the free text descriptions. Multiple free text descriptions may exist: Shipment description; "Marks+Numbers" description (i.e., the information written on the side of the container); company name; importer; exporter; notify parties (banks, logistics companies, etc.); company address, etc. Additional binary or continuous feature vectors may be constructed based upon, for example, country of origin, country of destination, ports involved, type of container, weight of shipment, shipment data, etc. That is, the commonality of usage of particular terms or character combinations—irrespective of language—may be utilized to decompose the description.

Confidence scores, as described above, are then calculated for assignment of each HS category to categorize the shipment, and the most confident label is provisionally assigned, e.g., HS8703 in this example. However, the "Step-3" models may highlight that 8703 is subject to a common error with 8708. A term frequency matrix is then used as input to the "Step-3" model specific to distinguishing these categories such that the "Step-3" model returns an answer, which, in this example, confirms HS8703 is confirmed. Further, other features built from information such as country of origin, weight, when shipped, etc., may be used to augment the text count. For example, vehicle may be associated with a country of origin such as Japan or Germany to augment the determination that distinguishes, an increase the confidence score of the categories.

Anomalous Shipment Pattern Redaction

Under some country's regulatory regimes (such as the United States), companies may redact data from publicly available shipment records. This redaction can affect qualitative and quantitative analysis if not detected and managed. The system 100 is thus also operable to facilitate an unsupervised machine-learning based approach to identify such anomalies.

Figure 4:
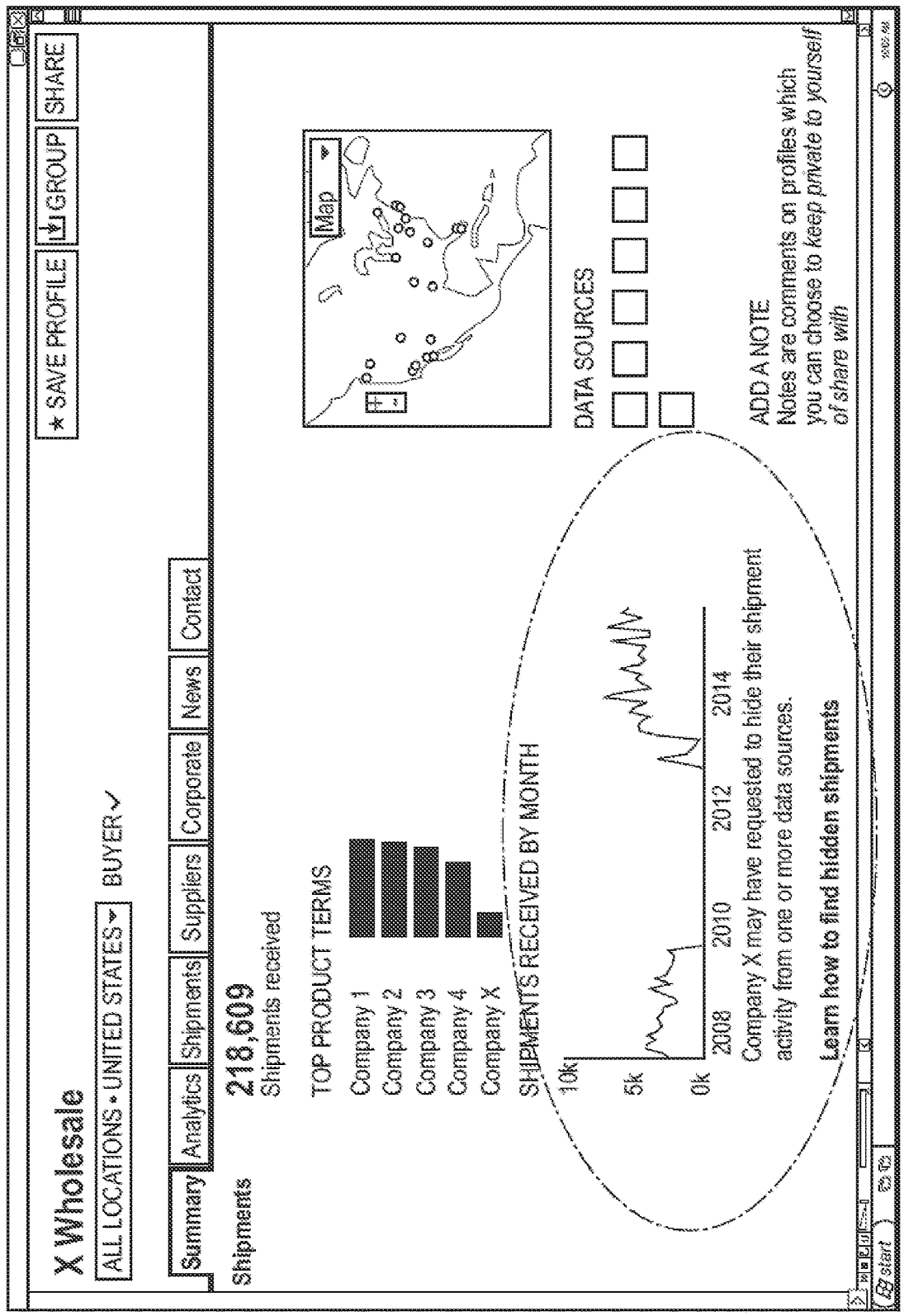
FIG. 4 depicts redacted shipment data.

In the US, these anomalously periods often correspond to periods in which a company's name has been redacted (FIG. 4). The system 100 can thus be used to highlight various anomalies (e.g., shutting down of a port due to an accident or other event, cyclical variation of shipments by a particular company, from a particular port, loss of reporting from a particular port, and many others). Such anomalies may appear, for example, where data from a receiving port do not match periods from a shipping port, such as indicating a likely event of data loss.

This approach functions without a training set and may provide, for example, detection that a company has requested name redaction and messaging of this period; detection of abnormally high or low (anomalous) periods of shipment activity at the company, port or country level; dramatic and sudden reductions in shipments due to political risk, port strikes, etc.; and/or dramatic and sudden increases due to port renovation, changed business strategy, etc.

The unsupervised machine-learning based approach in one embodiment may include Bayesian Information Criteria (BIC) based breakpoint analysis of each shipment trend to provide an unsupervised machine-learning (ML) technique that is operable to identify "breakpoints" that separate periods of shipment trends of different means. This method minimizes the variance of the data from the mean in a given period, but has a penalty for having more periods, thus reducing spurious identification of periods of trivially different mean.

Next, periods of average shipments that show "breakpoints," such as a large drop-off from the previous period, for example, a 95% drop-off, are sub selected. It should be appreciated that other metrics may be used for such sub selection. In one embodiment, shipment trends that have five (5) or more consecutive periods may be excluded as such periodicity generally characterizes seasonal/cyclical shipment patterns, such as those seen in agricultural trade. Experience may indicate that patterns of shipments, such as periods of dropoff and/or rebound, may indicate what number of periods should be selected to provide accurate results. This may use a library that is publicly available. Domain-specific thresholds on minimum size of the shipment period can alternatively, for example, be considered an opt out period. This period of exclusion is then stored in the database for other usages such as for internal and external analysis.

The procedure may be parallelized for speed of detection of anomalous periods. In one example, using only 4 cores, this procedure can process 2.4 million distinct consignee companies in the database that have US import trade data within 10 day. That is, all 2.4 million companies and 100 million+US Import records are processed in 10 days but are readily expanded to identify name redaction in US Exports/other trade datasets.

Figure 5:
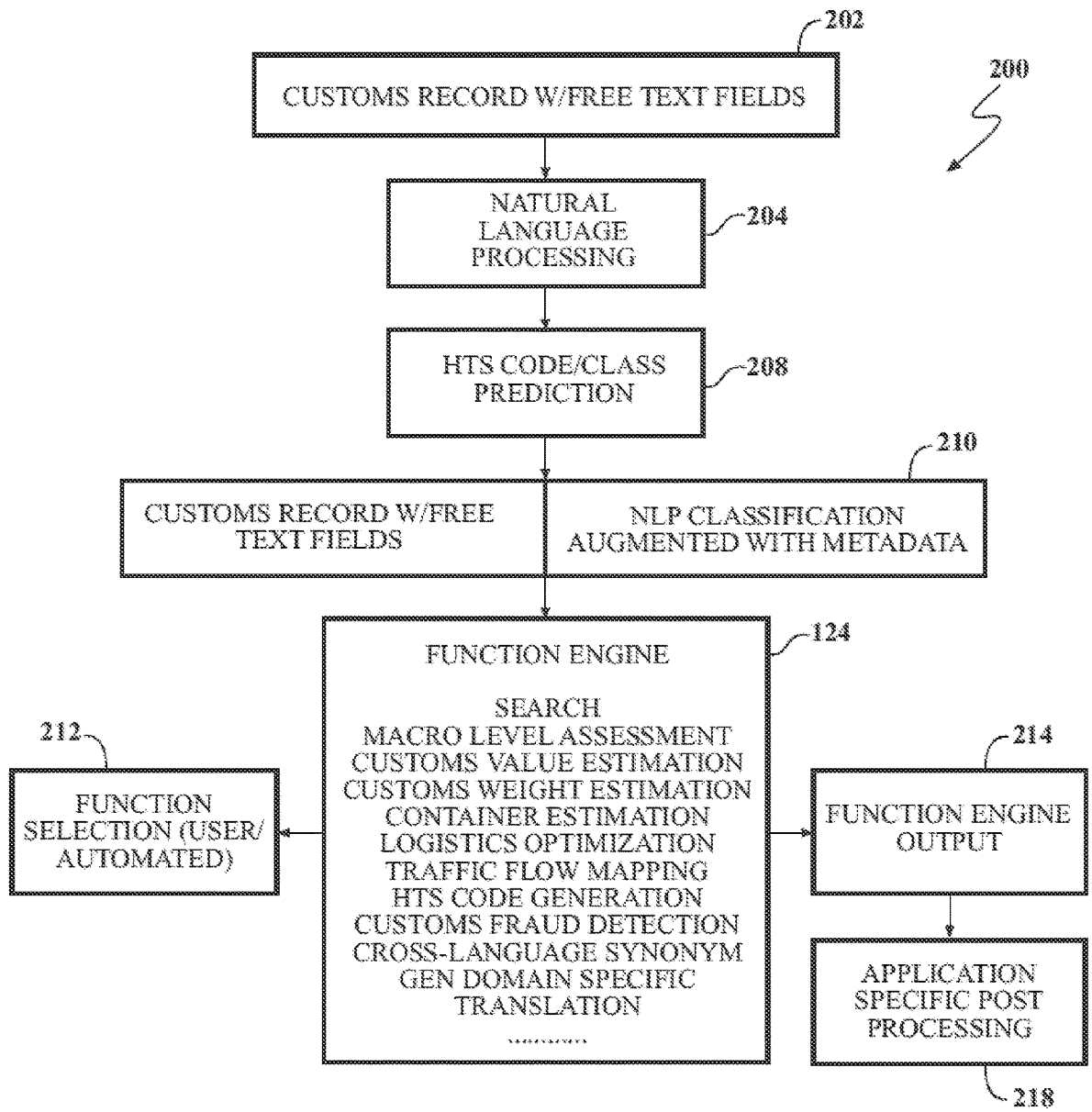
FIG. 5 depicts an alternate embodiment of the methods and systems for natural language processing for classification.

With reference to FIG. 5, another embodiment of a method 200 for the natural language processing for classification is schematically illustrated. The method 200 includes processing of a customs record 202 with free text fields that may be ingested and routed through a natural language processing engine 204, then the output of which may be processed by an HTS/class prediction engine 208. An exemplary output of the processing engine 204 and prediction engine 208 may include transformed customs records that include a natural language processed and classified data structure 210.

A function engine 124 as described in association with FIG. 1 may receive a function selection input 212 (e.g., from a user or automatically based on an application specific function request). The function engine 124 may produce a revised customs record 214 that may be routed (e.g., in real-time) to an application specific post-processing engine 218 that may derive a real-world output.

Examples of further types of natural language processed international shipment records analysis may include HTS category matching, validating, and others. The business nature of an entity may be appreciated by predicting what a company does through what it sells or buys based on HTS categories from its shipping and/or receiving records. Governments or other agencies involved in international commerce may also benefit from detecting incorrectly labeled shipments through comparing an HTS category reported for a shipment with an HTS category determined through the natural language processing for classification methods and systems described herein. Tariff collection may be improved through proper HTS category determination. HTS categories generation may be automated during a shipment preparation process or business planning process. This may reduce tariff charges through recommendation of a HTS category bearing a lower tariff that nevertheless properly classifies the shipment content.

Applications for HTS code-processed shipment data using the natural language processing techniques for classification described herein may include: improving searching of data sets, such as searching that is not dependent on keyword matching alone; improving existing keyword matching and/or searching techniques by leveraging the learned synonyms for multiple languages, acronym usage, and the like; viewing shipment data via a hierarchical, HTS-based drill-in approach, rather than merely searching; macro level analysis of industries, jurisdictions, and the like based on natural language processed and classified customs records; customs value estimation; customs weight estimation; shipping container size estimation using HTS category and value or volume; estimating container size, such as by using HTS category and value or volume; volume-based analysis of shipping marketplaces for capacity management, and the like; facilitating logistics optimization to better determine what is actually being transported (as compared to user self-reported HTS categories); mapping goods flows around the world without language-based limitations; generating HTS categories; detecting fraudulent use of HTS categories; saving costs through HTS category cost optimization prior to shipment; facilitating more value from shipping specialty items that may be hazardous, flammable and the like by identifying these during shipping quotation and the like; identification of synonyms across languages; perform domain-specific multi-language translation; and the like.

Shipping companies may benefit from natural language processing for classification as described herein by improved understanding of various trade lanes, such as identification of the shipments in the trade lane and the companies associated with the trade goods being shipped. This may be useful to a shipping company for planning or marketing, to optimize ship routing and to target offers for shipping services to the correct prospects. Ship routing may be optimized through identifying candidates for both outbound and return routes to improve overall value derived. Further optimization may be derived from correlation of actual contents of individual containers over time. Each container may be identified by a unique serial number that can then be tracked over time to determine opportunities for improving its use.

By applying the HTS category classification determination across customs records over time, profiles of given industries may be developed to give, for example, a high level view of industry activity. Likewise, profiles of HTS categories can be used to develop activity profiles and/or value assessment of industry verticals. Likewise, changes such as shifts in a base of supply over time can be determined and/or predicted. Profiles may be visualized as trend lines, heat maps, leader boards (e.g., top importers, exporters, logistics providers, and the like), etc.

HTS category classification as described herein, may facilitate further understanding of overall company performance when, for various business or political reasons, information is released in a manner that complicates association of the data. Such segmentation of data may present one view of a business concern, whereas consolidation of these segmented views can result in a different understanding.

The methods and systems for natural language processing of customs records for classification may further be applied to comparable industry data sets, such as NAICs, SIC, and other such categories. When these techniques are applied to both SIC and HTS category synthesis, correlations between these two distinct industry-related coding systems may be modeled.

The methods and systems for natural language processing for classification described herein and depicted in the accompanying figures may be applied to other types of data than customs transaction data. In an example of a health-field use, patient data (e.g., symptoms, diagnosis, demographics, and the like) may be processed with these methods and systems to effectively develop models and/or databases of rare disease symptoms to facilitate better diagnosis and prevention. Trending of diseases may also be detected through time series application of these methods and systems, such as to determine a bias correction for population health data. A bias correction may facilitate correcting an undercounting of the number of patients with colds being diagnosed in a hospital. Bias correcting estimation generally may be applied to a wide range of trending and market share analyses.

Customs records may include explicit identifying information for parties involved in the corresponding international shipment. It should be appreciated that "shipment" may include any record of an international transaction of physical goods. A supplier, buyer, banker, and/or one or more other parties (e.g., insurer, third-party receiver, and the like) may be explicitly identified in structured fields and/or in free text fields (e.g., notes fields and the like). However, many parties prefer to opt out of explicit notification and have such entity identifying information removed or left out of the publicly accessible customs transaction records. Motivations for doing so may include avoiding exposure of business activities and relationships (e.g., information about types and volumes of products shipped, relationships with customers, and the like). Therefore, many customs records simply have no data in important information fields, such as fields that are intended to list the supplier, the importer (buyer), and the like. However, it may still be possible to discern the actual buyer, supplier, banker, insurer and the like through use of natural language processing techniques described herein to facilitate classification of customs shipment goods along with detection of clues about the parties.

Likewise, analysis of customs records can reveal when information in the records that facilitates identifying a party of the international shipment is present. International shipment parties who desire to have a high degree of anonymity in these records can leverage the methods and systems of natural language processing for classification and entity detection to adjust shipment information content to avoid being revealed.

Methods and systems of natural language processing for shipment information classification may be applied to determine a supplier, buyer, banker, insurer, and the like as a party in a customs transaction, even when explicit party identification information is redacted or omitted from customs transaction records. Correlating historical and related customs shipment information using fields such as shipping port, destination port, classified HTS code, and the like with redacted customs shipping records may facilitate predicting a party involved with the corresponding international shipment.

Methods and systems for natural language processing for shipment content and/or entity classification information may facilitate a supplier preparing "shipper not noted" international shipment (e.g., customs) documentation that lacks data in free text and/or structured content fields that specifies one or more parties in the shipment transaction. Natural language processing for classification and/or entity detection as described herein may be performed on candidate customs transaction data and further processed through one or more algorithms that facilitate transaction party identification for transactions that do not explicitly disclose at least one of the parties in the transaction. An indication or measure as to the likelihood that a particular party to such a transaction can be identified by the data in and among the various structured and free data fields may be generated and used to suggest actions to take to further reduce the potential for party identification from final customs transaction records. Processing may include using output from the natural language processed records in an algorithm that references entity/party metadata and determines if such metadata is present. Such metadata may be automatically derived/learned from processing other customs or shipping party records. Alternatively, such metadata may be provided by the party (e.g., a listing of names, addresses, phone numbers, reference numbers, buyers, suppliers, and the like that may be present in customs transaction records). Likewise, party metadata may be suggested by the methods and systems described herein to further improve results.

A goal of customs records analysis is to determine as much detail as practical about the goods being shipped, the parties to the shipment, logistics, location, and a wide range of other information. When parties elect to "opt-out" of explicit identification in customs records, the methods and systems of natural language processing of short-form structure and/or free text fields of a customs transaction record may effectively override the effect of the election to "opt-out" and thereby identify a party that has opted out of explicit identification. By using natural language processing of the data in customs transaction records to classify the records into entity-related categories (e.g., addresses, partners, goods, and the like), parties to the shipment may be determined. This determined entity might then be used to further analyze customs transaction records, such as for profiling parties to the transaction, and the like.

Detection of customs transaction parties that attempt to opt-out of explicit disclosure may provide benefits to a wide range of services including law enforcement, tariff enforcement, marketplace analysis, and the like. Generally, reversing "opted-out" customs parties improves the value and utility of these customs records. Therefore the methods and systems for detecting parties in customs records may be used as a step in a process for further analysis, including but not limited to the natural language processing for goods classification applications and uses described above and elsewhere herein.

Analysis of customs records in which the parties have opted-out of explicit identification may be extended to track when companies elect to opt-out. Through time series and/or trending of party detection in customs records, the methods and systems described herein may facilitate determining when an entity has begun to opt out. This may be accomplished by detecting customs shipments that are suggestive of a particular party that no longer explicitly identify the party. As an example, if a company has been importing products each quarter from a particular supplier and new customs records show the particular supplier making comparable shipments (e.g., same HTS code, similar volume, same destination port, and the like) without the buyer being explicitly identified, it can be inferred that the importer/buyer has opted-out of explicit identification in the customs records. This type of detection can be done automatically through detection of periods of fluctuation in entity data presence in customs records. When such a period of fluctuation is detected, a candidate opt out entity may be reported. Such fluctuation analysis may be further automated to account for cyclical transaction activity (e.g., seasonal supply, and the like). By automatically identifying when certain entities opt out, company performance analysis based on customs transaction records that may suggest a company has stopped importing products can be footnoted as indicating a period of opting out, rather than actual performance variation.

Such automated detection can be applied to identify fluctuation that suggests that a company is starting to appear again in customs records. This information may be valuable to a company to ensure compliance with opt-out standards or business goals for opting out of customs shipment record identification.

Figure 6:
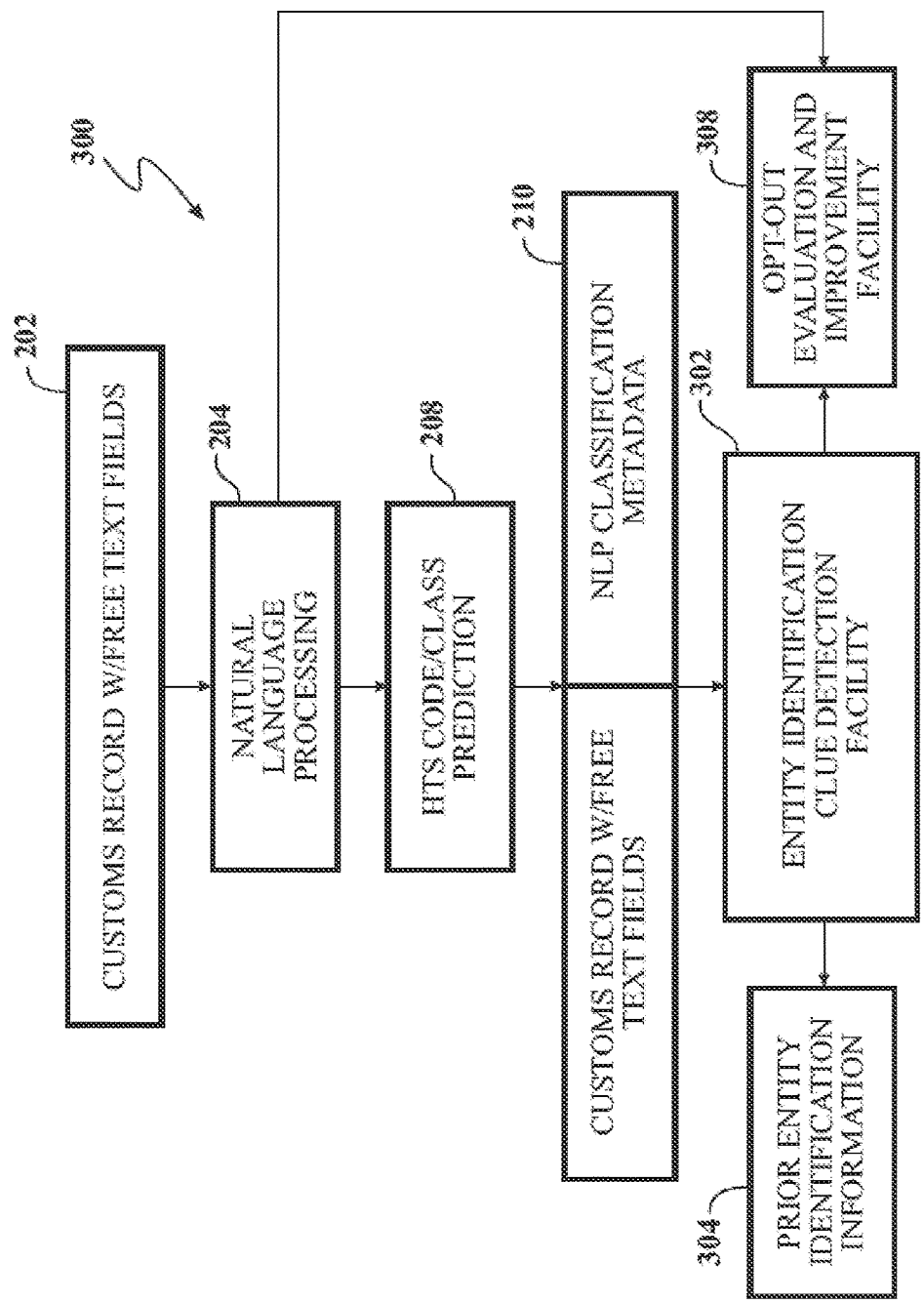
FIG. 6 depicts an alternate embodiment of the methods and systems for natural language processing for classification.

With reference to FIG. 6, another method 300 of entity identification processing of customs transaction records is depicted. Customs records 210 with NLP classification metadata may be produced using the methods and systems described herein.

Then, an entity identification clue detection engine 302 may receive such records 210 along with prior entity identification information 304 (e.g., data found in structured and/or free form fields that has been linked with detecting an opt-out entity in redacted customs transaction records). The prior entity identification information 304 may include data for entities other than the target opt-out entity.

The detection engine 302 may process the record 210 and information 304 to determine a measure of the likelihood that the opt-out entity is detectable. The result of this analysis may be provided to an opt-out evaluation and improvement engine 308 that may provide recommendations, perform further redacting, produce scripts to automate further redacting, and the like. Similarly, customs transaction record 202 may be a candidate record for a future or simulated shipment so that the analysis and redacted entity identification clue detection may be used to provide an entity with a set of criteria to avoid a likelihood that the entity would be detectable in an opt-out customs record.

Other techniques for customs data analysis that may benefit from and/or may provide benefit to the methods and systems of natural language processing for classification described herein may include improving performance of entity matching. Matching criteria may be loosened so that aspects of entity names, such as suffixes (e.g., grp, inc, llc, ltd) can be ignored when these other classification techniques are used to effectively reduce the number of potential matches. In this way, distinct entities with similar names, such as ABC Group and ABC Inc., may be detected as distinct based upon characteristics such as product shipped, industry, location, and other characteristics, even if the suffix is omitted from the customs transaction record if the natural language processed classification of shipments of ABC Group is distinct from ABC Inc.

Use of geo-location (e.g., country, region, and the like) to further reduce potential matches may improve entity-matching performance. Entities without known locations in a particular country or region can readily be removed as candidates for matching.

Language specific properties, such as which portion of an entity name holds salient information, can be identified and leveraged through the methods and systems described herein. In an example, many Chinese entity names have the city name as a prefix. Determining these jurisdiction and/or language-specific properties further enhances use of customs records.

Other techniques may include automatic configuration of a machine learning process for given training sets by establishing a set of tuning parameter for each feature to indicate which feature(s) should be looked at more deeply during machine learning, and which should be treated more generally. Such tuning parameters may be configured on a data source by data source basis so that introducing new data sets becomes easier and more automated. In an example, if a new data set does not include insurance carrier data useful for the prediction task at hand (i.e., uninformative insurance carrier data), a tuning parameter for this field/type of data can be adjusted so that the natural language processing will deemphasize resolution of this aspect of the records.

A suggested use of the methods and systems described herein may include resolving a company's internal data with external data to facilitate gaining a perspective on how a company's external perception can be viewed through its internal data. Generally companies have better controls for internal data and rely on internal data for operations; therefore correlating external perception with internal data may prove to be highly valuable to companies.

Figure 7A:
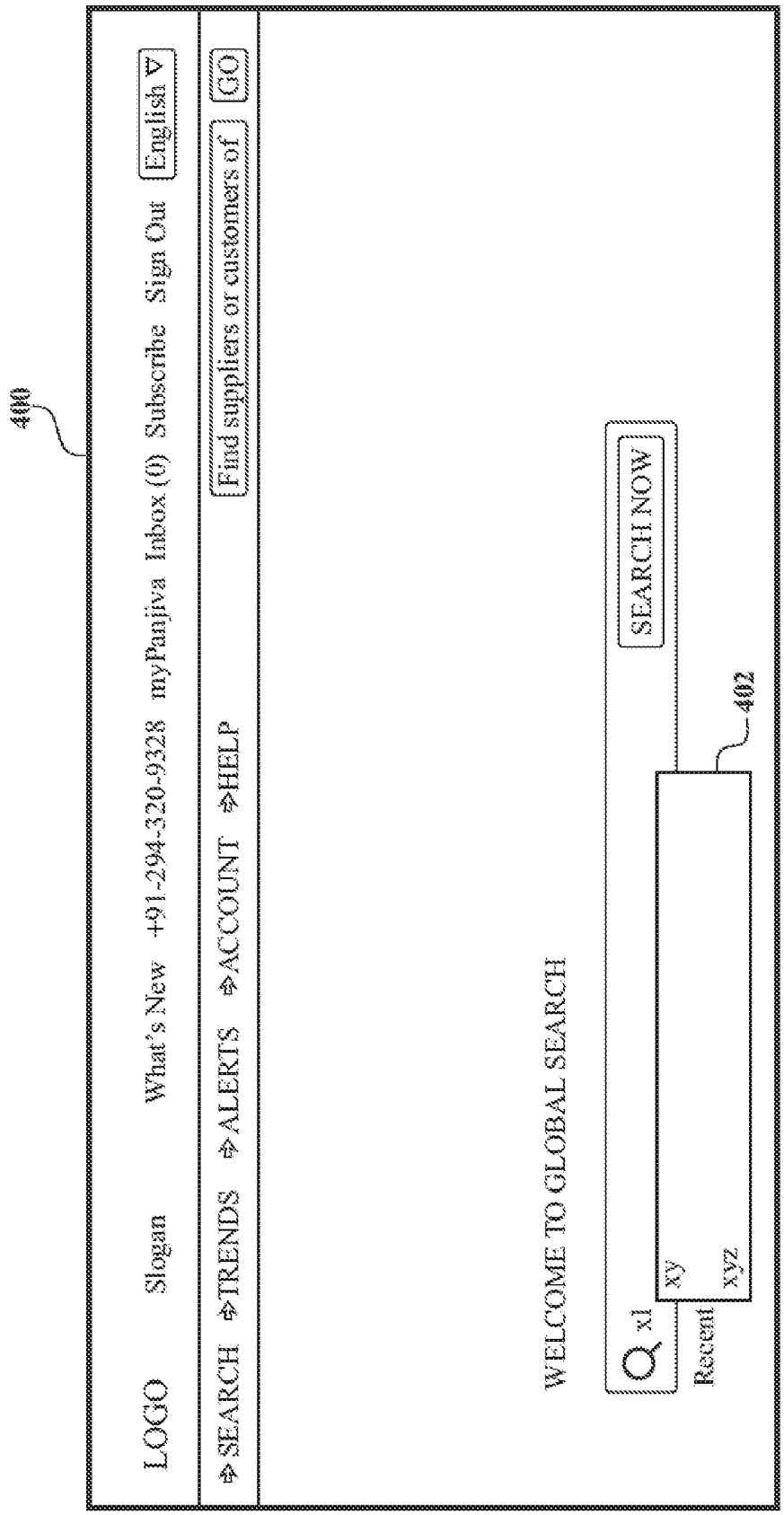
FIG. 7A depicts a user interface.
Figure 7C:
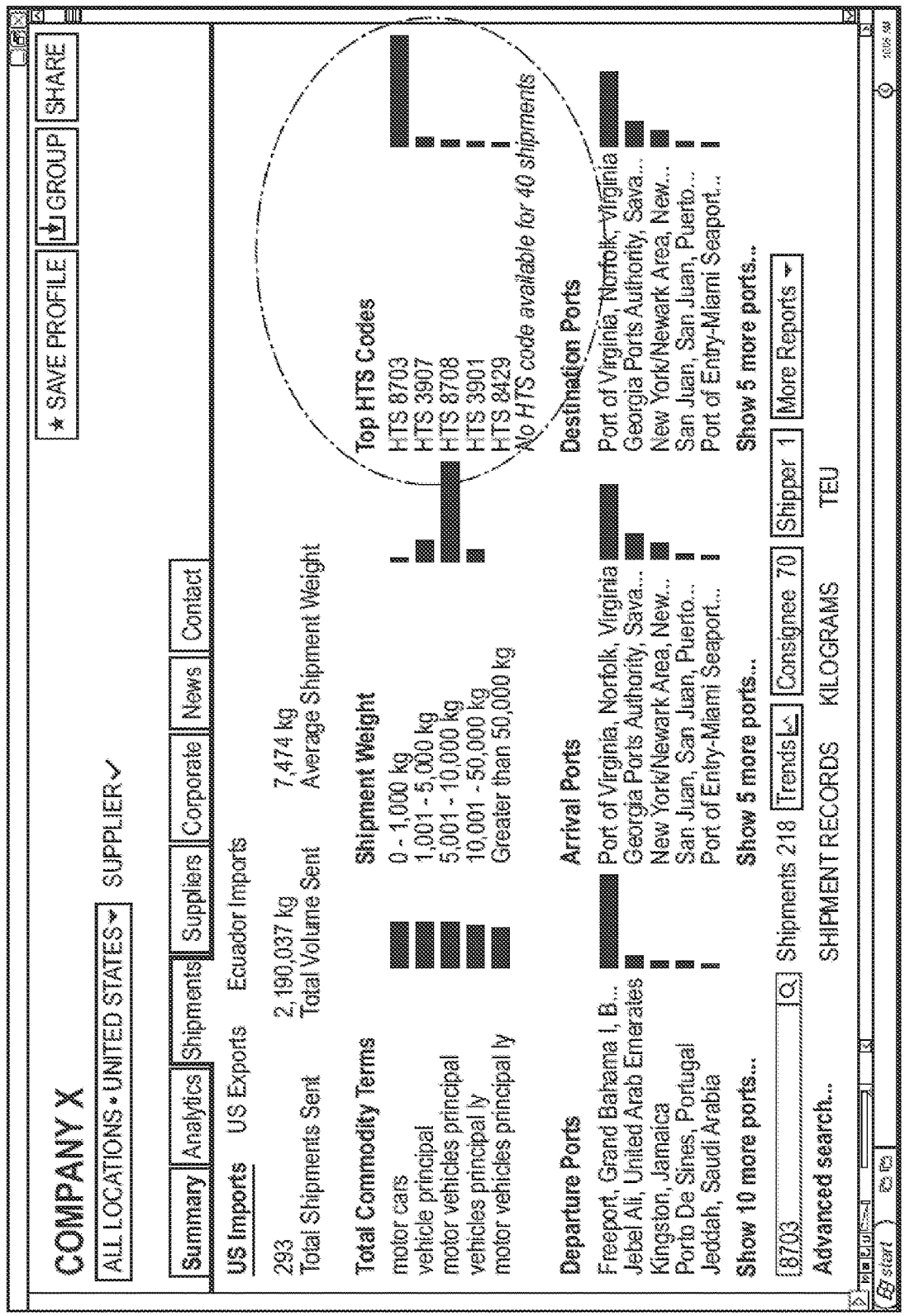
FIG. 7C depicts a company profile analysis using HTS categories in the user interface.

With reference to FIG. 7A, an exemplary user interface 400 may be presented to a user for performing a shipment search (FIG. 7B), a company profile analysis (FIG. 7C), or other unified analysis of multiple data sets irrespective of language (FIG. 7D).

The search feature may enable buyers and suppliers to find each other so as to connect with each other to establish business relations. The search feature may be focused on customers, and/or capabilities. For example, the search feature may assist a user in finding someone who manufactures the product of interest to the user such as those that ship vehicle under HTS8703. The search may be driven by the categories derived from customs data via the category-to-HTS category natural language processing algorithm that facilitates identifying suppliers of the product by correlating a search term to a candidate HTS category and searching suppliers who have been categorized as supplying products under the candidate HTS code.

The search feature may offer suggested search terms to the user corresponding to keywords typed by the user based on a correlation of the typed keywords with categories derived from the customs records using the natural language processing algorithms described herein. The search feature may include a search term entry window 402 to present one or more suggested keywords depending on the keywords entered by the user. For example, if the user inputs "pho", the search feature may determine which categories correlate to this input and may obtain suggested keywords such as, "phone", "photo", "photo frame", "photo album", etc. that may be associated with HTS categories that are characterized by the categories that correlate to the input keyword. In another example, the search feature may obtain the suggested keywords in accordance with the name of the buyer or supplier associated with the keyword entered by the user using a similar technique that may relate a keyword entry to an HTS category and further relate the HTS category to an entity. The methods and systems described herein may employ a plurality of techniques (e.g., keyword-category matching algorithms, similarity-based natural language processing algorithms, and the like) so as to list more than two suggested keywords in a hierarchical order corresponding to the keyword entered by the user.

Figure 8:
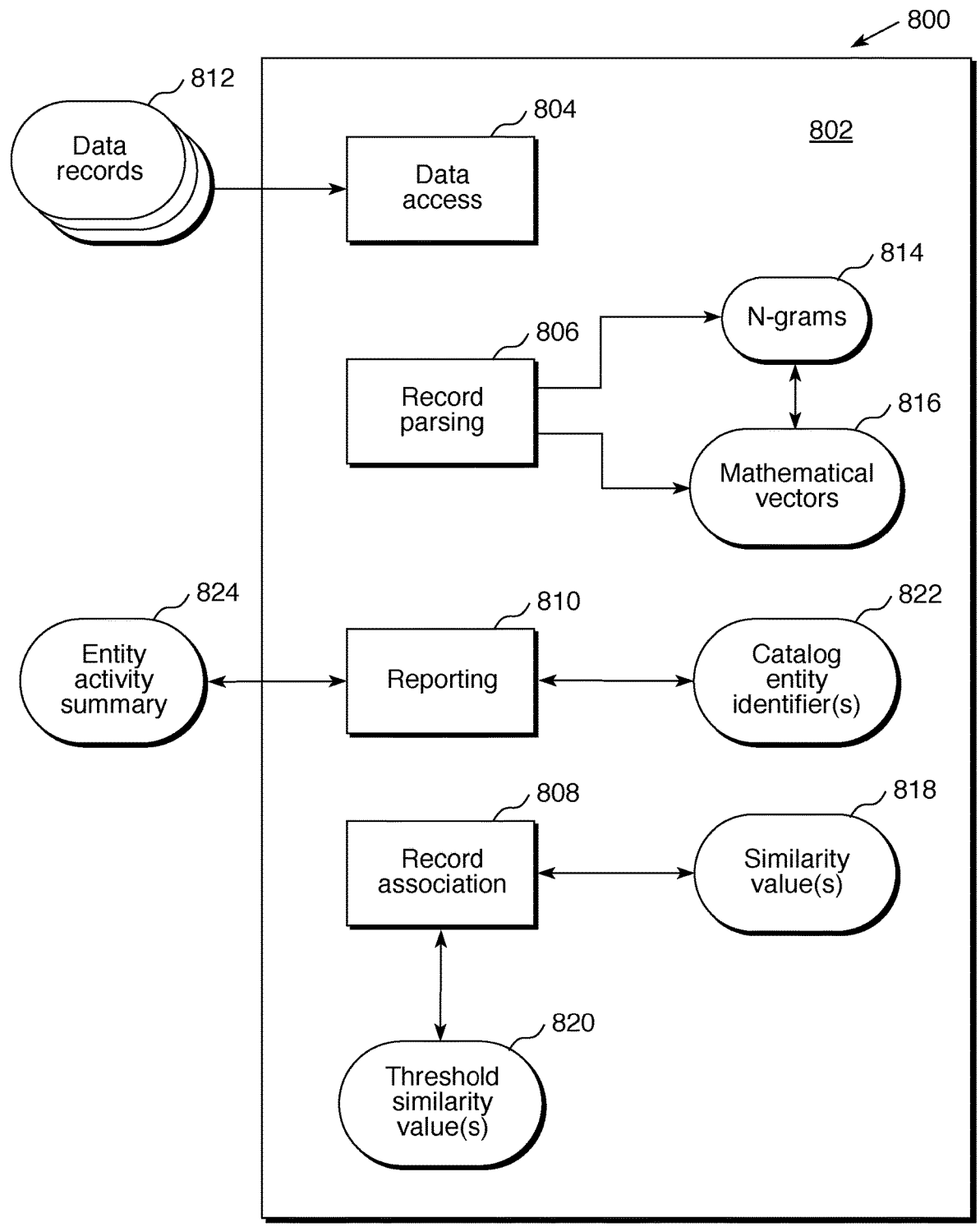
FIG. 8 depicts a block diagram of an apparatus for enhancing natural language processing.

Referencing FIG. 8, a schematic block diagram of an apparatus 800 for enhancing NLP, making certain data operations more efficient, providing more reliable output, and/or providing enhanced output is depicted. Without limiting the apparatus 800 to a specific application, presently known NLP algorithms suffer from performance and reliable output drawbacks when processing certain types of data, including data that is short and provides little context, data having mixed language aspects (e.g., English and Spanish terms in the same language sample), and/or language terms that may be shortened, abbreviated, non-grammatical, etc. The apparatus 800 is depicted in the context of a computing device 802, although the context of the apparatus 800 is not limiting, and portions of the apparatus may be distributed, networked, performed over the web, and/or include portions that include other hardware or devices consistent with the present disclosure.

The example apparatus 800 includes a data access circuit 804 that interprets data records 812. Example and non-limiting data access circuits 804 include input devices (e.g., for user-entered data, scanned documents and/or documents to be scanned, etc.), network communication devices, servers, network adapters (wired or wireless), computer memory storage and/or retrieval equipment or devices. Data records 812 may be any type of data record, including paper, electronic, labels, and the like. Example data records 812 include information within fields, but a data record 812 can include any type of information or formatting, including blocked information requiring parsing and/or processing to be divided into data fields, and formatted or unformatted information. Each data record 812 includes a number of data fields (natively or after processing).

The apparatus 800 further includes a record parsing circuit 806 that determines a number of n-grams 814 from terms of each of the data records 812. N-grams 814 include divisions of the field data from the data records 812, where "n" can be any whole integer (e.g., 1, 2, 3, or more units per n-gram), where the n can represent a number of words, characters, and/or phrases from the data record 812 field. The record parsing circuit 806 maps the number of n-grams to a corresponding number of mathematical vectors 816. In certain embodiments, the number of n-grams 814 and number of mathematical vectors 816 may not be the same number—e.g., 10 n-grams may map to a single mathematical vector 816 or a number of mathematical vectors 816. A corresponding number of n-grams and mathematical vectors 812 in this case indicates that each n-gram 814 is associated with one or more mathematical vectors 816. In one example, each mathematical vector 816 is a mathematical vector representing a field of the data record 812, although other organizations of mathematical vectors 816 are contemplated as known in the art. The apparatus 800 further includes a record association circuit 808 that determines whether a similarity value 818 between a first mathematical vector 816 including a first term of a first one of the data records 812 and a second mathematical vector 816 including a second term of a second one of the data records 812 is greater than a threshold similarity value 820. The threshold similarity value 820 may be a quantitative and/or qualitative description of the difference allowed between the mathematical vectors 816 between the first and second data records 812 wherein the data records 812 should be deemed associated when the difference is equal to and/or lower than the threshold similarity value 820. For example, when the mathematical vector 816 demonstrates that an entity designation for the records 812 is the same, when the mathematical vectors 816 for the data records 812 indicate that the same material is being shipped, and/or the mathematical vectors 816 indicate the two records 812 have sufficient similarities among a number of fields that they should be associated for the purpose contemplated, the threshold similarity value 820 can be set to identify the relationship between the data records 812 and make the association. One of skill in the art, having the benefit of the disclosure herein, and contemplating an apparatus 800 to associate data records 812 with ordinarily available information about the apparatus 800 and the data records 812, can select a value for the threshold similarity value 820 to associate the desired type and closeness of data records 812. Examples of the mathematical vector 816 exceeding the threshold similarity value 820 include, without limitation, one or more portions of the mathematical vectors 816 matching, one or more portions of the mathematical vectors 816 having a difference less than a selected threshold value, and/or the mathematical vectors 816 of the data records 812 having the same value.

The example record association circuit 808 associates the first and second data records 812 in response to the similarity value 818 exceeding the threshold similarity value 820. Associating the data records 812 includes any operation that marks the records as being related, and can include, without limitation, storing in a memory location the relationship and type of the association (e.g., same entity, same materials shipped, shipment above a cost threshold, same shipping destination, and likelihoods that any of the foregoing are true), which may be utilized in further analyses by the apparatus 800 and/or saved for future reporting and/or analysis.

In certain further embodiments, the apparatus 800 includes the at least two data records 812 having transactional records, and or the transactional records may further include customs transaction records. One of skill in the art will appreciate that the operations of the apparatus 800 may be beneficial in contexts outside of transactional records and/or customs transaction records. In certain further embodiments, the n-grams 814 include words from at least two distinct languages. Previously known NLP algorithms do not perform well in multi-lingual domains, however as the apparatus 800 can be language neutral, multi-lingual phrases and entries into the data records 812 can be parsed successfully as multi-lingual phrases appear within the data records 812 in similar contexts and fields. In certain embodiments, the terms from the data records 812 include numeric values, abbreviations, terms including jargon (e.g., industry- or entity-specific terms that are not likely to appear in a dictionary in the way they are used in the data records 812), acronyms, and/or initializations. Any of these types of terms are not likely to be successfully parsed by a previously known NLP, but the apparatus 800 can successfully parse these terms as they appear over a number of data records 812, and can be successfully parsed in the first instance after the apparatus 800 has processed a number of data records 812. In certain embodiments, the data records 812 include a number of fields, where at least one of the fields includes a shortened phrase, and where the shortened phrase includes a non-grammatical phrase, a phrase incorporating at least two distinct languages, an abbreviation, a term including jargon, an acronym, and an initialization. The apparatus 800 can successfully parse fields including these aspects within a shortened phrase, detecting similarities between data records 812 and associating data records 812 accordingly.

In certain further embodiments, the apparatus includes a reporting circuit 810 that provides a summary of activity 824 for an entity. The example reporting circuit 810 determines that the first term (of the first data record 812) is related to the second term (of the second data record 812) in response to the similarity value 818 exceeding the threshold similarity value 820, where the first term and the second term each correspond to an entity identifier (e.g., one of the fields for the data records 812), and the reporting circuit 810 provides a catalog entity identifier 822, and associates each of the first term and the second term to the catalog entity identifier 822. In one example, the reporting circuit 810 determines that an entity description field of the data records 812 between a first and second data record 812 are associated. The term catalog entity identifier 822 should be understood broadly, and includes any systematic identifier for an entity. An example catalog entity identifier 822 includes a "canon" name for an entity—for example a formal name, accepted name, or standardized name for an entity. The catalog entity identifier 822 may match an entity identifier field from one or more data records 812 (e.g., where the entity name is entered into the data record 812 identically to the catalog entity identifier 822) or the catalog entity identifier 822 may not match any field from the data records 812. An example apparatus 800 includes the catalog entity identifier 822 as an index identifier (e.g., an arbitrary value, an incremented value relative to an entity list, etc.) associated with a particular entity. In certain embodiments, a value analogous to the catalog entity identifier 822 may be utilized for any term, field, or other data from the data records 812—for example but not limited to shipping addresses, terminology for items listed in a shipping record, origination or destination locations, and/or simplified terms for complex entries.

Again referencing FIG. 8, an example system 800 includes a data access circuit 804 that interprets at least two data records 812, each having a number of data fields, and a means for mapping a number of n-grams 814 for each of the data records to a corresponding number of mathematical vectors 816. Without limitation to any other aspects of the present disclosure, example and non-limiting means for mapping n-grams 814 to mathematical vectors 816 include: a computer operating executable instructions from a computer readable medium to read the data records 812 from a memory location, scanned records, over a network, and/or through a web-based application, and to operate an n-gram parser on data from the data records 812 (either on the entire data set, or field-wise operation, or combinations thereof), where the n-gram parser includes n-gram sizes with n from 1 to 5, 1 to 10, 2 to 25, or any other whole integer ranges, and where the n-grams include characters (character vectors), words (word vectors), or other selected elements of the data from the data records 812. Example means for mapping n-grams 814 to mathematical vectors 816 further include a computer operating executable instruction from a computer readable medium to characterize elements of the data from the data records 812 into mathematical vectors which quantify the content therein for numerical comparison, and to associate a first data record 812 to a second data record 812 in response to the mapping—for example when appropriate mathematical vectors 816 are identical, close in the aggregate (e.g., a selected number of positions match, a selected number of positions are close to each other, an aggregate descriptor such as a sum, slope, or eigenvalue is within a selectable range, etc.), and/or when similar data (e.g., words) appear within the fields in a similar context. The example system 800 further includes the reporting circuit 808 that provides a summary of activity 824 for an entity in response to the associating.

Example and non-limiting summaries 824 include a number of shipments, quantities of items shipped, value of items shipped, histograms of shipment data (e.g., by calendar time, relative time, quantity, value, etc.), characterizations of anomalies (e.g., shipments that did not match the records 812, shipments of flagged materials, shipments that did not match scheduled shipping times, etc.), and/or a display of keywords or "top terms" associated with the entity from the data records 812. In certain embodiments, a summary 824 may include more than one entity grouped into the entity activity summary 824, either as aggregated or individually identifiable data. In certain embodiments, a summary 824 may be indexed to facilitate further research and analysis.

The example system 800 includes the reporting circuit 810 providing "smart alerts" to a user. For example, a reporting circuit 810 detects shipments and/or entities that may be of interest to the user, and provides a communication to the user (e.g., with an entity activity summary, an e-mail alert, a text alert, an update to an accessible web page to the user, or other alert mechanism) of the shipment and/or entity. Example operations to determine shipments and/or entities that may be of interest to the user include, without limitation: detecting searches the user has performed on particular entities and determining interest from the searches (e.g., including assessment of the recency or frequency of the search), accepting user input on shipments and/or entities that explicitly define user interest, determining that a similar entity or shipment (e.g., they ship similar products, have similar trading partners, similar origination and/or destination, or have mathematical vectors 816 that identify other similarities) is present in the data records 812 to other shipments or entities where the user has expressed interest (explicitly or implicitly), determining that a competitor, supplier, or other related entity to the user's entity may be of interest to the user, and/or combinations of these (e.g., determining that a competitor, supplier, or trading partner of the user has a shipment or entity of interest, and mapping that interest over to the user). The example reporting circuit 810 may prioritize, truncate, or otherwise modify an interest list to provide the user with the most likely information of interest listed first, to provide only a selected amount of information, and/or otherwise constrain the information presented.

In certain further embodiments, the system 800 includes a means for enhancing the associating in response to a number of data records associated with a first entity, and/or a means for enhancing the associating in response to a number of data records each associated with one of a number of entities. Without limitation to any other aspects of the present disclosure, example means for enhancing the associating include aggregating multiple data records 812 from the same entity for analysis together (e.g., enhancing the amount of data to provide additional context for key terms), looking across multiple entities for data records 812 that have a similar characteristic and aggregating those data records 812 for analysis together (again enhancing the amount of data and context available) such as similar items shipped, similar record types, shared keywords, similar shipment values, and/or records having shared origination, destination, or intermediate delivery values. Additionally or alternatively, the means for enhancing the associating includes constructing a network of relationships between shipment terms and entities (e.g., each entity may have many distinct shipment terms and each shipment term can potentially occur in records associated with multiple entities), and constructing a measure of similarity between distinct terms by the number of entities that share both terms in their shipment descriptions. The means for associating the enhancing, in certain embodiments, includes associating by modifying the similarity comparison of mathematical vectors 816 utilizing the measure of similarity between distinct terms with multiple entities sharing both terms in the shipment descriptions.

An example system 800 further includes a means for associating a catalog identifier 822 to each of the first term and the second term. Without limitation to any other aspects of the present disclosure, example means for associating a catalog identifier 822 to each of the first term and second term includes executable instructions on a computer readable medium, which when executed by a computer to determine the terms are associated, related, and/or have matching meanings, to determine a reference value (the catalog entity identifier 822 and/or a precursor thereof) for the terms (e.g., a standardized, canonical, simplified, abbreviated, and/or index value), and to associate the terms with the reference value. The catalog entity identifier 822 may be utilized in place of, in addition to, or may be replaced in the stored data from the data records 812, wherever the first term and second term are utilized by the system 800. In certain embodiments, the catalog entity identifier 822 value is utilized with n-grams 814 and mathematical vectors 816 (e.g., the associated terms will provide identical contributions to the data processing). In certain embodiments, the catalog entity identifier 822 value is utilized for external reporting (e.g., in an entity activity summary 824). An example system 800 includes the first term and/or the second term having a numeric value, an abbreviation, a term including jargon, an acronym, and/or an initialization. An example system 800 includes the data records 812 having a number of fields, where at least one of the fields includes a shortened phrase, and where the shortened phrase includes a non-grammatical phrase, a phrase incorporating at least two distinct languages, an abbreviation, a term including jargon, an acronym, and/or an initialization.

Figure 9:
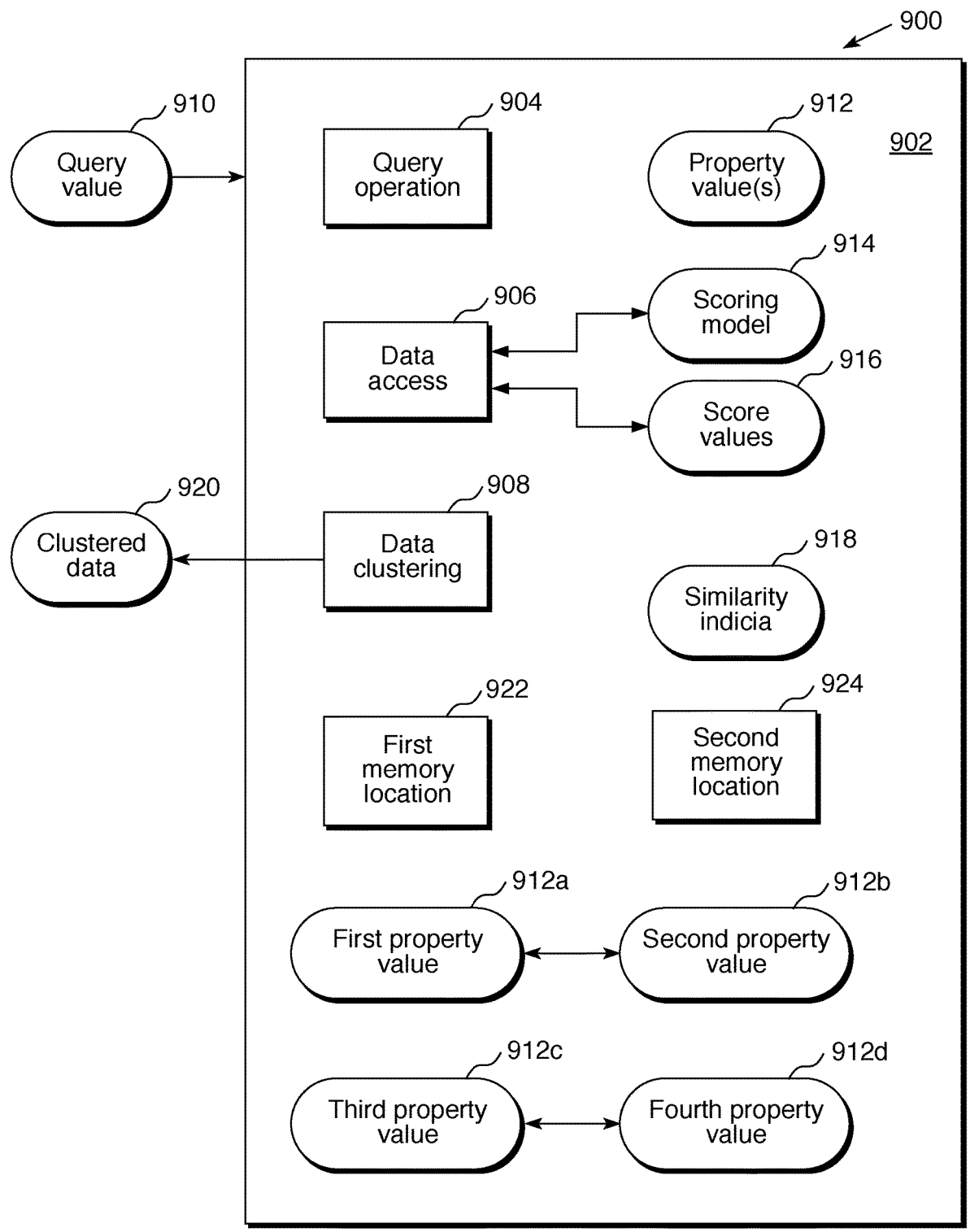
FIG. 9 depicts a block diagram of an apparatus that facilitates independent processing of clustering operations.

Referencing FIG. 9, an example system 900 is depicted that facilitates independent processing of clustering operations based on query functions to provide improved performance over monotonic processing of a given set of data entries. System 900 includes a query operation circuit 904 that interprets a query value 910. The system 900 is depicted in the context of a computing device 902, although the context of the system 900 is not limiting, and portions of the system may be distributed, networked, performed over the web, and/or include portions that include other hardware or devices consistent with the present disclosure. The query value 910 may be provided by a user input, an automated user request, compiled from other values (e.g., based on an interest list for a user, but not directly input or requested by the user), and/or be determined from a data record, automated request, or the like. The system 900 further includes a data access circuit 906 that interprets a first data record (e.g., a data record 812, not shown) having at least one first property value 912 and a second data record 912 having at least one second property value, and stores the first and second property values 912 in a first memory location 922. The system 900 further includes a data clustering circuit 908 that operates a scoring model 914 on the query value 910 and the first property value 912 to determine a first score value 916 corresponding to the first property value 912. The data clustering circuit 908 further compares the first property value 912 to the second property value 912, and where the property values 912 have the same value, the data clustering circuit 908 determines that a second score value 916 corresponding to the second property value 912 has the same value as the first score value 912, without operating the scoring model 914 on the second property value 912. Accordingly, the time and processing utilization to operate the scoring model 914 are saved, and the overall operations of the system 900 are improved. In certain embodiments, the comparing the first property value 912 to the second property value 912 does not involve property values 912 that are technically identical, but are associable—for example by sharing a catalog entity identifier 822 and/or being similar under considerations utilized as described in reference to determining the catalog entity identifier 822 preceding.

In certain further embodiments, an example system 900 includes a means for clustering a first set of data on a first processing thread, and clustering a second set of data on a second processing thread, where the first set of data includes the first data record and the second data record ("clustering means"). Without limitation to any other aspects of the present disclosure, example clustering means are described herein. An example clustering means includes a number of processing threads available—for example a multi-threaded processor, a processor having multiple cores available, one or more networked computers capable of communicating processing threads (either actual or virtual threads) such as a networked computer cluster and/or a web-based processor sharing group. The example clustering means further includes the raw data values stored in a memory location separate from the clustering information (such as the cluster descriptions, clustering precursor information, and/or the score values 916)—for example storing the property values 912 in the first memory location 922 and the clustering information in a second memory location 918. Example clustering precursor information includes cluster assignments of historical data and the number of records that each record matched to. One of skill in the art will recognize that, having the clustering information available in a separate memory location allows parallel processing of portions of the data records to provide consistent incremental clustering that will achieve the same cluster results as processing all of the data at once and/or in a single processing thread. Further, clustering can be performed sequentially, where the system 900 already has a large clustered database (e.g. with thousands or millions of clustered records), and new data records can be clustered in without re-running the entire clustering operation. In one example, clustering is performed onto pairs of scored links, allowing for clustering to occur before the scoring reducing operations of the scoring model, and allowing incremental clustering to continue to occur after the cluster-to-record association is stored.

The clustering information at the second memory location 918 having the score values 916 is, in certain embodiments, accessible to the processing threads. Example first memory locations 922 include a memory cache and accessible to the appropriate processors, a distributed memory allocation (e.g., virtual), a page file, and similar memory constructs. The separation of the first memory location 922 from the second memory location 924 may be physical (e.g., stored on separate devices), virtual (e.g., a separate cache, page file, or other memory allocation device), or logical (e.g., referencing programs allocate separate memory addresses within a shared memory space). In certain embodiments, all of the clustering information is available in the second memory location 924, as well as any comparison indicators between property values 912 (e.g., the first is a higher relevancy link than the third, etc.), allowing for separated processing of portions of the scoring, and thereby going through the links with multiple processes will yield the same results as doing the entire data block with one process, but performed more quickly. Additionally, any learning performed during the processing (e.g., relationships between property values 912, comparison indicators between link scores, and the like) will be utilized by the entire processing thread even with distributed processing. In certain embodiments, the clustering means includes executable instructions stored on a computer readable medium which, when executed, allow the computer(s) to cluster potential matches in the property values 912 together (e.g., entity name, shipment type, shipment value, quantities of items shipped, value of items shipped, anomaly occurrence and/or count, etc.) from the data stored in the cache (first memory location 922 and/or second memory location 924), and store that learning in an accessible location (e.g., the second memory location 924) without having to read and process (e.g., parse and/or format) the data after an updated query value 910 is provided. The clustered data is then stored and accessible for future processing, for example to compare two entities on other dimensions of the data. Additionally, where the property value 912 for two data records is a match, the scoring model 914 does not need to be executed, allowing for an update of the score for one of the two records from a score for the other of the two records that has already been calculated. An example clustering means further includes executable instructions stored on a computer readable medium which, when executed, allow the computer(s) to keep a list match, such that if another property value 912 appears having a match to any scored property value 912, execution of the scoring model 914 can again be skipped (e.g., if a field of records A:B are the same, and that field of records A:C are determined to be the same, it is known that the field of B:C will be the same). A further example clustering means includes executable instructions stored on a computer readable medium which, when executed, allow the computer(s) to make analogous comparisons between records—for example if a record comparison has shown that "WalMart" in one record is equated with "Wal Mart" in another record, then a second record comparison could equate "Costco" with "Cost co" if the similarity profiles between the two records otherwise show similar relationships (e.g., both record pairs have respective matching addresses, contact information, trading partners, or other criteria utilized to establish an entity match). The provided example is related to the entity name for a record, but other types of information can similarly be analogized (e.g., shipped product, related entities, etc.). The clustered data 920 may be stored for further use, provided to an output device (e.g., a display, message, network communication, file stored on a device, etc.), and/or utilized in further data processing operations.

An example system 900 includes the data clustering circuit 908 further operating the model 914 on the query value 910 and the second property value 912b to determine a second score value 916 corresponding to the second property value 912b, and the system 900 further including a means for adjusting the second score value 916 in response to a similarity index 918 between the first property value 912a and the second property value 912b. Without limitation to any other aspects of the present disclosure, example means for adjusting a score 916 are described herein. An example means for adjusting a score 916 includes executable instructions on a computer readable medium, that when executed the instructions cause a computer to make a comparison between the first property value 912a and the second property value 912b to determine a similarity index 918 between the property values. In one example, the scoring model 914 may determine the first score value 916 is much higher than the second score value 916, for example where the first property value 912a is a better fit to the query value 910. However, the similarity index 918 may determine that the second property value 912b, while not matching the query value 910, is nevertheless closely related to the first property value 912a. Accordingly, the means for adjusting further adjusts the second score value 916 toward the first score value 916. In certain embodiments, the adjusting may include determining that the intended second property value 912b is the same value as the first property value 912a (e.g., a mis-spelling, abbreviation, alternate spelling, etc.). The adjusting may include making the second score value 916 equal to the first score value 916, and/or moving the second score value 916 partially toward the first score value 916. Criteria utilized in adjusting the second score value 916 may include how close the match is believed to be (e.g., the same entity vs. a related entity, the same product shipped vs. an analog or substitute, but similar, product, etc.) and/or how a confidence level of the similarity between the first property value 912a and the second property value 912b—such as if the comparison generates an 85% certainty that the second property value 912b was intended to be equal to the first property value 912a, then the second score value 916 may be moved some fraction (e.g., 85%, 50%, a selected incremental amount, etc.) toward the first score value 916. As the system 900 develops more confidence in the match over time, for example as additional data records improve the similarity index 918 between the first property value 912*a* and the second property value 912*b*, an example means for adjusting is configured to further adjust the second score value 916 toward the first score value 916. In a further example, if the third property value 912*c* has a similarity index 918 with the first property value 912*a*, the third score value 916 may be adjusted toward the first and/or second score value 916. Additionally or alternatively, if the addition of the third property value 912*a* to the set improves or decreases the confidence or quality of the similarity index 918 between the first property value 912*a* and the second property value 912*b*, the second score value 916 may be further adjusted toward the first score value 916 in a manner consistent with the change in confidence (e.g., toward the first score value 916, away from the first score value 916, toward an unadjusted second score value 916, and/or toward the third score value 916).

An example system 900 further includes the data access circuit 906 further interpreting a third data record having at least one third property value 912*c* and a fourth data record having at least one fourth property value 912*d*, and storing the third and fourth property values 912*c*, 912*d* in the first memory location 922. The example data clustering circuit 908 further operates the scoring model 916 on the query value 910 and the third property value 912*c* to determine a third score value 916 corresponding to the third property value 912*c*, and operates the scoring model 914 on the query value 910 and the fourth property value 912*d* to determine a fourth score value 916 corresponding to the fourth property value 912*d*. The example system 900 further includes a means for adjusting the fourth score value 916 in response to a second similarity index 918 between the third property value 912*c* and the fourth property value 912*d*, and further in response to the similarity index 918. Without limitation to any other aspects of the present disclosure, example means for adjusting a score 916 are described herein. An example means for adjusting a score 916 includes executable instructions on a computer readable medium, that when executed the instructions cause a computer to make a change in the fourth score value 916 toward the third score value 916 in response to the adjustment of the second score value 916 toward the first score value 916. For example, if the third:fourth similarity index 918 is the same as the first:second similarity index 918, the adjustment of the fourth score value 916 toward the third score value 916 may be made in an analogous amount as the adjustment of the second score value 916 toward the first score value 916 (e.g., the same increment of adjustment, the same fraction of adjustment, or other analogous adjustment). In a further example, if the third:fourth similarity index 918 is greater than or less than the first:second similarity index 918, the adjustment of the fourth score value 916 toward the third score value 916 may be made in a greater or lower analogous amount than the adjustment of the second score value 916 toward the first score value 916.

Figure 10:
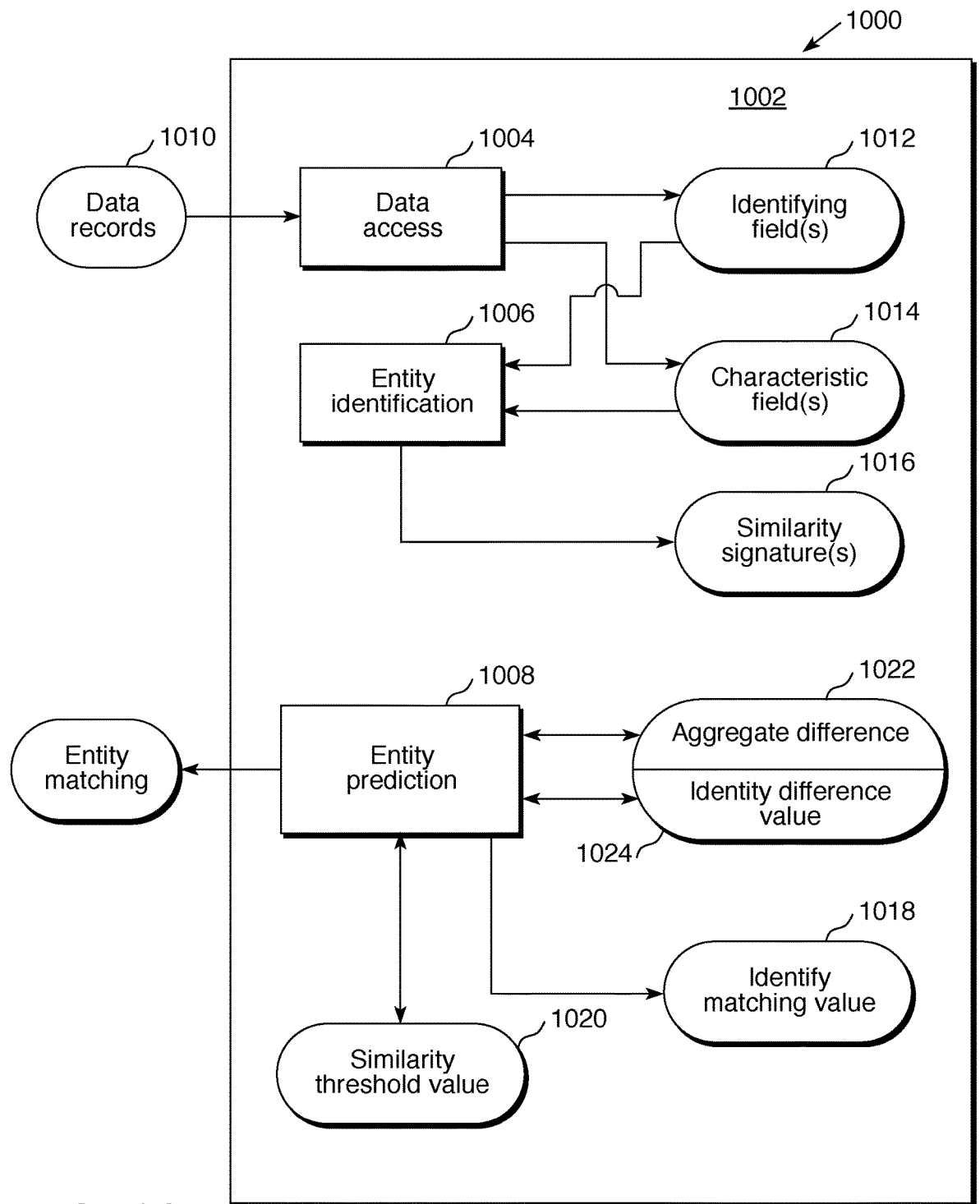
FIG. 10 depicts a block diagram of an apparatus that facilitates determining similarity among data sets.

Referencing FIG. 10, an example system 1000 is depicted that facilitates determining similarity among data sets based on processing similarity signatures of the sets rather than performing similarity analysis on the data sets directly in all cases, thereby reducing processing time to achieve comparable results. The example system 1000 includes a data access circuit 1004 that interprets a number of data records 1010, each data record 1010 including at least one identifying field 1012 and a number of characteristic fields 1014. The system further includes an entity identification circuit 1006 that determines a similarity signature 1016 in response to a first data record 1010 and a second data record 1010, the first data record 1010 and the second data record 1010 having a matching identifying field 1012, and that determines the similarity signature 1016 in response to at least one corresponding characteristic field 1014 between the first data record 1010 and the second data record 1010. For example, the similarity signature 1016 may have an indication that shipping addresses, shipped products, shipped product names (including, for example, abbreviation or other informal usage patterns), contact information, and/or trading partners are a match between the first data record 1010 and the second data record 1010. The matching identifying field 1012 need not include identical identifying fields 1012, but rather includes identifying fields 1012 that are known or estimated to indicate that the entity for the first data record 1010 is a match with the entity for the second data record 1010.

An example system 1000 further includes the entity identification circuit 1006 further adjusting the similarity signature 1016 in response to a third data record 1010 having a matching identifying field 1012 to the first data record 1010 and the second data record 1010. For example, if the third data record 1010 is known or estimated to be the same entity as for the first and second data records 1010, the similarity signature 1016 may be adjusted (e.g., to narrow or expand the matching fields between the data records 1010 that sufficiently describe records likely to have a matching entity, based on the additional information). The example system 1000 further includes an entity prediction circuit 1008 that determines a second similarity signature 1016 in response to a fourth data record 1010 and a fifth data record 1010, compares the second similarity signature 1016 to the similarity signature 1016, and determines the fourth data record 1010 and the fifth data record 1010 have matching identifying fields 1012 in response to the comparing. For example, the similarity signature 1016 from the first and second data records 1010 may indicate that, when the shipping address, contact information, and trading partners match, then the entity is likely to be the same. Accordingly, if the fourth:fifth similarity signature 1016 is sufficiently close to the first:second or first:second:third similarity signature 1016, the entity prediction circuit 1008 can determine that the fourth and fifth data records 1010 are likely to have the same entity.

An example entity prediction circuit 1008 further determines the fourth data record 1010 and the fifth data record 1010 have matching identifying fields 1012 in response to the comparing by identifying whether a number of matches between the similarity signature 1016 and the second similarity signature 1016 exceeds an identity matching value 1018. For example, if 25 out of 28 fields used in the similarity signature 1016 match, in certain embodiments the entity prediction circuit 1008 may determine the fourth and fifth data records 1010 are from the same entity. In certain embodiments, the entity prediction circuit 1008 further adjusts the identity matching value 1018 in response to a third data record 1010 having a matching identifying field 1012 to the first data record 1010 and the second data record 1010. For example, if after analyzing the first and second data records 1010, thirty (30) promising fields to describe a match are found, the identity matching value 1018 may be set to test those thirty (30) fields for other similarity comparisons. However, in one example, after considering the third data record 1010, it is determined that only twenty (20) of those fields are required to determine a match, the entity prediction circuit 1008 may narrow the number of fields considered, and/or the required closeness of the match on those fields. Additionally or alternatively, the entity prediction circuit 1008 may add fields to the similarity signature 1016, and/or broaden an acceptable range (e.g., the similarity threshold value 1020) of a given field for consideration. An example entity prediction circuit 1008 further determines the fourth data record 1010 and the fifth data record 1010 have matching identifying fields 1012 in response to the comparing by identifying whether a number of similar fields between the similarity signature 1016 and the second similarity signature 1016 exceeds an identity matching value 1018, and determining the number of similar fields according to a number of corresponding fields that are within a similarity threshold value 1020.

In certain further embodiments, the system 1000 includes the entity prediction circuit 1008 further comparing the similarity signature 1016 and the second similarity signature 1016 utilizing a distinct value of the similarity threshold value 1020 for each of the fields between the similarity signature 1016 and the second similarity signature 1016. An example entity prediction circuit 1008 further adjusts at least one similarity threshold value 1020 in response to a third data record 1010 having a matching identifying field 1012 to the first data record 1010 and the second data record 1010. In certain further embodiments, the system 1000 includes the entity prediction circuit 1008 further determining the fourth data record 1010 and the fifth data record 1010 have matching identifying fields 1012 in response to the comparing by determining an aggregate difference 1022 between the similarity signature 1016 and the second similarity signature 1016, and determining the fourth data record 1010 and the fifth data record 1010 have matching identifying field 1012 in response to the aggregate difference 1022 being lower than an identity difference value 1024. For example, the entity prediction circuit 1008 may include a sum, an average, or another aggregate description of the field differences between the similarity index 1016 and the second similarity index 1016, in addition to or as an alternative to looking at field-by-field comparisons. An example entity prediction circuit 1008 further determines the aggregate difference 1022 between the similarity signature 1016 and the second similarity signature 1016 by performing at least one operation such as weighting each field difference between the similarity signature 1016 and the second similarity signature 1016, applying a classification function to the differences between the similarity signature 1016 and the second similarity signature 1016 (e.g., checking that a sum of squared differences between the two is lower than a threshold, or other classification-type analysis), and/or applying a neural network operation on the field differences between the similarity signature 1016 and the second similarity signature 1016. Example and non-limiting neural network operations include making decisions separately on a field-by-field basis (e.g., certain fields will preclude or dictate whether an entity match is made, which operates in parallel with other difference determinations), performing a Bayesian or fuzzy logic analysis on the field differences and coming up with a likely match value based on the analysis, and/or looking statistically at a number of known entity matches to determine whether there is a theory within the entire data set that precludes or dictates that a match is likely. An example entity prediction circuit 1008 iteratively updates the aggregate difference 1022 determination in response to additional data records having a matching identifying field to the first data record and the second data record. The examples herein relating to the system 1000 have been described in relation to matching entities from data records 1010, however analogous operations can be performed for any other fields in the data records where matching is desired, including without limitation trading partners, shipped products, and anomalous shipping events.

The schematic flow descriptions and reference schematic flow diagrams which follow describe certain operations to enhance NLP and/or make certain data operations more efficient, provide more reliable output, and/or provide enhanced output. Operations described are non-limiting examples, and operations are described in an order of selected steps to provide for clarity of description, but operations may be omitted, divided, distributed, and/or re-ordered except where explicitly described otherwise.

Figure 11:
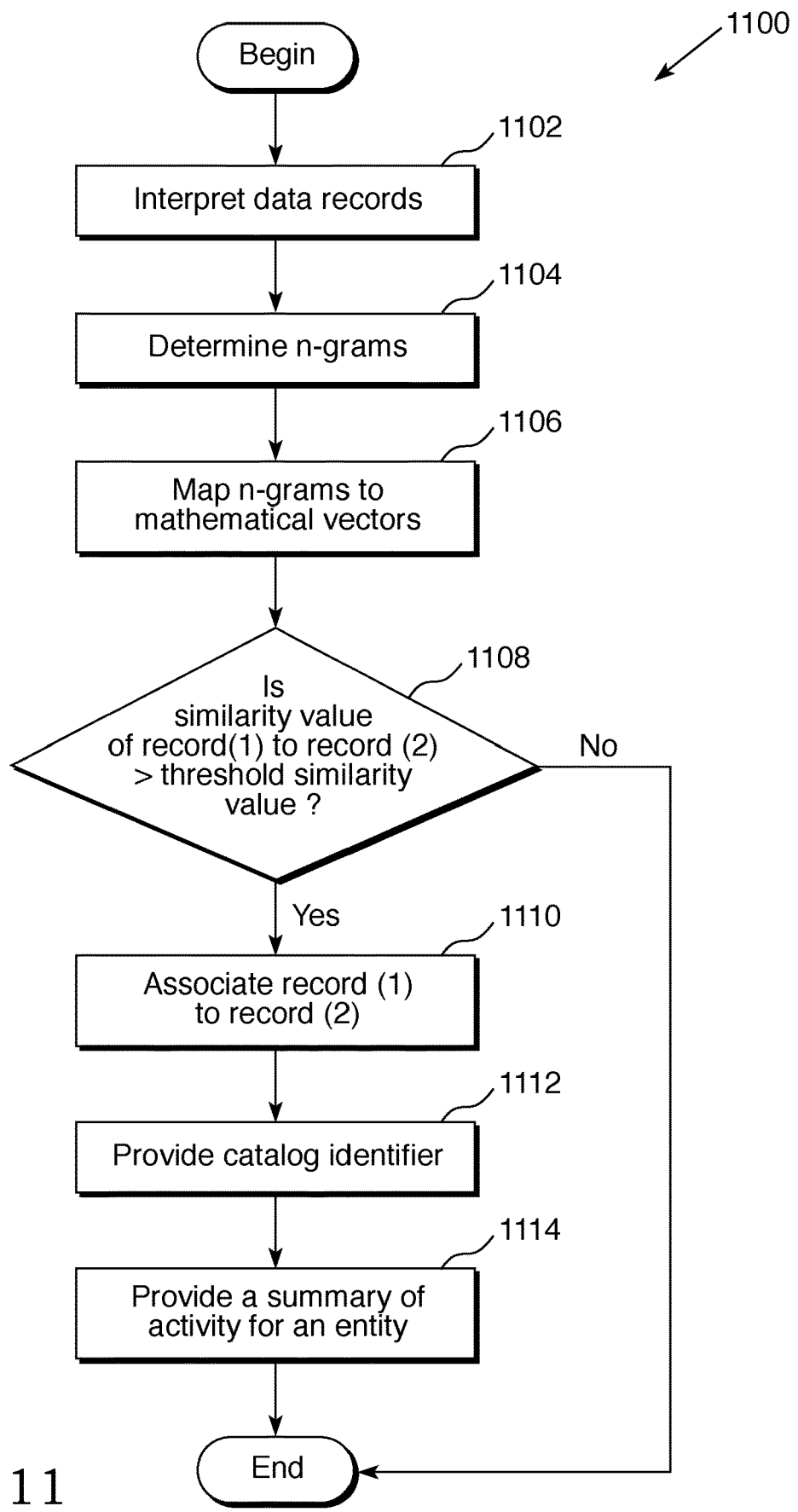
FIG. 11 depicts a flow chart of an embodiment for enhancing natural language processing.

Referencing FIG. 11, a procedure 1100 includes an operation 1102 to interpret at least two data records, each having a number of data fields, and an operation determine 1104 a number of n-grams from terms of each of the data records. The example procedure 1100 further includes an operation 1106 to map the n-grams to a corresponding number of mathematical vectors, and an operation 1108 to determine whether a similarity value between a first mathematical vector including a first term of a first one of the data records and a second mathematical vector including a second term of a second one of the data records is greater than a threshold similarity value. In response to the operation 1108 determining the similarity value is greater than the threshold similarity value, the procedure 1100 includes an operation 1110 to associate the first one of the data records with the second one of the data records. An example procedure 1100 further includes the operation 1110 determining that the first term is related to the second term in response to the similarity value exceeding the threshold similarity value, determining that the first term is synonymous with the second term in response to the similarity value exceeding the threshold similarity value. In certain embodiments, the first term and the second term correspond to entity identifiers for the data records. The example procedure 1100 further includes an operation 1112 to provide a catalog identifier and associating each of the first term and the second term to the catalog identifier. In certain embodiments, the catalog identifier matches the first term and/or the second term. The example procedure 1100 further includes an operation 1114 to provide a summary of activity for an entity in response to the associating operation 1110.

In certain further embodiments, the operation 1106 includes utilizing n-grams having an n value of at least two. In certain embodiments, the procedure 1100 includes determining that a number of the data records correspond to a first entity, where the operation 1108 includes determining the similarity value further in response to determining the records correspond to the first entity. In certain further embodiments, the procedure 1100 includes determining that a first set of a number of the data records correspond to a first entity, determining that a second set of the number of the data records correspond to a second entity, and the operation 1108 includes determining the similarity value further in response to shared terms from the first set and second set of the data records. In certain embodiments, the operation 1110 includes determining that the first term is related to the second term in response to the similarity value exceeding the threshold similarity value, where the first term and the second term each correspond to an entity identifier for the data records, and the operation 1112 providing a catalog entity identifier includes associating each of the first term and the second term to the catalog entity identifier.

Figure 12:
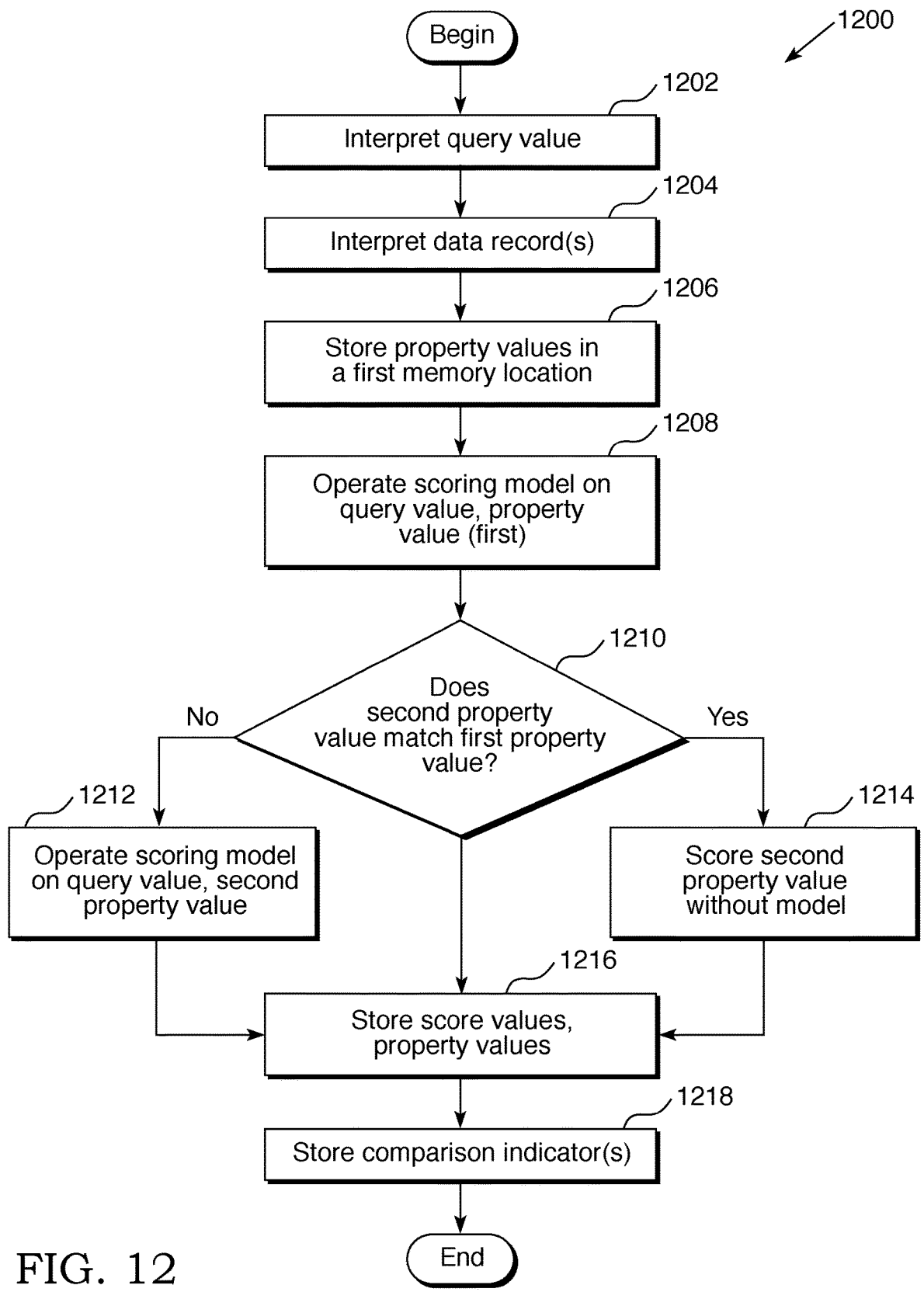
FIG. 12 depicts a flow chart of an embodiment for operating a scoring model on a query value.

Referencing FIG. 12, an example procedure 1200 includes an operation 1202 to interpret a query value, an operation 1204 to interpret a first data record having at least one first property value and a second data record having at least one second property value, and an operation 1206 to store the first and second property values in a first memory location. The procedure 1200 further includes an operation 1208 to operate a scoring model on the query value and the first property value to determine a first score value corresponding to the first property value, and an operation 1210 to determine whether the response to the first property value having the same value as the second property value. In response to the second property value having the same value as the first property value, the procedure 1200 includes an operation 1214 to determine that a second score value corresponding to the second property value has the same value as the first score value, without operating the scoring model on the second property value. The procedure 1200 includes an operation 1212 to operate the scoring model on the query value and the second property value to determine the second score value, where the second property value does not have the same value as the first property value. The procedure 1200 includes an operation 1216 to store the first score value, the second score value, the first property value, and the second property value. In certain embodiments, the operation 1204 includes interpreting a third data record having at least one third property value, the operation 1216 includes storing the third property value in a first memory location, and the operation 1214 includes determining that a third score value corresponding to the third property value has the same value as the second score value, without operating the model on the third property value, in response to operation 1210 determining the third property value having the same value as the second property value.

An example procedure 1200 includes an operation 1218 to further store a comparison indicator between the first data record and the second data record in a second memory location, and to store the first property value and the second property value in the first memory location. In certain embodiments, the operation 1210 further includes the operation 1204 interpreting the third data record having at least one third property value, the operation 1216 storing the third property value in the first memory location, and the operation 1210 determining the third property value has the same value as the second property value further in response to the comparison indicator. An example procedure 1200 further includes the operation 1204 to interpret a fourth data record having at least one fourth property value, the operation 1210 includes comparing the fourth property value to at least one of the first and second property values from the first memory location, the operation 1212 includes operating the scoring model on the query value and the fourth property value to determine a fourth score value, and an operation (not shown) to compare the fourth score value to at least one of the first and second score values from the second memory location.

Figure 13:
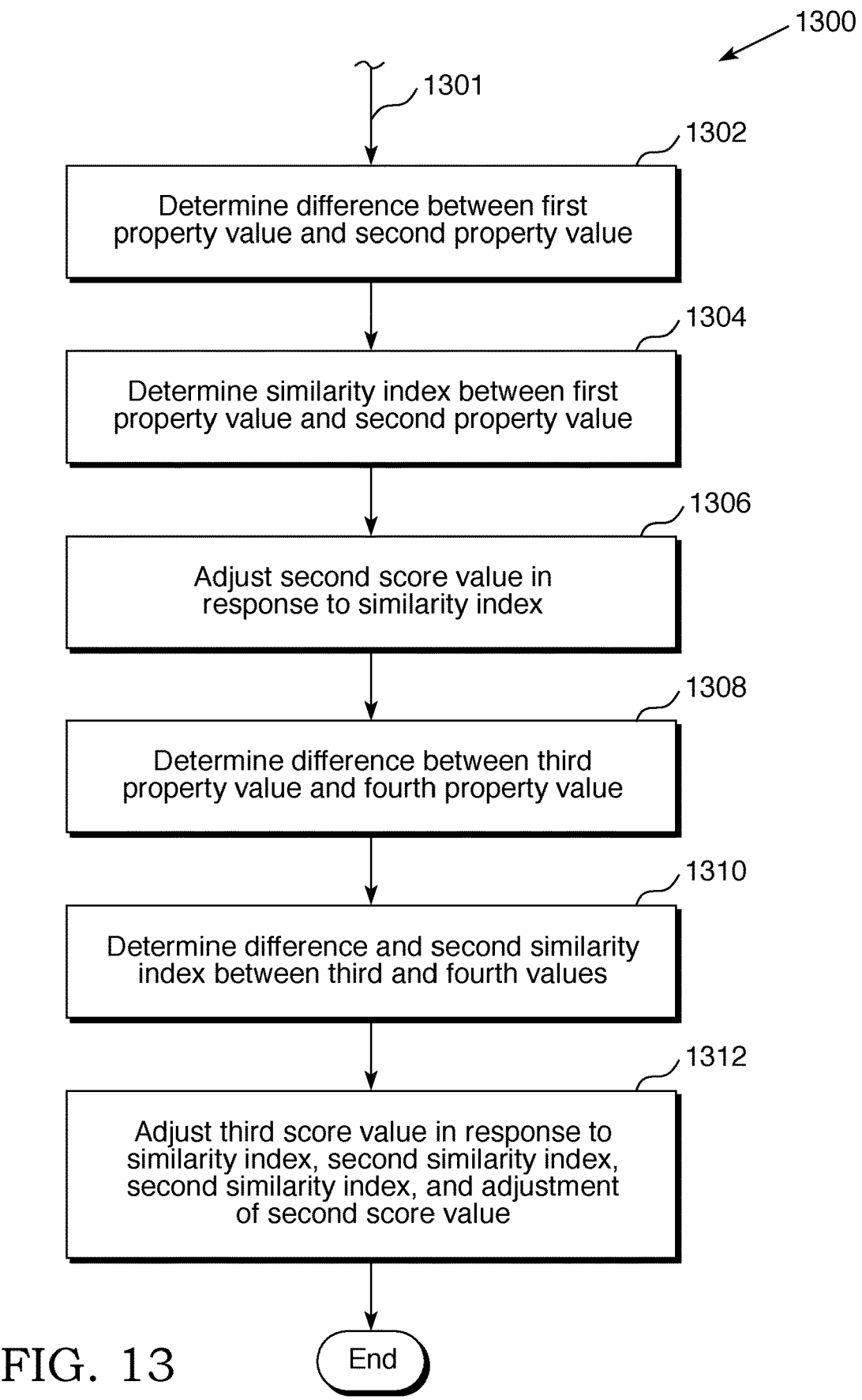
FIG. 13 depicts a flow chart of an embodiment for determining similarity index between property values.

An example procedure 1200 includes the operation 1212 to operate the scoring model on the query value and the second property value to determine a second score value. Referencing FIG. 13, an example procedure, continuing at 1301 from a portion of the procedure 1200 (in one example, in place of or co-operating with operation 1212), includes an operation 1302 to determine a difference between the first property value and the second property value, and an operation 1304 to determine and a similarity index between the first property value and the second property value in response to the difference between the first property value and the second property value. The procedure 1300 includes an operation 1306 to adjust the second score value toward the first score value in response to the similarity index. In certain further embodiments, the operation 1304 includes determining the first property value and the second property value are likely to have a same intended value, and the operation 1306 includes adjusting the second score value by making the second score value equal to the first score value.

The example procedure 1300 includes the operation 1204 interpreting a third data record having at least one third property value and a fourth data record having at least one fourth property value, the operation 1212 operating the scoring model on the query value and the third property value to determine a third score value and operating the scoring model on the query value and the fourth property value to determine a fourth score value, and an operation 1308 includes determining a difference between the third property value and the fourth property value. The procedure 1300 includes an operation 1310 to determine a second similarity index between the third property value and the fourth property value in response to the difference between the third property value and the fourth property value, and an operation 1312 includes adjusting the third score value in response to the second similarity index. In certain further embodiments, the operation 1310 includes determining the second similarity index is similar to the similarity index, and the operation 1312 includes adjusting the fourth score value is further in response to the adjusting the second score value.

Figure 14:
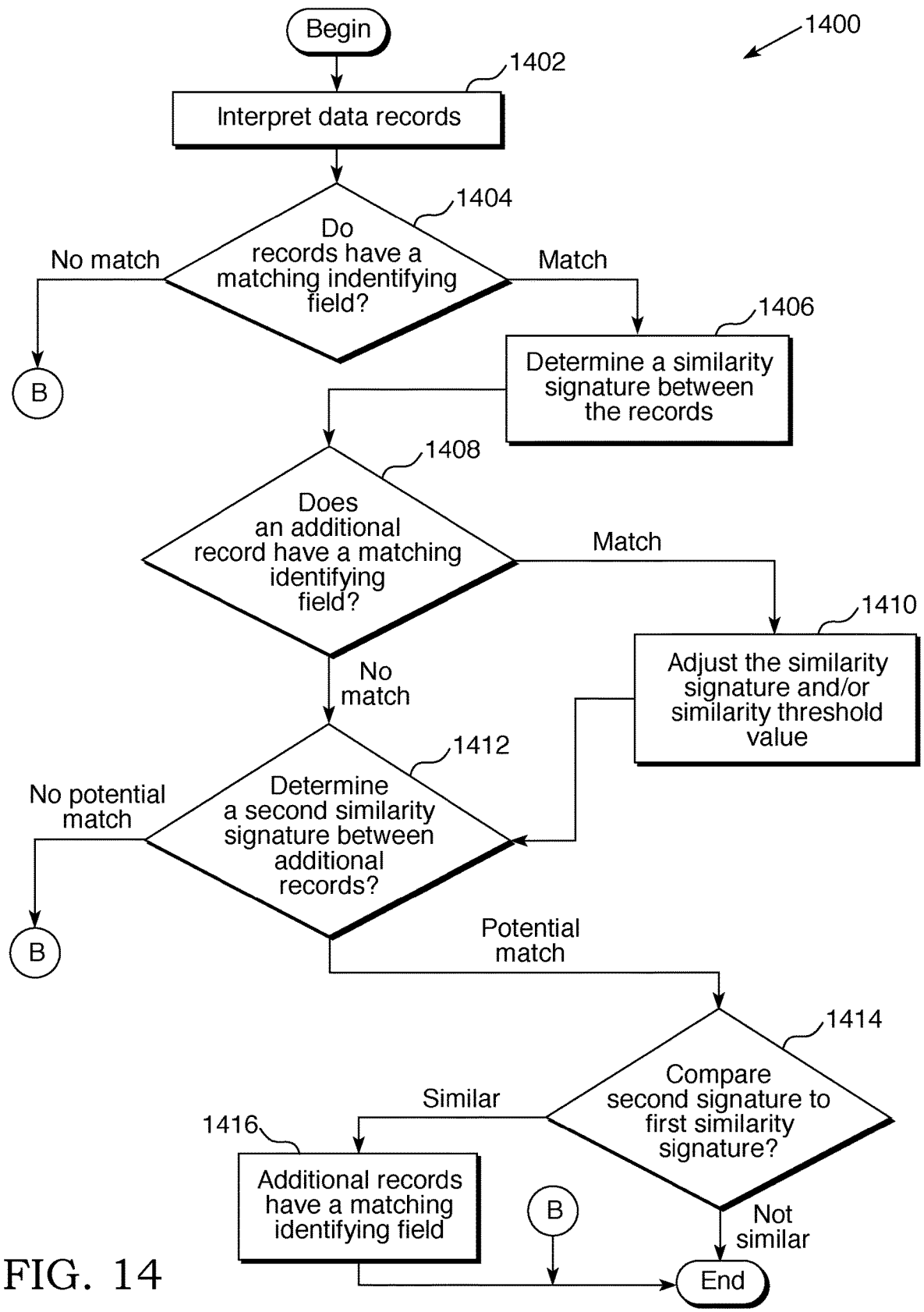
FIG. 14 depicts a flow chart of an embodiment for determining a similarity signature between records.

Referencing FIG. 14, an example procedure 1400 includes an operation 1402 to interpret a number of data records, each data record having at least one identifying field and a number of characteristic fields, and an operation 1406 to determine a similarity signature in response to a first data record and a second data record, in response to an operation 1404 determining the first data record and the second data record having a matching identifying field. The operation 1406 determines the similarity signature in response to at least one corresponding characteristic field between the first data record and the second data record. An example procedure 1400 includes the operation 1404 to determine the identifying fields of the first data record and the second data record as matching when the identifying fields of the first data record and the second data record are identical. The example procedure 1400 includes an operation 1410 to adjust the similarity signature in response to an operation 1408 determining third data record includes a matching identifying field to the first data record and the second data record. An example operation 1408 includes determining a second similarity signature, for example in response to a fourth data record and a fifth data record, in response to the operation 1408 determining the fourth data record and the fifth data record do not have a matching identifying field to the first data record and the second data record. The procedure 1400 includes an operation 1414 to compare the second similarity signature to the similarity signature, and an operation 1416 to determine the fourth data record and the fifth data record have matching identifying fields in response to the operation 1414 determining the second similarity signature is similar to the similarity signature. In certain embodiments, the operation 1416 to determine the fourth data record and the fifth data record have matching identifying fields is in response to the operation 1414 identifying that a number of matches between the similarity signature and the second similarity signature exceeds an identity matching value. The example procedure 1400 further includes an operation (not shown) to adjust the identity matching value in response to a third data record having a matching identifying field to the first data record and the second data record. An example procedure 1400 includes the operation 1416 determining the fourth data record and the fifth data record have matching identifying fields in response to the operation 1414 by identifying whether a number of similar fields between the similarity signature and the second similarity signature exceeds an identity matching value, the number of similar fields determined according to a number of corresponding fields that are within a similarity threshold value, and/or wherein the operation 1414 utilizes a distinct value of the similarity threshold value for each of the fields between the similarity signature and the second similarity signature.

An example procedure 1400 further includes an operation (not shown) to adjust at least one similarity threshold value in response to a third data record having a matching identifying field to the first data record and the second data record. In certain embodiments, the operation 1416 to determine the fourth data record and the fifth data record have matching identifying fields is in response to the operation 1414 determining an aggregate difference between the similarity signature and the second similarity signature, and determining the fourth data record and the fifth data record have matching identifying field in response to the aggregate difference being lower than an identity difference value. An example operation 1414 includes determining the aggregate difference between the similarity signature and the second similarity signature by performing at least one operation such as weighting each field difference between the similarity signature and the second similarity signature, applying a classification function to the differences between the similarity signature and the second similarity signature, and/or applying a neural network operation on the field differences between the similarity signature and the second similarity signature. An example procedure 1400 includes iteratively updating the aggregate difference determination in response to additional data records having a matching identifying field to the first data record and the second data record.

Risk Monitoring/Propagation with Network Structure Analysis:

Natural language processing for customs and other transaction records as described herein may be applied in combination with network community analysis techniques to help identify trade risks, disruptions, news and the like as well as propagate these identified trade-related issues to relevant third parties, such as buyers and suppliers. Sources of data that may be processed may include customs transactions, trade records, digital news, weather reports, company news (e.g., websites, press releases, and the like), aggregated trade data, macro trade data, trade data trending, and the like. Natural language processing and other automated data identification and selection techniques may be used to determine candidate entities that may be involved in trade in these data sources. Additionally, data in the sources that may impact trade may be detected, selected, and associated with the candidate entities. Through the use of similarity analysis techniques and the like that are described herein, candidate entities determined in these sources may be related to known entities, such as resolved entities. When a match between a candidate entity in the trade information source and a known, resolved entity is made, the relevant trade-affecting data from the source may associated with the known entity. Relevant parties, such as users who identify themselves as being employees and/or owners of the known entity can, for example be served a digest of the trade information.

The similarity analysis and entity resolution methods and systems described herein may further yield information about trading partners and the like that may be used to establish trading communities. These trading communities may be organized as networks of entities in a network structure that may facilitate propagating the trade information digest or the like to relevant parties. By traversing a network structure starting with a resolved entity that is determined to match an entity in the trade information (e.g., news, and the like as noted above), relevant portions of a trade information may be provided to additional entities not directly identified in the trade information news and the like. In an example, trade information about a transportation disturbance (e.g., a port may be damaged by a hurricane, and the like) may identify the port (e.g., a country, city, state, or port name and the like). By identifying known resolved entities that rely on the identified port for transporting goods, users of those know entities could be notified of the disturbance. Likewise, in this example, buyers and/or suppliers of goods and services of entities that rely on the identified port may be determined through analyzing a configured network structure that connects buyers with suppliers, buyers with other buyers, and suppliers with other suppliers. Depending on the severity of the trade disruption at the identified port, these buyers and suppliers may be notified as well.

In another example of trade information monitoring and propagation, a particular shipper may make an announcement of equipment trouble that may impact quarterly business results. After confirming that the reporting shipper is a known resolved entity, the network structure that is configured to represent the community of this shipper may be accessed and traversed to find related entities. The network structure may have various types of entity-links to help identify, buyers, suppliers, financers, regions, ports, goods, even competitors that have a degree of similarity with the entity making the announcement. Any of these third parties could be provided with a digest of the trade information. Networks may also be configured to relate a user to entities, such as through the user explicitly identifying companies with whom the user wishes to make a community. Alternatively, user activity, such as search queries and the like may be used to configure the user into one or more communities of entities. In this way, individual users, such as users who have no direct affiliation with an affected entity may be provided with important trade information that is likely to be relevant to them.

Some trade information may have a time element to it that may best be served through generating alerts to third-party entities that may be impacted. Target destinations for such alerts may be derived from the analysis of the community network for the entity in the trade information announcement. The target destinations may be user computer devices, such as mobile or other devices that may be configured with alert processing software, such as an app or the like. To the extent that entities in a given community network may be dispersed across the globe, an alert may be generated at any hour of the day or night based on timely trade information. Such alerts may be delivered to the target destinations so that when a user activates (e.g., takes the computer out of sleep mode) the computing device at the destination the alert may cause the relevant alert processing software to connect to a user interface for viewing and/or acting on the trade information.

In yet another example, a weather report may indicate that a primary route to a town is closed for an extended time. The similarity analysis techniques described herein may be used to determine which entities are located in the affected town.

The community network structure described herein may be traversed from these entities to identify trading partners who may therefore be affected by this news. Alerts may be configured for certain trading partners based on transaction history that may suggest a shipment is currently or may soon be impacted by the news. Other parties, including trade partners, competitors, representatives, and the like that may have a community relationship to the entities in the affected town may also be provided with information about the trade disturbance.

Smart Alerts:

Entity resolution methods and systems described herein may be used for a range of innovations that provide access and derive intelligence from customs and other transaction records data. In particular, natural language processing techniques that are applied to short phrases across multiple languages may enable providing cross-platform alerts to users. Users may access online and web-type services, such as through web browsers and the like that provide access to customs and other transaction databases that are organized based on these entity resolution techniques. Such services may include alert services through which a user may explicitly identify a resolved entity for which a user may be alerted to new activity, such as a new customs transaction record and the like. Alert services may operate within a first platform, such as web servers and the like that may be processing the customs and other transaction records data, including ingesting new records, performing entity resolution, records aggregation, building and/or maintaining one or more databases of raw and aggregated records, and the like. Users may specify one or more criteria (e.g., a resolved entity name) for receiving alerts. Upon resolution of entities that meet this user-specified alert criteria in new or updated customs or other transaction records, an alert may be communicated to a user's remote device, such as a mobile computing device or the like. When the user's device is activated (e.g., taken out of sleep mode by the user), an alert function on the user's device may signal the presence of an alert, or may simply display the alert on the display screen of the user's device. In this way a user may specify criteria for alerts and receive those alerts even when his device is not activated (e.g., in sleep or standby mode).

Entity resolution techniques described herein may enhance producing alerts for users so that alerts can be presented for relevant entities that the user may not have explicitly identified in an alert notification request. Various interactions with the user and the platform may provide an initial basis for predictive alerting, such as user searches, similarity to entities for which alerts have been requested, and alerts for companies that have similarity to a user's company and/or the user's company's trading partners. Each such predictive alerting technique is described.

Predictive alerts may be based on automatically detecting shipments and entities that are likely to be of interest to a user based on the user's activity. They may also be based on activity of similar users.

A first user interaction-based trigger for predicting alerts is user search activity. This may involve detecting searches the user has performed and/or company profiles they have viewed, but for which they have not explicitly signed up to receive alerts. Search strings that the user has queried can be analyzed for certain keywords or the like that can then be used in similarity analysis for finding entities of potential interest for alerting. Likewise, entities that are provided in response to the user's searches may be flagged as alert candidates. To avoid redundant alerts and/or to provide greater alert capabilities, similarity analysis techniques, such as those described herein, may be used to identify and remove entities that are likely to be the same as entities that a user has already identified for being alerted about. Entities that have a measure of similarity (e.g., a text string or data field, such as an entity name field) that exceeds a similarity threshold for being similar to entities for which the user has explicitly setup alerts may be excluded from causing a separate predictive alert from being configured. Predictive alert generation may be automated and may further be weighted by various search-related factors, such as recency of searching terms, recency of search result, frequency of search term usage by the user, and the like.

A second user interaction-based predictive alert approach may include using similarity analysis to find entities that are similar, but are determined to be distinct from the explicitly selected alert entities. As an example, this predictive alert approach may rely on similarity between companies based on their relationship to products and to other companies. In this example, two companies are likely similar if they ship many of the same products or if they have many of the same trading partners. Such similarity analysis may be supplemented with network community detection algorithms that traverse links between entities to find new candidate entities for predictive alert generation. In an example, a supplier may be linked to a buyer through a series of orders, such as repeat or automated orders of products that are similar to products of an entity for which a user has configured an alert. In this way the combination of similarity analysis and network community detection may be used to surface groups of similar companies.

A third user interaction-based predictive alert approach may include determining an entity that is known in the entity resolved database of entities that can be matched to the user's own reported entity. Trading partners for this entity may have been determined through customs and other transaction records analysis and may be available in the database. Predictive alerts may be configured for these trading partners. Determining which known entity is the user's self reported entity may be accomplished by processing records for entities viewed by the user. In an example of determining which known entity is most likely to be the user's entity, the approach may apply string similarity metrics between the names of the entities that the user has viewed and the self-reported name of the user's entity to develop similarity scores. Additionally, the string similarity scores are weighted and thresholded through application of a supervised machine learning classifier to make a determination of which of the entities are likely to be the same company as the user's company. Trading partners of these companies may then be treated as candidates for alerting the user.

Matching Micro and Macro Data:

Macro data as may be related to customs or other transactions may provide aggregated and/or summary-level information. This may cover concepts like a time frame, a region, an industry, and the like. However, the underlying data that is used to derive this macro data may be unavailable. Yet there may be sufficiently descriptive information about the macro environment being summarized to enable similarity analysis methods and systems described herein to glean useful insights into the entities that are most likely to make up the trade data underling this macro level view. Additionally, variations of the macro data may be automatically generated from the detail transaction and/or entity data that is found to most likely contribute to the macro data.

Various aspects of individual transactions, such as customs and other trade transactions, may be determined by processing the transaction data record fields, including free-form text entry fields with natural language and other processing techniques. This data can be associated with entities that may be identifiable in the transaction record. This data may also be aggregated and summaries, much like macro trade data to reflect certain themes, such a particular region, business vertical, product type, shipping port, and the like, while maintaining a link back to the individual entities and even the individual transaction records. By using similarity analysis techniques described herein for associating data records, descriptors of macro data may be compared with descriptors of aggregated transaction records to determine candidate records that may make up at least a portion of the underling transaction data. When a sufficient number of descriptors match or at least are closely similar, the transactions that have been processed to generate the aggregated data under the descriptors may be flagged as candidates for sources of such macro data.

With a robust similarity-based connection between specific detailed transaction records and/or entity information, further analysis may be performed with the combined detailed and macro data. In an example, assets of an entity may be compared to macro data related to those assets, thereby providing an assessment of the entity in context of macro data that reflects many potentially similar entities. Making connections between macro trade-related data and specific entities that are highly likely to make up the data, also facilitates identifying top contributors to the macro data (e.g., major entities that perform transactions that are determined to be highly likely candidates for the data underlying the summary).

When macro data sources can be identified, other macro-level data can be derived by determining, for example, trading partners of entities determined to be sources of the macro analysis. In an example, export macro data may identify a port and a timeframe. By determining which exporters (e.g., suppliers) used the port in question during the macro data timeframe, it may be possible to determine which buyers were parties to those transactions and therefore produce port-specific buyer macro data, for example. Buyer information may be obfuscated in such a macro report The devices, systems, and methods described herein may include or supplement any of the devices, systems, and methods described in U.S. patent application Ser. No. 14/488,401, the publication of which is included herein as an Appendix (i.e., U.S. Pat. Pub. No. 2015/0073929) and is hereby incorporated by reference in its entirety for all purposes.

The methods and systems described herein may be deployed in part or in whole through a machine that executes computer software and instructions provided on a computer readable medium, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a coprocessor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software and instructions on a computer readable medium stored on or accessible to a server, client, firewall, gateway, hub, router, or other such computer and/or networking hardware. The computer software and executable instructions may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The computer software and program instructions may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like.

These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software and instructions provided on a computer readable medium, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, the depicted elements and the functions thereof may be implemented on machines and/or through computer executable media having a processor capable of executing computer software and program instructions stored thereon as a monolithic program structure, as standalone program elements, as computer software, or program elements that access and/or employ external routines, code, services, and so forth, or any combination of these, and all such implementations are contemplated within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions or through hardware configurations responsive to execute the logical component or portions thereof. Thus, while the foregoing drawings and descriptions set forth functional aspects of the disclosed systems, no particular arrangement of hardware and/or software or program instructions for implementing these functional aspects should be inferred as limiting from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be appreciated to require a particular order of execution for those steps, unless required by a particular application, or explicitly stated or otherwise clear from the context.

The methods and/or processes described above, and steps thereof, may be realized in hardware, computer software or executable instructions stored on a computer readable medium, or any combination of thereof suitable for a particular application. The hardware may include a dedicated computing device or specific computing device or particular aspect or component of a specific computing device. The processes may be realized in one or more microprocessors, microcontrollers, embedded microcontrollers, logic circuits, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be generated using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware, computer software and executable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware, computer software and/or executable instructions as described above. All such permutations and combinations are intended to fall within the scope of the present disclosure.

While the invention has been disclosed in connection with the certain specifically described embodiments shown and described in detail, various modifications and improvements thereon will become readily apparent to those skilled in the art. Accordingly, the spirit and scope of the present invention is not to be limited by the foregoing examples, but is to be appreciated in the broadest sense allowable by law.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated, or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method, comprising:
receiving a plurality of data records, each data record of the plurality of data records comprising a plurality of data fields and a plurality of terms, wherein at least one of the plurality of data fields in each data record comprises a shortened phrase including at least one of: a non-grammatical phrase, an abbreviation, a term including jargon, an acronym, or an initialization;
interpreting at least two data records of the plurality of data records, comprising executing a trained natural language processing (NLP) model using the at least two data records as input to generate a predicted entity categorization for each of the at least two data records based upon the plurality of data fields and the plurality of terms in each of the at least two data records;
determining a plurality of n-grams from the plurality of terms of each of the at least two data records;
mapping the plurality of n-grams to a corresponding plurality of mathematical vectors;
determining whether a similarity value between a first mathematical vector including a first term of the plurality of terms of a first one of the at least two data records and a second mathematical vector including a second term of the plurality of terms of a second one of the at least two data records is greater than a threshold similarity value;
associating the first one of the at least two data records with the second one of the at least two data records in response to the similarity value exceeding the threshold similarity value;
determining an entity for the first one of the at least two data records and the second one of the at least two data records based upon the predicted entity categorization and the association between the first one of the at least two data records and the second one of the at least two data records; and providing a summary of activity for the entity in response to the determining, wherein the summary of activity comprises each of: (i) a number of shipments by the entity, (ii) quantities of items shipped by the entity, (iii) value of items shipped by the entity, (iv) a histogram of shipment data for the entity, (v) characterizations of shipment anomalies associated with the entity, and (vi) a plurality of top terms associated with the entity retrieved from the plurality of data records.

2. An apparatus, comprising:
a data access circuit structured to receive a plurality of data records, each data record of the plurality of data records comprising a plurality of data fields and a plurality of terms, wherein at least one of the plurality of data fields in each data record comprises a shortened phrase including at least one of: a non-grammatical phrase, an abbreviation, a term including jargon, an acronym, or an initialization;
a prediction engine structured to interpret at least two data records of the plurality of data records, comprising executing a trained natural language processing (NLP) model using the at least two data records as input to generate a predicted entity categorization for each of the at least two data records based upon the plurality of data fields and the plurality of terms in each of the at least two data records;
a record parsing circuit structured to determine a plurality of n-grams from the plurality of terms of each of the at least two data records and to map the plurality of n-grams to a corresponding plurality of mathematical vectors;
a record association circuit structured to determine whether a similarity value between a first mathematical vector including a first term of the plurality of terms of a first one of the at least two data records and a second mathematical vector including a second term of the plurality of terms of a second one of the at least two data records is greater than a threshold similarity value, and to associate the first one of the at least two data records with the second one of the at least two data records in response to the similarity value exceeding the threshold similarity value;
a function engine structured to determine an entity for the first one of the at least two data records and the second one of the at least two data records based upon the predicted entity categorization and the association between the first one of the at least two data records and the second one of the at least two data records; and
a reporting circuit structured to provide a summary of activity for the entity in response to the associating, wherein the summary of activity comprises each of: (i) a number of shipments by the entity, (ii) quantities of items shipped by the entity, (iii) value of items shipped by the entity, (iv) a histogram of shipment data for the entity, (v) characterizations of shipment anomalies associated with the entity, and (vi) a plurality of top terms associated with the entity retrieved from the plurality of data records.

3. A system, comprising:
a data access circuit structured to receive a plurality of data records, each data record of the plurality of data records comprising a plurality of data fields and a plurality of terms, wherein at least one of the plurality of data fields in each data record comprises a shortened phrase including at least one of: a non-grammatical phrase, an abbreviation, a term including jargon, an acronym, or an initialization;
one or more processors in communication with at least one non-transitory computer readable storage medium comprising computer-readable instructions operable to cause the one or more processors to:
interpret at least two data records of the plurality of data records, comprising executing a trained natural language processing (NLP) model using the at least two data records as input to generate a predicted entity categorization for each of the at least two data records based upon the plurality of data fields and the plurality of terms in each of the at least two data records;
map a plurality of n-grams for each of the at least two data records to a corresponding plurality of mathematical vectors;
associate a first one of the at least two data records to a second one of the at least two data records in response to the mapping; and
determine an entity for the first one of the at least two data records and the second one of the at least two data records based upon the predicted entity categorization and the association between the first one of the at least two data records and the second one of the at least two data records; and
a reporting circuit structured to provide a summary of activity for the entity in response to the associating, wherein the summary of activity comprises each of: (i) a number of shipments by the entity, (ii) quantities of items shipped by the entity, (iii) value of items shipped by the entity, (iv) a histogram of shipment data for the entity, (v) characterizations of shipment anomalies associated with the entity, and (vi) a plurality of top terms associated with the entity retrieved from the plurality of data records.

4. The method of claim 1, further comprising determining that the first term is related to the second term in response to the similarity value exceeding the threshold similarity value.

5. The method of claim 1, wherein the n-grams comprise an n value of at least two.

6. The method of claim 1, further comprising determining that a plurality of the data records correspond to a first entity, and wherein the determining the similarity value is further in response to the determining the records correspond to the first entity.

7. The method of claim 1, further comprising determining that a first set of a plurality of the data records correspond to a first entity, and determining that a second set of the plurality of the data records correspond to a second entity, and wherein the determining the similarity value is further in response to shared terms from the first set and second set of the data records.

8. The method of claim 1, further comprising determining that the first term is related to the second term in response to the similarity value exceeding the threshold similarity value, wherein the first term and the second term each correspond to an entity identifier for the data records, providing a catalog entity identifier, and associating each of the first term and the second term to the catalog entity identifier.

9. The apparatus of claim 2, wherein the at least two data records include transactional records.

10. The apparatus of claim 2, wherein at least one of the plurality of n-grams includes words from at least two distinct languages.

11. The apparatus of claim 2, wherein the first term includes a member selected from the group comprising a numeric value, an abbreviation, a term including jargon, an acronym, and an initialization.

12. The apparatus of claim 2, wherein the reporting circuit is structured to determine that the first term is related to the second term in response to the similarity value exceeding the threshold similarity value, wherein the first term and the second term each correspond to an entity identifier for the data records, to provide a catalog entity identifier, and to associate each of the first term and the second term to the catalog entity identifier.

13. The apparatus of claim 2, wherein the second term includes a member selected from the group consisting of a numeric value, an abbreviation, a term including jargon, an acronym, and an initialization.

14. The system of claim 3, further comprising computer-readable instructions operable to cause the one or more processors to enhance the associating in response to a plurality of data records associated with a first entity.

15. The system of claim 3, further comprising computer-readable instructions operable to cause the one or more processors to enhance the associating in response to a plurality of data records each associated with one of a plurality of entities.

16. The system of claim 3, further comprising computer-readable instructions operable to cause the one or more processors to associate a catalog identifier to each of the first term and the second term.

17. The method of claim 4, further comprising determining that the first term is synonymous with the second term in response to the similarity value exceeding the threshold similarity value.

18. The method of claim 4, further comprising providing a catalog identifier and associating each of the first term and the second term to the catalog identifier.

19. The apparatus of claim 9, wherein the transactional records include customs transaction records.

20. The system of claim 16, wherein the first term includes a member selected from the group comprising a numeric value, an abbreviation, a term including jargon, an acronym, and an initialization.

21. The system of claim 16, wherein the second term includes a member selected from the group consisting of a numeric value, an abbreviation, a term including jargon, an acronym, and an initialization.

22. The method of claim 17, wherein the first term and the second term each correspond to an entity identifier for the data records.

23. The method of claim 18, wherein the catalog identifier matches at least one of the first term and the second term.

* * * * *